(12) United States Patent
Hayasaka et al.

(10) Patent No.: US 11,868,029 B2
(45) Date of Patent: Jan. 9, 2024

(54) INTERCHANGEABLE LENS, INFORMATION PROCESSING APPARATUS, INFORMATION PROCESSING METHOD, AND PROGRAM

(71) Applicant: Sony Group Corporation, Tokyo (JP)

(72) Inventors: Kengo Hayasaka, Kanagawa (JP); Hidenori Kushida, Kanagawa (JP); Katsuhisa Ito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 202 days.

(21) Appl. No.: 17/602,861

(22) PCT Filed: Apr. 14, 2020

(86) PCT No.: PCT/JP2020/016387
§ 371 (c)(1),
(2) Date: Oct. 11, 2021

(87) PCT Pub. No.: WO2020/213594
PCT Pub. Date: Oct. 22, 2020

(65) Prior Publication Data
US 2022/0179291 A1 Jun. 9, 2022

(30) Foreign Application Priority Data
Apr. 18, 2019 (JP) ................. 2019-079519

(51) Int. Cl.
*G03B 17/14* (2021.01)
*H04N 23/55* (2023.01)
(Continued)

(52) U.S. Cl.
CPC ............. *G03B 17/14* (2013.01); *H04N 23/55* (2023.01); *H04N 23/663* (2023.01); *G02B 7/14* (2013.01)

(58) Field of Classification Search
None
See application file for complete search history.

(56) References Cited

U.S. PATENT DOCUMENTS

| 2006/0187310 A1 | 8/2006 | Janson et al. |
| 2007/0195185 A1 | 8/2007 | Onuki |

(Continued)

FOREIGN PATENT DOCUMENTS

| JP | H10-268391 A | 10/1998 |
| JP | 2009-003190 A | 1/2009 |

(Continued)

OTHER PUBLICATIONS

International Search Report (PCT/ISA/210), International Application No. PCT/JP2020/016387, dated Jul. 9, 2020.

(Continued)

*Primary Examiner* — James M Hannett
(74) *Attorney, Agent, or Firm* — Michael Best & Friedrich LLP

(57) ABSTRACT

A multi-eye interchangeable lens is disclosed. In one example, it includes a lens barrel, a movable unit, individual-eye lenses, and a light source. The movable unit is movable along an optical axis with respect to the lens barrel. The individual-eye lenses are integrally movable with the movable unit and are arranged such that emission positions of imaging lights emitted via the individual-eye lenses do not overlap with one another. The light source is movable along the optical axis integrally with the movable unit and the individual-eye lenses, and is arranged such that an emission position of a parallel light emitted to an image sensor provided in a camera body does not overlap with the emission position of the imaging light of each of the plurality of individual-eye lenses.

20 Claims, 33 Drawing Sheets

(51) Int. Cl.
H04N 23/663 (2023.01)
G02B 7/14 (2021.01)

(56) References Cited

U.S. PATENT DOCUMENTS

| | | | |
|---|---|---|---|
| 2009/0160997 A1 | 6/2009 | Oyama et al. | |
| 2010/0007714 A1* | 1/2010 | Kim | H04N 23/698 156/247 |
| 2011/0176020 A1 | 7/2011 | Chang | |
| 2011/0279654 A1* | 11/2011 | Ueda | H04N 13/218 348/E13.074 |
| 2015/0229815 A1* | 8/2015 | Nonaka | H04N 23/45 348/218.1 |
| 2017/0332067 A1 | 11/2017 | Ichihara et al. | |

FOREIGN PATENT DOCUMENTS

| | | |
|---|---|---|
| JP | 2009003191 A | 1/2009 |
| JP | 2015-148765 A | 8/2015 |
| WO | 2015/037472 A1 | 3/2015 |

OTHER PUBLICATIONS

Notice of Allowance dated Sep. 6, 2023 for related U.S. Appl. No. 17/602,862.

* cited by examiner

FIG. 11
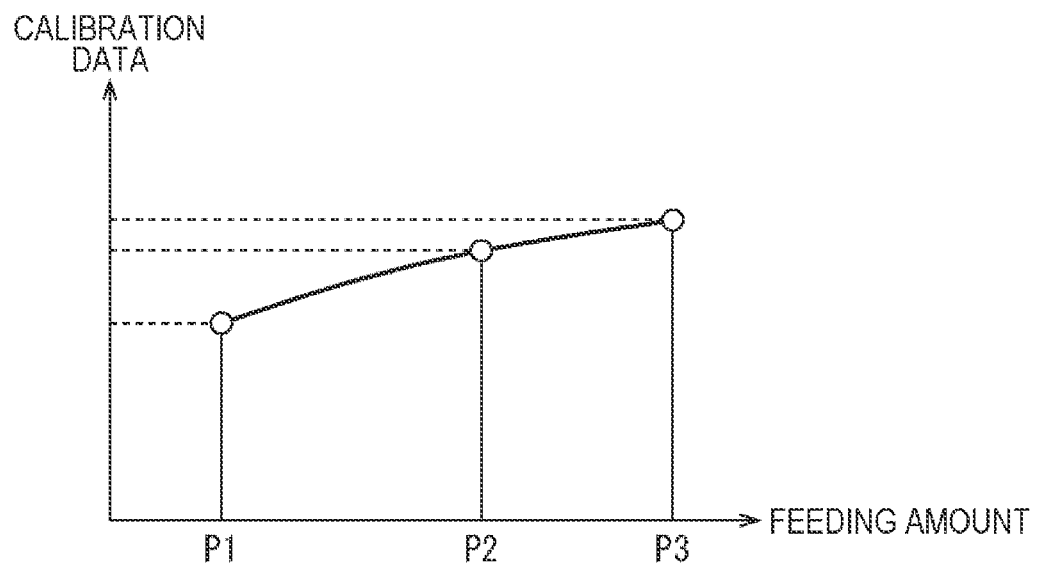
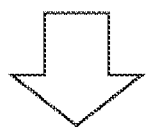
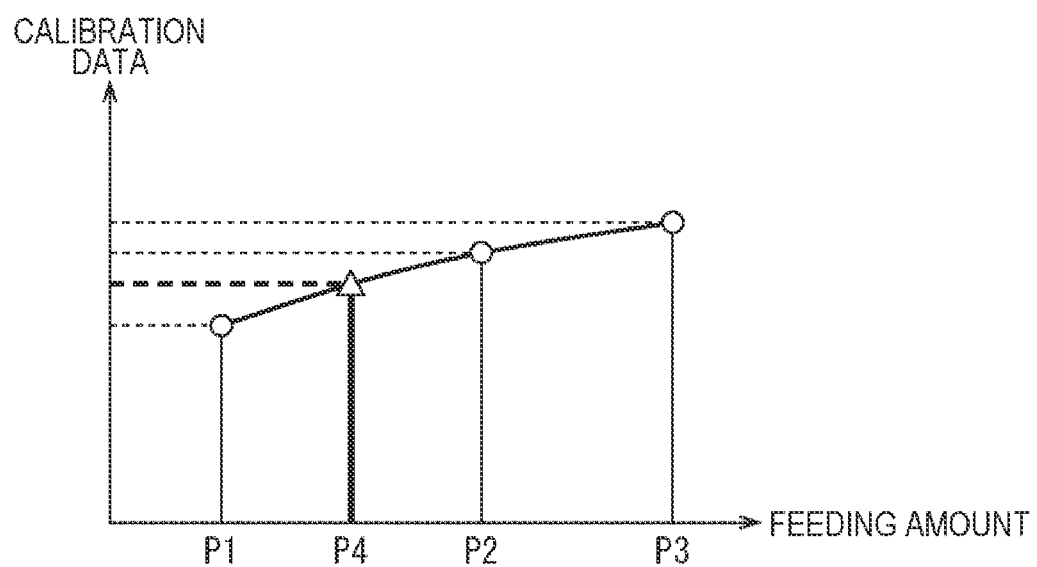

FIG. 23
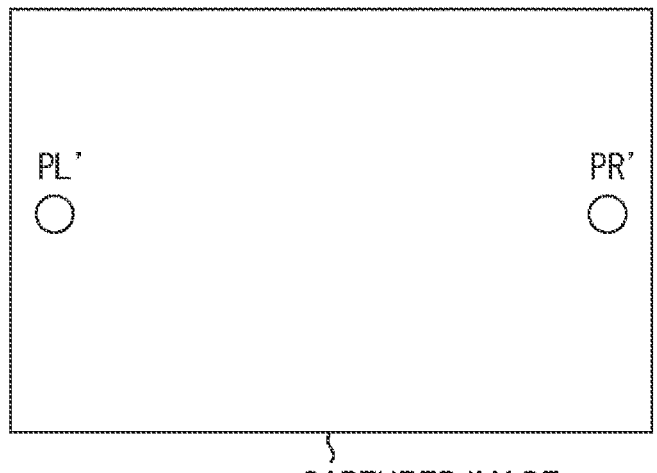
A
CAPTURED IMAGE
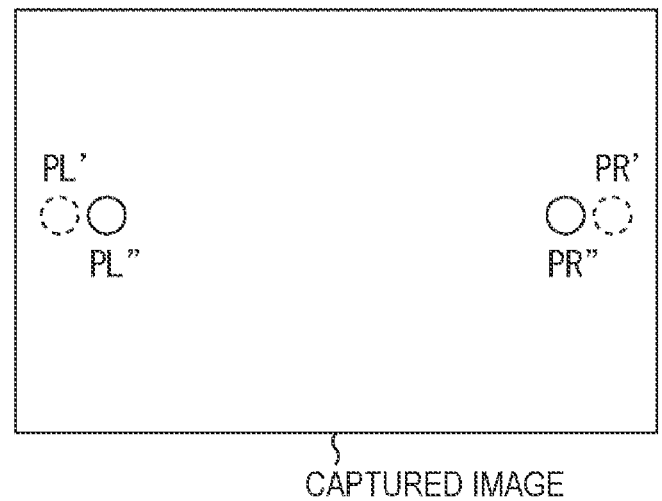
B
CAPTURED IMAGE

INTERCHANGEABLE LENS, INFORMATION PROCESSING APPARATUS, INFORMATION PROCESSING METHOD, AND PROGRAM

TECHNICAL FIELD

The present technology relates to an interchangeable lens, an information processing apparatus, an information processing method, and a program, and particularly relates to, for example, an interchangeable lens, an information processing apparatus, an information processing method, and a program for enabling appropriate processing.

BACKGROUND ART

A technique for improving convenience of a service using a multi-viewpoint image including a plurality of images having different viewpoints from one another has been proposed (see, for example, Patent Document 1).

CITATION LIST

Patent Document

Patent Document 1: International Publication No. 2015/037472

SUMMARY OF THE INVENTION

Problems to be Solved by the Invention

The multi-viewpoint image can be captured by, for example, a camera system including individual-eye lenses that are a plurality of lenses arranged not to overlap with one another in an optical axis direction.

However, in the camera system, in a case where the plurality of individual-eye lenses is fed out in the optical axis direction, and a focus and the like are adjusted, a region of the individual-eye image corresponding to an image formed by light beams condensed by the individual-eye lens on a captured image captured by an image sensor may change before and after the feed out.

When the region of the individual-eye image changes, it may be difficult to appropriately perform processing in the camera system.

The present technology has been made in view of the foregoing, and enables appropriate processing.

Solutions to Problems

An interchangeable lens of the present technology is an interchangeable lens including a lens barrel; a movable unit configured to be movable along an optical axis with respect to the lens barrel; a plurality of individual-eye lenses configured to be integrally movable with the movable unit and arranged such that emission positions of imaging lights emitted through the respective individual-eye lenses do not overlap with one another; and one or a plurality of light sources configured to be movable along the optical axis integrally with the movable unit and the plurality of individual-eye lenses, and arranged such that an emission position of a parallel light emitted to an image sensor provided in a camera body does not overlap with the emission position of the imaging light of each of the plurality of individual-eye lenses.

In the interchangeable lens of the present technology, the movable unit is configured to be movable along the optical axis with respect to the lens barrel, the plurality of individual-eye lenses is configured to be integrally movable with the movable unit, and the emission positions of imaging lights emitted through the respective individual-eye lenses are arranged so as not to overlap with one another. Moreover, the one or the plurality of light sources is configured to be movable along the optical axis integrally with the movable unit and the plurality of individual-eye lenses, and is arranged such that the emission position of the parallel light emitted to the image sensor provided in the camera body does not overlap with the emission position of the imaging light of each of the plurality of individual-eye lenses.

An information processing apparatus or a program of the present technology is an information processing apparatus including: or a program for causing a computer to function as such an information processing apparatus including: a detection unit configured to detect a light image on a captured image captured by an image sensor, the light image being of a parallel light emitted from a light source of a lens unit including a lens barrel, a movable unit configured to be movable along an optical axis with respect to the lens barrel, a plurality of individual-eye lenses configured to be integrally movable with the movable unit and arranged such that emission positions of imaging lights emitted through the respective individual-eye lenses do not overlap with one another, and one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses; and a processing unit configured to perform processing according to a detection result of the detection unit.

An information processing method of the present technology is an information processing method including: a detection step of detecting a light image on a captured image captured by an image sensor, the light image being of a parallel light emitted from a light source of a lens unit including a lens barrel, a movable unit configured to be movable along an optical axis with respect to the lens barrel, a plurality of individual-eye lenses configured to be integrally movable with the movable unit and arranged such that emission positions of imaging lights emitted through the respective individual-eye lenses do not overlap with one another, and one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses; and a processing step of performing processing according to a detection result of the detection step.

In the information processing apparatus, the information processing method, and the program of the present technology, a light image on a captured image captured by an image sensor, the light image being of a parallel light emitted from a light source of a lens unit, is detected, the lens unit including a lens barrel, a movable unit configured to be movable along an optical axis with respect to the lens barrel, a plurality of individual-eye lenses configured to be integrally movable with the movable unit and arranged such that emission positions of imaging lights emitted through the respective individual-eye lenses do not overlap with one another, and one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses, and processing is performed according to a detection result.

Note that the information processing apparatus may be an independent apparatus or may be internal blocks configuring one apparatus.

Furthermore, the program can be provided by being transmitted via a transmission medium or by being recorded on a recording medium.

BRIEF DESCRIPTION OF DRAWINGS

FIG. 11 is a diagram for describing generation by interpolation of calibration data for an imaging feeding amount corresponding to an imaging focus position P4.

FIG. 23 is views illustrating an example of a captured image in which spot light images PL' and PR' appear in the case where the feeding unit 23 is in the minimum feeding state, and a captured image in which spot light images PL" and PR" appear in the case where the feeding unit 23 is in the maximum feeding state.

MODE FOR CARRYING OUT THE INVENTION

<Embodiment of Camera System to which Present Technology is Applied>

Figure 1:
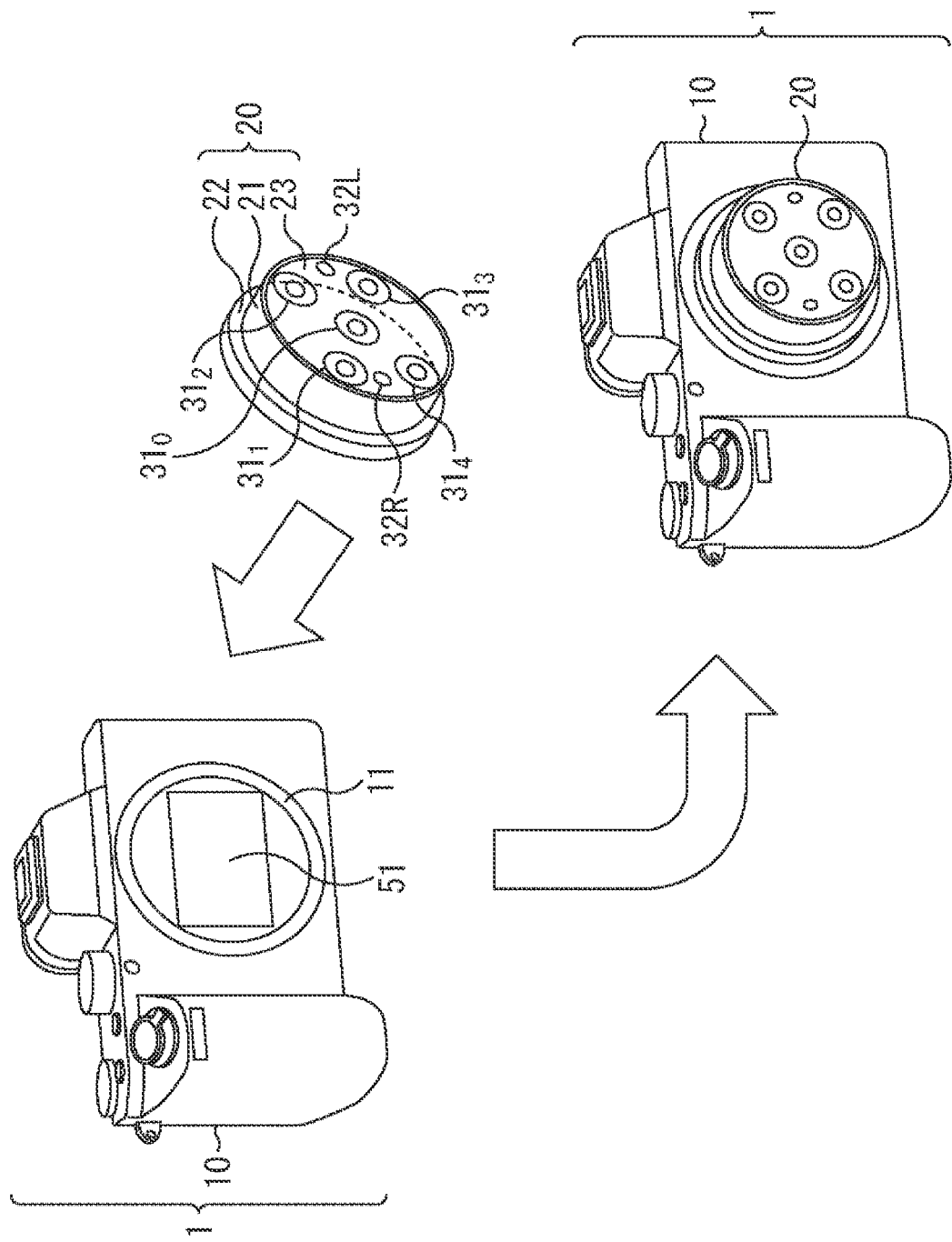
FIG. 1 is a perspective view illustrating a configuration example of an embodiment of a camera system to which the present technology is applied.

FIG. 1 is a perspective view illustrating a configuration example of an embodiment of a camera system (imaging device) to which the present technology is applied.

The camera system 1 includes a camera body 10 and a multi-eye interchangeable lens 20 (lens unit).

The multi-eye interchangeable lens 20 is attachable to and detachable from the camera body 10. That is, the camera body 10 includes a camera mount 11, and (a lens mount 22 of) the multi-eye interchangeable lens 20 is fixed (attached) to the camera mount 11, so that the multi-eye interchangeable lens 20 is mounted on the camera body 10. Note that a general interchangeable lens other than the multi-eye interchangeable lens 20 can be attached to and detached from the camera body 10.

The camera body 10 incorporates an image sensor 51. The image sensor 51 is, for example, a complementary metal oxide semiconductor (CMOS) image sensor, and images an image by receiving light beams condensed by the multi-eye interchangeable lens 20 or other interchangeable lenses mounted on (the camera mount 11 of) the camera body 10 and performing photoelectric conversion. Hereinafter, the image obtained by imaging by the image sensor 51 is also referred to as a captured image.

The multi-eye interchangeable lens 20 includes a lens barrel 21, a lens mount 22, and a feeding unit 23. The feeding unit 23 is a movable unit configured to be movable along an optical axis of the lens barrel 21 with respect to the lens barrel 21. The feeding unit 23 includes five individual-eye lenses $31_0$, $31_1$, $31_2$, $31_3$, and $31_4$ as a plurality of individual-eye lenses. The plurality of individual-eye lenses $31_i$ is configured to be integrally movable with the feeding unit 23 and is arranged such that emission positions of imaging lights emitted via the individual-eye lenses $31_i$ do not overlap with one another. Moreover, the feeding unit 23 includes light sources 32L and 32R. The light sources 32L and 32R are configured to be movable along the optical axis of the lens barrel 21 integrally with the feeding unit 23 and the plurality of individual-eye lenses $31_i$, and are arranged such that an emission position of an irradiation light emitted to the image sensor 51 provided in the camera body 10 does not overlap with the emission position of the imaging light of each of the plurality of individual-eye lenses $31_i$.

The lens barrel 21 has a substantially cylindrical shape, and the lens mount 22 is formed on one bottom surface side of the cylindrical shape.

The lens mount 22 is fixed (attached) to the camera mount 11 of the camera body 10 when the multi-eye interchangeable lens 20 is mounted on the camera body 10.

The feeding unit 23 has a substantially columnar shape and is housed in the cylindrical lens barrel 21.

The feeding unit 23 is provided with a plurality of five lenses, namely, the individual-eye lenses $31_0$, $31_1$, $31_2$, $31_3$, and $31_4$, which are arranged so as not to overlap (as viewed) in an optical axis direction of the optical axis (lens barrel optical axis) of the entire lens barrel 21. In FIG. 1, the five individual-eye lenses $31_0$ to $31_4$ are provided in the feeding unit 23 in a form that the four individual-eye lenses $31_1$ to $31_4$ constitute vertices of a square centered on the individual-eye lens $31_0$ (as the center of gravity) on a two-dimensional plane (parallel to a light-receiving surface (imaging surface) of the image sensor 51) orthogonal to the lens barrel optical axis.

When the multi-eye interchangeable lens 20 is mounted on the camera body 10, the individual-eye lenses $31_0$ to $31_4$ condense the light beams from an object to the image sensor 51 of the camera body 10.

Note that, here, the camera body 10 is a so-called single-plate camera including one image sensor 51, but as the camera body 10, a plurality of image sensors, that is, for example, a so-called three-plate camera including three image sensors for red, green, and blue (RGB) can be adopted. In the three-plate camera, the light beams emitted from the individual-eye lenses $31_0$ to $31_4$ are respectively condensed on the three image sensors using an optical system such as a prism. Note that the number of image sensors may be any number other than three, such as a two-plate camera, in addition to the three-plate camera. Furthermore, the image sensors are not limited to the ones for RGB. All the image sensors may be for monochrome or may include a color filter such as a Bayer array.

The feeding unit 23 is provided with the two light sources 32L and 32R that are the plurality of light sources, in addition to the five individual-eye lenses $31_0$ to $31_4$. The light sources 32L and 32R are provided at a right end and a left end of the feeding unit 23, respectively, when the multi-eye interchangeable lens 20 is viewed from the front.

The light sources 32L and 32R are configured by, for example, light emitting diodes (LEDs), lasers, or the like, and emit spot lights from a front side (side on which the light beam is incident) toward a back side of the multi-eye interchangeable lens 20.

Therefore, in the case where the multi-eye interchangeable lens 20 is mounted on the camera body 10, the spot lights emitted by the light sources 32L and 32R are received by the image sensor 51 of the camera body 10.

As described above, the feeding unit 23 is provided with the light sources 32L and 32R together with the individual-eye lenses $31_0$ to $31_4$.

The feeding unit 23 is configured to be movable (slidable) inside the cylindrical lens barrel 21 in the optical axis direction of the lens barrel optical axis, thereby to be fed out to the front side (retracted to the back side) inside of the lens barrel 21.

Therefore, the multi-eye interchangeable lens 20 is configured such that the individual-eye lenses $31_0$ to $31_4$ and the light sources 32L and 32R provided in the feeding unit 23 are integrally fed out.

As described above, since the individual-eye lenses $31_0$ to $31_4$ and the light sources 32L and 32R are integrally fed out, the camera system 1 can perform appropriate processing.

That is, spot light images that are images of the spot lights emitted by the light sources 32L and 32R appear in the captured image captured by the image sensor 51, and the spot light images can be used to obtain an attachment error of the multi-eye interchangeable lens 20 as will be described below.

In the multi-eye interchangeable lens 20, the individual-eye lenses $31_0$ to $31_4$ are provided in the feeding unit 23, and thus the individual-eye lenses $31_0$ to $31_4$ are fed out together with the feeding unit 23, thereby, for example, focus adjustment for telephoto capture or macro capture can be performed.

In this case, if the light sources 32L and 32R are provided in a portion other than the feeding unit 23 of the multi-eye interchangeable lens 20, the light sources 32L and 32R are not fed out even if the individual-eye lenses $31_0$ to $31_4$ are fed out. Then, using the spot light images of the spot lights emitted by such light sources 32L and 32R makes it difficult to accurately obtain the attachment error that changes due to the feed out of the individual-eye lenses $31_0$ to $31_4$.

In contrast, in the case where the individual-eye lenses $31_0$ to $31_4$ and the light sources 32L and 32R are integrally fed out, appropriate processing of accurately obtaining the attachment error that changes due to the feed out of the individual-eye lenses $31_0$ to $31_4$ can be performed using the spot light images.

Moreover, even if regions of individual-eye images corresponding to images formed by the light beams respectively condensed by the individual-eye lenses $31_0$ to $31_4$ change due to the feed out of the individual-eye lenses $31_0$ to $31_4$ on the captured image, appropriate processing of accurately specifying the regions of the individual-eye images can be performed.

Furthermore, calibration data for suppressing an influence of lens distortion that changes due to the feed out of the individual-eye lenses $31_0$ to $31_4$ can be obtained, and moreover, appropriate processing of obtaining parallax information with suppressed influence of the lens distortion using such calibration data can be performed.

Note that, in FIG. 1, the multi-eye interchangeable lens 20 is provided with the five individual-eye lenses $31_0$ to $31_4$.

However, the number of individual-eye lenses provided in the multi-eye interchangeable lens 20 is not limited to five, and any number such as two, three, or six or more can be adopted.

Moreover, the plurality of individual-eye lenses provided in the multi-eye interchangeable lens 20 can be arranged at any positions on the two-dimensional plane, in addition to being arranged at the center and vertex positions of a square.

Furthermore, as the plurality of individual-eye lenses provided in the multi-eye interchangeable lens 20, a plurality of lenses having different focal lengths, f-numbers, or other specifications can be adopted. Note that, here, to simplify the description, a plurality of lenses having the same specification is adopted.

Moreover, in FIG. 1, the two light sources 32L and 32R are provided in the multi-eye interchangeable lens 20. However, the number of light sources provided in the multi-eye interchangeable lens 20 is not limited to two, and any number such as one or three or more can be adopted as necessary.

Furthermore, in the case of providing the two light sources 32L and 32R as the plurality of light sources in the multi-eye interchangeable lens 20, for example, the two light sources 32L and 32R can be arranged on a line connecting farthest two points on the plane where the five individual-eye lenses $31_0$ to $31_4$ are arranged, that is, on a circle when the substantially columnar feeding unit 23 is viewed from the front in FIG. 1, of the multi-eye interchangeable lens 20. In this case, the light sources 32L and 32R are arranged on a line passing through the center of the circle when the feeding unit 23 is viewed from the front. As will be described below, the light sources 32L and 32R are desirably arranged as far apart as possible. By arranging the light sources 32L and 32R on the line passing through the center of the circle when the feeding unit 23 is viewed from the front, the light sources 32L and 32R can be arranged most apart.

In the multi-eye interchangeable lens 20, the five individual-eye lenses $31_0$ to $31_4$ as the plurality of individual-eye lenses are arranged such that the optical axis (individual-eye optical axis) of the individual-eye lens $31_i$ becomes orthogonal to the light-receiving surface of the image sensor 51 when the multi-eye interchangeable lens 20 is mounted on the camera body 10.

In the camera system 1 having the multi-eye interchangeable lens 20 mounted on the camera body 10, the image sensor 51 images corresponding to images formed on the light-receiving surface of the image sensor 51 by the light beams respectively condensed by the five individual-eye lenses $31_0$ to $31_4$.

Now, assuming that an image corresponding to an image formed by the light beam condensed by one individual-eye lens $31_i$ (where i=0, 1, 2, 3, 4) is referred to as an individual-eye image, the captured image captured by one image sensor 51 includes five individual-eye images respectively corresponding to the five individual-eye lenses $31_0$ to $31_4$ (images corresponding to images formed by the light beams respectively condensed by the individual-eye lenses $31_0$ to $31_4$).

The individual-eye image for the individual-eye lens $31_i$ is an image having a viewpoint at the position of the individual-eye lens $31_i$, and thus the five individual-eye images for the respective individual-eye lenses $31_0$ to $31_4$ are images of different viewpoints.

Moreover, the captured image includes the spot light images (images formed by the spot lights) that are images corresponding to the spot lights respectively emitted by the two light sources 32L and 32R.

Here, the camera system 1 in FIG. 1 includes the camera body 10 and the multi-eye interchangeable lens 20 attachable to and detachable from the camera body 10, but the present technology can also be applied to a so-called lens-integrated camera system in which the multi-eye interchangeable lens 20 is fixed to the camera body 10. That is, the present technology can be applied to, for example, a lens-integrated camera.

Furthermore, one individual-eye lens $31_i$ can be configured by arranging a plurality of lenses in the optical axis direction of the lens barrel optical axis, other than by one lens.

Moreover, some or all of processing of a region specifying unit 52, an image processing unit 53, a position calculation unit 57, a spot light image detection unit 62, and a feeding amount detection unit 64, which will be described below, of the camera body 10 can be performed by a server on a cloud, a reproduction dedicated device, or the like, other than the camera body 10, for example.

Furthermore, a zoom magnification can be adjusted in addition to the focus adjustment by the feed out of the feeding unit 23 of the multi-eye interchangeable lens 20. Hereinafter, to simplify the description, it is assumed that the focus is adjusted by the feed out of the feeding unit 23.

Note that, regarding the camera body 10, a surface on a side where the multi-eye interchangeable lens 20 is mounted, that is, a surface on which the camera mount 11 is located is defined as the front.

<Electrical Configuration Example of Camera System 1>

Figure 2:
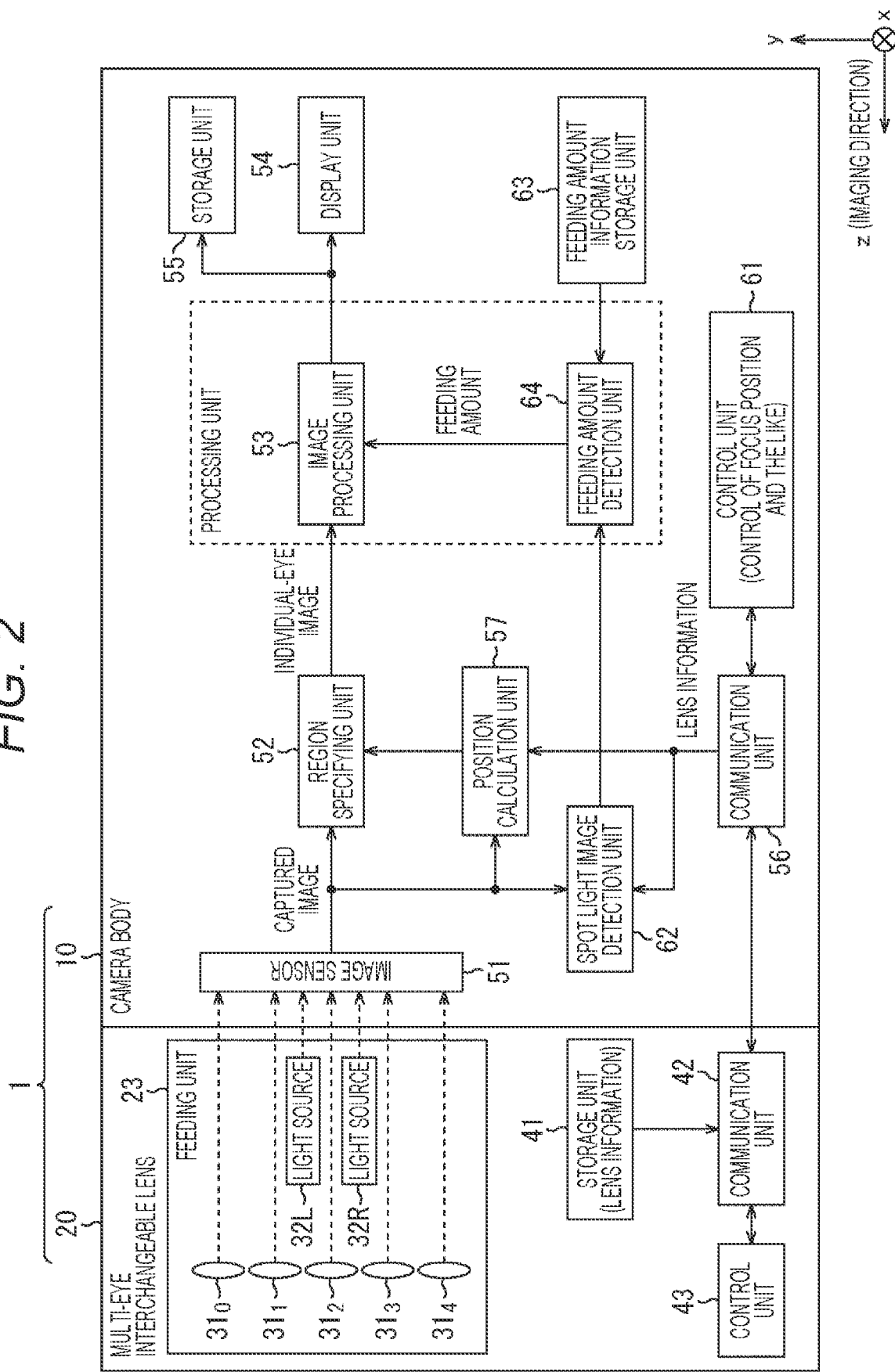
FIG. 2 is a block diagram illustrating an electrical configuration example of a camera system 1.

FIG. 2 is a block diagram illustrating an electrical configuration example of the camera system 1 of FIG. 1.

In the camera system 1, the multi-eye interchangeable lens 20 includes a storage unit 41, a communication unit 42, and a control unit 43.

The storage unit 41 stores lens information that is information regarding the multi-eye interchangeable lens 20. The lens information includes individual difference reflection position information (known reference position).

The individual difference reflection position information is position information regarding a position corresponding to a predetermined light beam on an individual-eye image for the individual-eye lens $31_i$ on a known captured image in which a predetermined object locating at a known distance appears, the known captured image being captured by the (one) image sensor 51 when the multi-eye interchangeable lens 20 is mounted on the camera body 10, for example. The individual difference reflection position information can be said to be position information regarding an incident position of a predetermined light beam on the image sensor 51, which deviates by an amount different for each individual of the multi-eye interchangeable lens 20 (deviates from a design position) due to a manufacturing error (manufacturing variation) during manufacturing of the multi-eye interchangeable lens 20, and is position information including (a deviation of the emission position of the imaging light emitted from the individual-eye lens $31_i$ due to) the manufacturing error different for each individual during manufacturing of the multi-eye interchangeable lens 20. As the individual difference reflection position information, the position itself corresponding to a predetermined light beam on an individual-eye image for the individual-eye lens $31_i$ on a known captured image in which a predetermined object locating at a known distance appears, the known captured image being captured by the image sensor 51 when the multi-eye interchangeable lens 20 is mounted on the camera body 10, for example, can be adopted.

Here, a position where an image of the light beam passing through the optical axis (individual-eye optical axis) of the individual-eye lens $31_i$ is formed in the individual-eye image for the individual-eye lens $31_i$ is assumed to be an optical axis center position. Note that the individual-eye optical axis is supposed to be parallel to the optical axis (lens barrel optical axis) of the entire lens barrel 21 or is supposed to be arranged with a fixed distance but a deviation occurs.

Now, assuming that, for example, the light beam passing through the individual-eye optical axis of the individual-eye lens $31_i$ is adopted as the predetermined light beam for the individual-eye image for the individual-eye lens $31_i$, the individual difference reflection position information of the individual-eye image for the individual-eye lens $31_i$ is the optical axis center position of the individual-eye image.

Note that the predetermined light beam is not limited to the light beam passing through the individual-eye optical axis of the individual-eye lens $31_i$. That is, as the predetermined light beam, for example, a light beam passing through a position separated from the individual-eye optical axis of the individual-eye lens $31_i$ by a predetermined distance and parallel to the individual-eye optical axis, or the like, can be adopted.

The lens information includes individual difference spot light position information (known light position) regarding the positions of the spot light images of the spot lights of the light sources 32L and 32R on the known captured image, in addition to the individual difference reflection position information of the individual-eye image for the individual-eye lens $31_i$ on the known captured image. As the individual difference spot light position information, the positions themselves of the spot light images of the spot lights of the light sources 32L and 32R on the known captured image can be adopted. The individual difference spot light position information is position information including the manufacturing error different for each individual during manufacturing of the multi-eye interchangeable lens 20, similarly to the individual difference reflection position information.

Here, a unique lens identification (ID) can be assigned to the multi-eye interchangeable lens 20, and the lens ID of the multi-eye interchangeable lens 20 can be adopted as the lens information to be stored in the storage unit 41. Moreover, in this case, a database in which the lens ID as the lens information, and the individual difference reflection position information and the individual difference spot light position information as the lens information other than the lens ID of the multi-eye interchangeable lens 20 specified with the lens ID are associated can be prepared. In this case, the individual difference reflection position information, the individual difference spot light position information, and the like of the multi-eye interchangeable lens 20 associated with the lens ID can be acquired by searching the database using the lens ID as a keyword.

The communication unit 42 performs wired or wireless communication with a communication unit 56 to be described below of the camera body 10. Note that the communication unit 42 can also communicate with a server on the Internet, a personal computer (PC) on a wired or wireless local area network (LAN), or other external devices by an arbitrary communication method as necessary.

The communication unit 42 communicates with the communication unit 56 of the camera body 10 to transmit the lens information stored in the storage unit 41 to the communication unit 56 in a case where, for example, the multi-eye interchangeable lens 20 is mounted on the camera body 10 or the power is turned on in the state where the multi-eye interchangeable lens 20 is mounted on the camera body 10.

Furthermore, the communication unit 42 receives a command and other information transmitted from the communication unit 56, and supplies the command and other information to the control unit 43. The control unit 43 controls the multi-eye interchangeable lens 20 such as the focus adjustment by feeding (moving) the feeding unit 23 according to the information from the communication unit 42.

The camera body 10 includes an image sensor 51, the region specifying unit 52, the image processing unit 53, a display unit 54, a storage unit 55, the communication unit 56, the position calculation unit 57, a control unit 61, the spot light image detection unit 62, a feeding amount information storage unit 63, and the feeding amount detection unit 64.

The image sensor 51 is, for example, a CMOS image sensor as described with reference to FIG. 1, and the light-receiving surface of the image sensor 51 is irradiated with the light beams condensed by the individual-eye lenses $31_0$ to $31_4$ of the multi-eye interchangeable lens 20 mounted on the camera body 10 and the light beams as the spot lights emitted by the light sources 32L and 32R.

The image sensor 51 images and outputs the captured image including the individual-eye images for the individual-eye lenses $31_0$ to $31_4$ (the individual-eye images corresponding to the images formed by the light beams condensed by the individual-eye lenses $31_0$ to $31_4$) and the spot light images of the spot lights of the light sources 32L and 32R by receiving the light beams condensed by the individual-eye lenses $31_0$ to $31_4$ and the light beams as the spot lights emitted by the light sources 32L and 32R and performing the photoelectric conversion. The captured image (another captured image) output by the image sensor 51 is supplied to the region specifying unit 52, the position calculation unit 57, and the spot light image detection unit 62.

The region specifying unit 52 is supplied with the captured image output by the image sensor 51 and is also supplied with mount error reflection position information (unknown reference position) as the position information on the individual-eye image included in the captured image output by the image sensor 51 from the position calculation unit 57.

The mount error reflection position information is position information regarding the position corresponding to a predetermined light beam on the individual-eye image for the individual-eye lens $31_i$ on the captured image (another captured image) obtained by imaging an arbitrary object (irrespective of whether the distance to the object is known) by the (one) image sensor 51 in the state where the multi-eye interchangeable lens 20 is mounted on the camera body 10, for example. The mount error reflection position information can be said to be position information regarding the incident position of the predetermined light beam on the image sensor 51, which deviates due to the mount error of the multi-eye interchangeable lens 20 at the time of mounting the multi-eye interchangeable lens 20, and is position information including (a deviation of the emission position of the imaging light emitted from the individual-eye lens $31_i$ due to) the mount error at the time of using the multi-eye interchangeable lens 20.

The mount error represents the deviation of the attachment position (mount position) of the multi-eye interchangeable lens 20 caused due to the multi-eye interchangeable lens 20 being attachable to and detachable from the camera body 10. The mount error may change, for example, every time the multi-eye interchangeable lens 20 is mounted. Furthermore, the mount error may change, for example, when an impact is applied to the camera system 1 having the multi-eye interchangeable lens 20 mounted on the camera body 10.

The mount error reflection position information is position information including the manufacturing error in addition to the mount error (position information including the deviation of the emission position of the imaging light emitted from the individual-eye lens $31_i$ due to the manufacturing error and the mount error).

Here, in the case of adopting, as the individual difference reflection position information, the optical axis center position on the individual-eye image included in the known captured image in the case where the captured image is the known captured image obtained by imaging a certain object located at a known distance, the optical axis center position on the individual-eye image included in the captured image (another captured image) obtained by imaging an arbitrary object (irrespective of whether the distance to the object is known) can be adopted as the mount error reflection position information, for example.

The region specifying unit 52 specifies the regions of the individual-eye images for the individual-eye lenses $31_0$ to $31_4$, on the captured image from the image sensor 51, according to the mount error reflection position information from the position calculation unit 57, and outputs region specification result information indicating a specification result of the regions.

That is, the region specifying unit 52 specifies, for example, a rectangular region having a predetermined size centered on the mount error reflection position information of the captured image (as the center of gravity), of the captured image from the image sensor 51, as the region of the individual-eye image.

Here, the region specifying unit 52 can output, for example, a set of the entire captured image and region information indicating the regions of the individual-eye images on the entire captured image, as the region specification result information. Furthermore, the region specifying unit 52 can extract (cut out) the individual-eye images from the captured image and output the individual-eye images as the region specification result information. Note that the individual-eye images can be output in a set with the region information.

Hereinafter, to simplify the description, for example, it is assumed that the region specifying unit 52 outputs the individual-eye images (the individual-eye images for the individual-eye lenses $31_0$ to $31_4$) extracted from the captured image as the region specification result information.

The individual-eye images for the individual-eye lenses $31_0$ to $31_4$ output by the region specifying unit 52 are supplied to the image processing unit 53.

The image processing unit 53 is a part of a processing unit that performs processing according to a detection result of the spot light image detection unit 62 to be described below. The image processing unit 53 performs, for example, image processing such as generating parallax information, and refocusing of generating (reconfiguring) an image in which an arbitrary object is focused, using the individual-eye images for the individual-eye lenses $31_0$ to $31_4$ from the region specifying unit 52, that is, the individual-eye images having different viewpoints at the respective positions of the individual-eye lenses $31_0$ to $31_4$, and a feeding amount of the feeding unit 23 supplied from the feeding amount detection unit 64, and supplies a processing result image obtained as a result of the image processing to the display unit 54 and the storage unit 55.

Note that the image processing unit 53 can also perform general image processing such as defect correction and noise reduction. Furthermore, the image processing unit 53 can perform the image processing for both an image to be saved (stored) in the storage unit 55 and an image for being displayed as a so-called through image on the display unit 54.

The display unit 54 includes, for example, a liquid crystal panel, an organic electro luminescence (EL) panel, or the like, and is provided on a back surface of the camera body 10. The display unit 54 displays, for example, the processing result image or the like supplied from the image processing unit 53 as a through image. As the through image, a part of the whole of the captured image captured by the image sensor 51 or the individual-eye image extracted from the captured image can be displayed in addition to the processing result image. In addition, the display unit 54 can display, for example, information such as a menu and settings of the camera body 10.

The storage unit 55 includes a memory card (not illustrated) or the like, and stores, for example, the processing result image supplied from the image processing unit 53 according to a user's operation or the like.

The communication unit 56 performs wired or wireless communication with the communication unit 42 or the like of the multi-eye interchangeable lens 20. Note that the communication unit 56 can also communicate with a server on the Internet, a PC on a wired or wireless LAN, or other external devices by an arbitrary communication method as necessary.

The communication unit 56 communicates with the communication unit 42 of the multi-eye interchangeable lens 20 to receive the lens information of the multi-eye interchangeable lens 20 transmitted from the communication unit 42 when the multi-eye interchangeable lens 20 is mounted on the camera body 10, for example, and supplies the lens information to the position calculation unit 57 and the spot light image detection unit 62.

Furthermore, the communication unit 56 transmits, for example, information specifying a focus (position) from the control unit 61 to the communication unit 42.

The position calculation unit 57 obtains the mount error reflection position information that is the optical axis center position on the individual-eye image for the individual-eye lens $31_i$ included in the captured image supplied from the image sensor 51 according to the individual difference reflection position information included in the lens information from the communication unit 56, and supplies the mount error reflection position information to the region specifying unit 52.

Note that, in FIG. 2, in obtaining the mount error reflection position information that is the optical axis center position on the individual-eye image included in the captured image supplied from the image sensor 51, the position calculation unit 57 uses the individual difference spot light position information in addition to the individual difference reflection position information included in the lens information.

The control unit 61 controls the focus or the like according to the user's operation or the like for adjusting the focus. For example, the control unit 61 supplies the information for specifying a focus to the communication unit 56 according to the user's operation.

The spot light image detection unit 62 detects incident ranges on the image sensor 51, of the spot lights emitted from the light sources 32L and 32R, and supplies a detection result to the feeding amount detection unit 64.

That is, the spot light image detection unit 62 detects the spot light images on the captured image from the image sensor 51 according to the individual difference spot light position information included in the lens information from the communication unit 56. Moreover, the spot light image detection unit 62 detects (generates) spot light image information regarding the spot light images such as (spot) sizes and positions (detection light image positions) of the spot light images, and outputs the spot light image information as a detection result of the spot light images. The spot light image information output by the spot light image detection unit 62 is supplied to the feeding amount detection unit 64 that is another part of the processing unit that performs processing according to the detection result of the spot light image detection unit 62. As the spot light image information, information indirectly indicating the sizes and positions of the spot light images on the captured image (for example, an image in which the spot light images appear in a state where the sizes and positions of the spot light images on the captured image are maintained, or the like) can be adopted in addition to the information directly indicating the sizes and positions of the spot light images on the captured image (for example, the sizes and positions themselves).

The feeding amount information storage unit 63 stores feeding amount information. The feeding amount information is information in which the feeding amount of the feeding unit 23 is associated with the spot light image information regarding the spot light images when the feeding unit 23 is fed out by the feeding amount. The feeding amount information can be generated in advance and stored in the feeding amount information storage unit 63. Furthermore, the feeding amount information can be generated in advance and stored in the storage unit 41 as part of the lens information before shipping the multi-eye interchangeable lens 20 from a factory, for example. In the case where the feeding amount information is stored in the storage unit 41 as part of the lens information, the communication unit 56 communicates with the communication unit 42 to acquire the lens information stored in the storage unit 41 and supplies the feeding amount information included in the lens information to the feeding amount information storage unit 63 and stores the information therein.

The feeding amount detection unit 64 detects the feeding amount of the feeding unit 23 associated with the spot light image information from the spot light image detection unit 62 in the feeding amount information stored in the feeding amount information storage unit 63, and supplies the feeding amount to the image processing unit 53.

<Overview of Imaging Performed Using Multi-Eye Interchangeable Lens 20>

Figure 3:
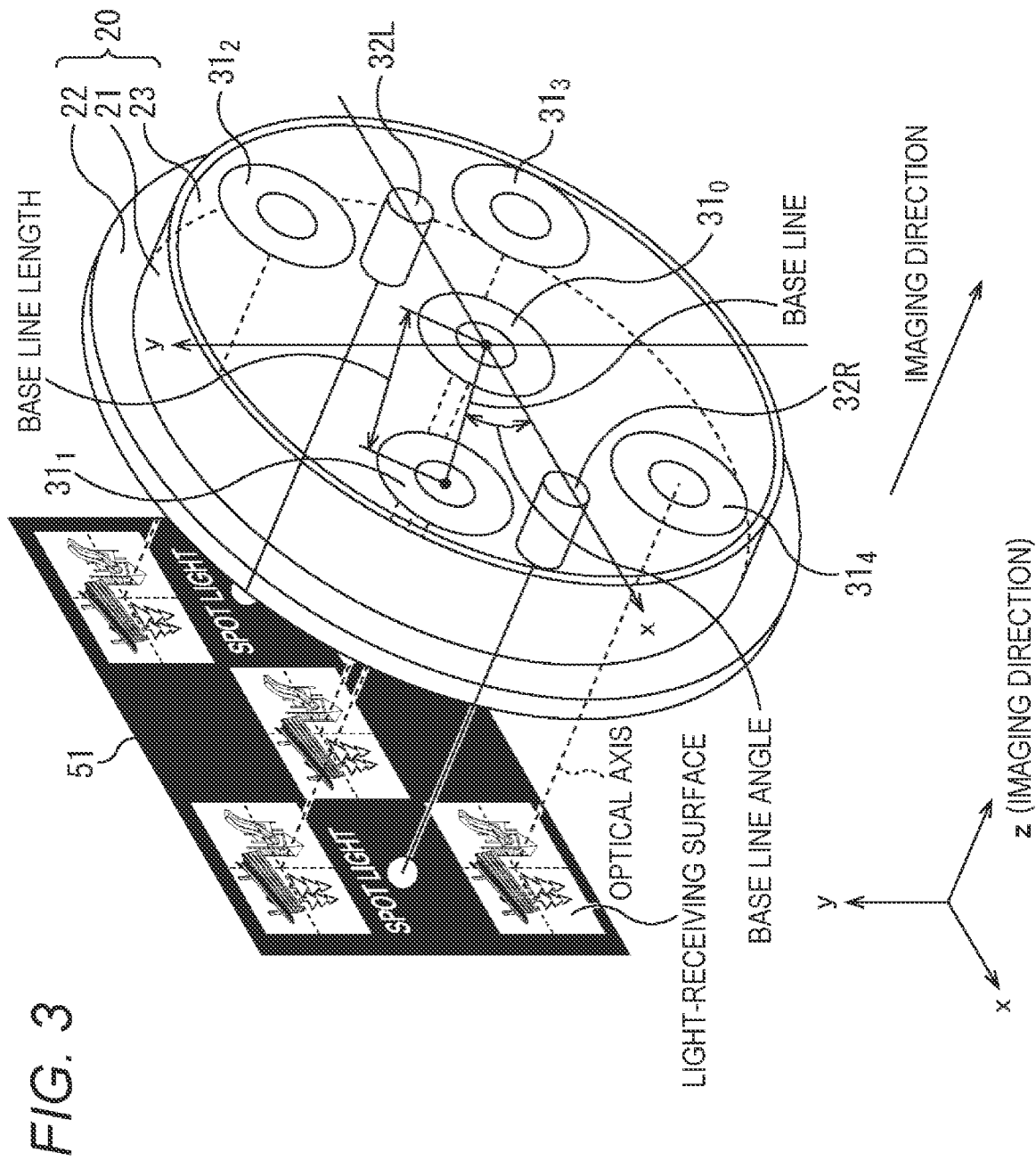
FIG. 3 is a view for describing an outline of imaging of a captured image performed using a multi-eye interchangeable lens 20.

FIG. 3 is a view for describing an outline of imaging of a captured image performed using the multi-eye interchangeable lens 20.

The image sensor 51 of the camera body 10 on which the multi-eye interchangeable lens 20 is mounted images the captured image including the individual-eye images corresponding to the images formed when the light beams are condensed by the individual-eye lenses $31_i$ and the spot light images of the spot lights emitted by the light sources 32L and 32R.

Here, in the present specification, among the optical axis directions of the individual-eye optical axes of the individual-eye lens $31_i$, a direction from the back surface side to the front surface side of the camera body 10 is defined as a z direction (axis), a direction from left to right when facing the z direction is defined as an x direction, and a direction from bottom to top is defined as a y direction.

Moreover, to match the left and right of an object appearing in an image with the left and right of the object in a real space and to match the left and right of the position of the individual-eye lens $31_i$ with the left and right of the captured image of the individual-eye image with respect to the individual-eye lens $31_i$, hereinafter, the position on the captured image, the position of the individual-eye lens $31_i$, and the right and left of the object and the like are described with reference to the z direction, that is, a state of facing an imaging direction in which the object to be captured is present from the back surface side of the camera body 10, unless otherwise specified.

Note that a straight line or a line segment connecting the individual-eye optical axes of one individual-eye lens $31_i$ and another one individual-eye lens $31_j$ ($i \neq j$) is also referred to as a base line, and a distance between the individual-eye optical axes is also referred to as a base line length. Furthermore, an angle representing the direction of the base line is also referred to as a base line angle. Here, as the base line angle, for example, an angle formed by the x axis and the base line (an angle of an epipolar line) is adopted.

Furthermore, in the present specification (and claims), the feed out of the feeding unit 23 widely means that the feeding unit 23 moves in the optical axis direction of the lens barrel optical axis. Accordingly, the feed out of the feeding unit 23 includes both the movement of the feeding unit toward the front side and the movement of the feeding unit toward the depth side.

Figure 4:
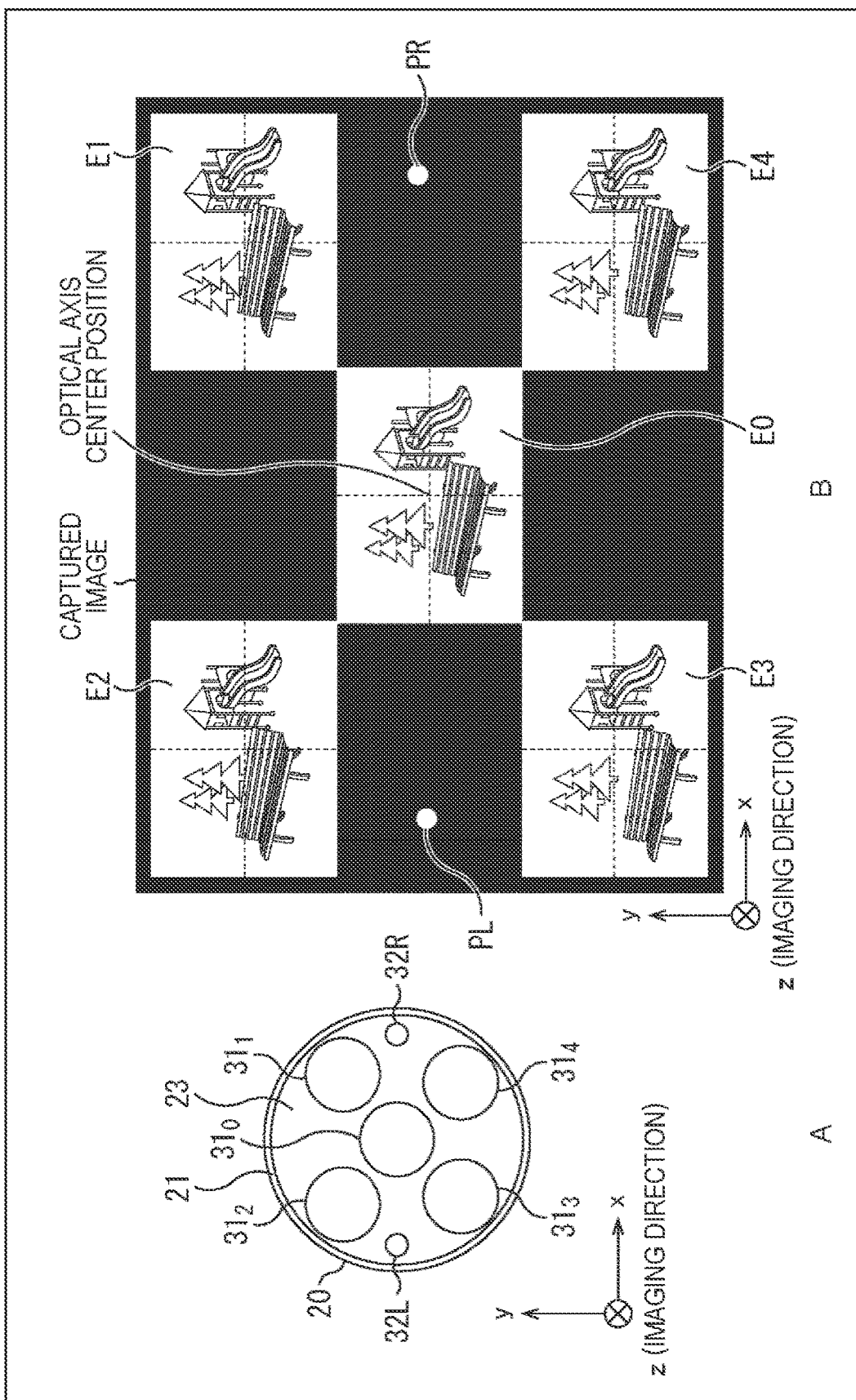
FIG. 4 is views illustrating an example of arrangement of the individual-eye lenses $31_0$ to $31_4$ and light sources 32L and 32R in the multi-eye interchangeable lens 20 and a captured image captured using the multi-eye interchangeable lens 20.

FIG. 4 is views illustrating an example of arrangement of the individual-eye lenses $31_0$ to $31_4$ and the light sources 32L and 32R in the multi-eye interchangeable lens 20 and a captured image captured using the multi-eye interchangeable lens 20.

A of FIG. 4 is a rear view illustrating an example of arrangement of the individual-eye lenses $31_0$ to $31_4$ and the light sources 32L and 32R in the multi-eye interchangeable lens 20.

In A of FIG. 4, as described in FIG. 1, the individual-eye lenses $31_0$ to $31_4$ are arranged such that the other four individual-eye lenses $31_1$ to $31_4$ configure vertices of a square centered on the individual-eye lens $31_0$ on the two-dimensional plane parallel to the light-receiving surface of the image sensor 51.

That is, in FIG. 4, for example, the individual-eye lens $31_1$ is arranged at the upper right of the individual-eye lens $31_0$ and the individual-eye lens $31_2$ is arranged at the upper left of the individual-eye lens $31_0$ with reference to the individual-eye lens $31_0$ among the individual-eye lenses $31_0$ to $31_4$. Moreover, the individual-eye lens $31_3$ is arranged at the lower left of the individual-eye lens $31_0$, and the individual-eye lens $31_4$ is arranged at the lower right of the individual-eye lens $31_0$.

Furthermore, in A of FIG. 4, the light source 32L is arranged at a left end position of the multi-eye interchangeable lens 20 having a substantially circular plane, and the light source 32R is arranged at a right end position opposite to the light source 32L with respect to the center (center) of the multi-eye interchangeable lens 20 having the substantially circular plane.

Note that the light sources 32L and 32R can be arranged at any different positions of (the feeding unit 23 of) the multi-eye interchangeable lens 20.

Note that the light sources 32L and 32R can be arranged such that spot light images PL and PR of the spot lights emitted by the respective light sources 32L and 32R on the captured image captured by the image sensor 51 are located outside the regions of the individual-eye images included in the captured image (outside the ranges irradiated with the lights passing through the individual-eye lenses $31_i$). In this case, it is possible to suppress the spot light images PL and PR overlapping with the individual-eye images to deteriorate the image quality of the individual-eye images.

B of FIG. 4 is a view illustrating an example of the captured image captured by the image sensor 51 of the camera body 10 mounted with the multi-eye interchangeable lens 20 in which the individual-eye lenses $31_0$ to $31_4$ and the light sources 32L and 32R are arranged, as illustrated in A of FIG. 4.

The captured image captured by the image sensor 51 of the camera body 10 mounted with the multi-eye interchangeable lens 20 having the individual-eye lenses $31_0$ to $31_4$ and the light sources 32L and 32R includes individual-eye images E0, E1, E2, E3, and E4 corresponding to the images formed by the light beams respectively condensed by the individual-eye lenses $31_0$ to $31_4$ and the spot light images PL and PR of the spot lights of the respective light sources 32L and 32R.

The region specifying unit 52 (FIG. 2) specifies, as a region of an individual-eye image E #i for each individual-eye lens $31_i$, a rectangular region having a predetermined size centered on the optical axis center position that is the mount error reflection position information of the individual-eye image E #i, of a region on the captured image irradiated with the light beam having passed through the individual-eye lens $31_i$ on the basis of the optical axis center position as the mount error reflection position information of each individual-eye image E #i obtained in the position calculation unit 57.

Thereby, the individual-eye image E #i for the individual-eye lens $31_i$ becomes an image similar to a captured image obtained by performing imaging using an independent camera or an independent image sensor from the position of the individual-eye lens $31_i$, that is, an image obtained by imaging having the viewpoint at the position of the individual-eye lens $31_i$.

Therefore, a parallax occurs between any two of the individual-eye images E #i and E #j among the individual-eye images E0 to E4 for the respective individual-eye lenses $31_0$ to $31_4$. That is, the same object captured in the individual-eye images E #i and E #j appears at positions shifted according to the parallax.

<Attachment Error of Multi-Eye Interchangeable Lens 20>

Figure 5:
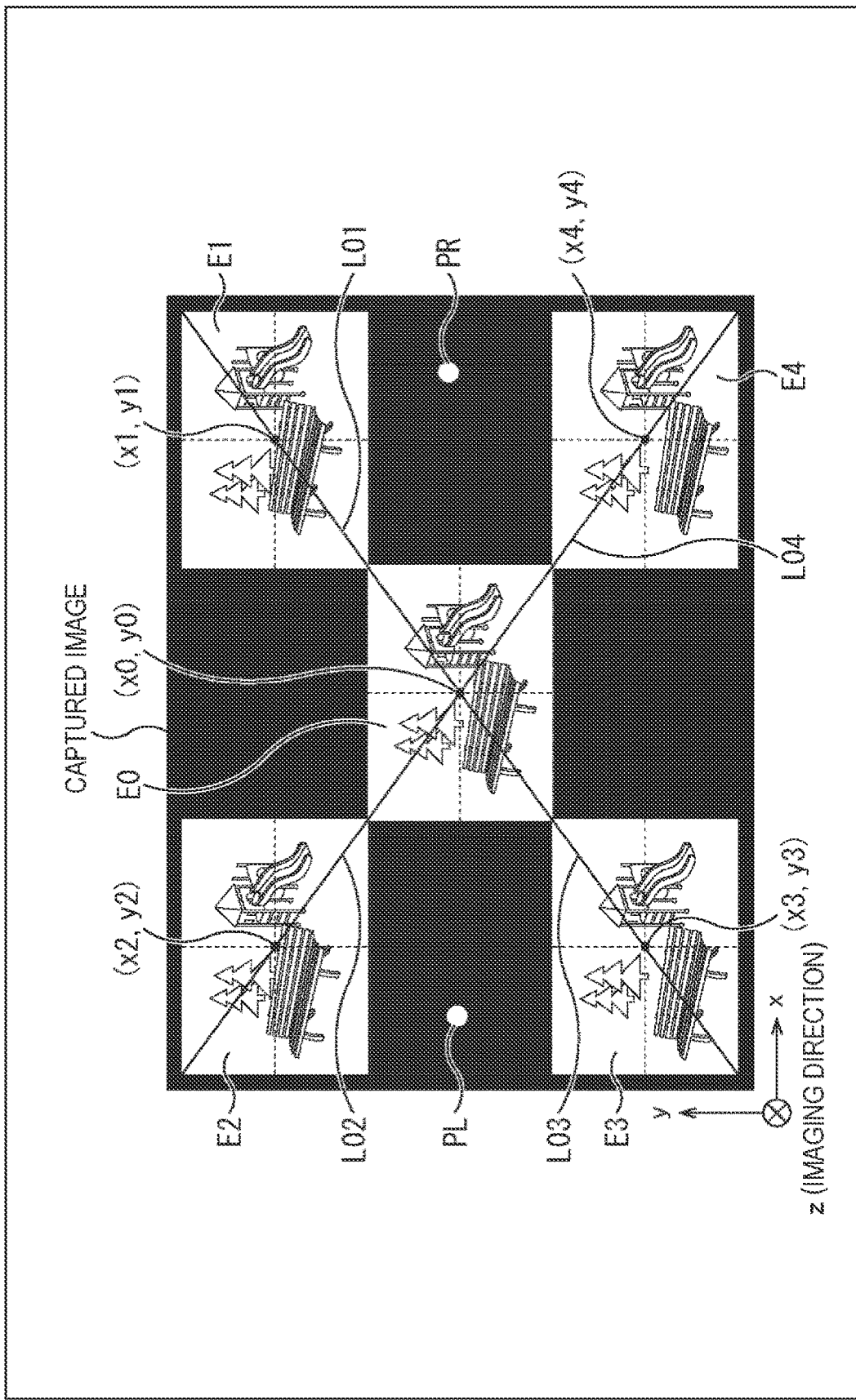
FIG. 5 is a view for describing an attachment error when the multi-eye interchangeable lens 20 is attached (mounted) to a camera body 10.

FIG. 5 is a view for describing the attachment error when the multi-eye interchangeable lens 20 is attached (mounted) to the camera body 10.

That is, FIG. 5 illustrates an example of the captured image captured by the camera system 1 in which the multi-eye interchangeable lens 20 is attached to the camera body 10.

In the case where the multi-eye interchangeable lens 20 is attached to the camera body 10, the attachment position of the multi-eye interchangeable lens 20 with respect to the light-receiving surface of the image sensor 51 of the camera body 10 can be shifted in particular in a rotation direction mainly among a horizontal direction (x direction), a vertical direction (y direction), and the rotation direction. First, the attachment position of the multi-eye interchangeable lens is shifted by an amount different for each individual due to the manufacturing error. Moreover, the attachment position of the multi-eye interchangeable lens 20 changes when the multi-eye interchangeable lens 20 is attached to the camera body 10 or when an impact is applied to the camera system 1 having the multi-eye interchangeable lens attached to the camera body 10 when using the multi-eye interchangeable lens 20.

Now, for example, an error of an actual attachment position with respect to a predetermined position such as a design attachment position of the multi-eye interchangeable lens 20 is referred to as the attachment error. The attachment error with reference to the design attachment position is caused by the manufacturing variation or the like, and changes when the multi-eye interchangeable lens 20 is attached to the camera body 10 or when an impact is applied to the camera system 1 having the multi-eye interchangeable lens 20 attached to the camera body 10.

The attachment error is the error of the actual attachment position of the multi-eye interchangeable lens 20, and appropriately includes the manufacturing error and the mount error. For example, in a case where the design attachment position of the multi-eye interchangeable lens 20 is used as a reference, the attachment error includes both the manufacturing error and the mount error. Furthermore, for example, in a case where a position shifted from the design attachment position of the multi-eye interchangeable lens 20 by the manufacturing error is used as a reference, the attachment error does not include the manufacturing error and does include the mount error.

As described with reference to FIG. 4, the individual-eye image E #i is an image similar to an image obtained by imaging having the viewpoint at the position of the individual-eye lens $31_i$, and thus the individual-eye images E0 to E4 are images with different viewpoints.

In a case of obtaining the parallax information using, for example, the individual-eye images E0 to E4 that are the images with different viewpoints, the base line length and the base line angle described in FIG. 3 are required for the individual-eye lenses $31_0$ to $31_4$.

Since the individual-eye lenses $31_0$ to $31_4$ are fixed to the multi-eye interchangeable lens 20, the base line length is a fixed value that does not change due to the mount error and can be measured in advance after manufacturing the multi-eye interchangeable lens 20.

Meanwhile, the base line angle changes due to the attachment error (mount error) in the rotation direction of the multi-eye interchangeable lens 20. Therefore, to obtain accurate parallax information using the individual-eye images E0 to E4, it is necessary to treat the attachment error in the rotation direction.

Here, the attachment errors in the horizontal direction and the vertical direction are not problematic in a case where image distortion caused by a lens aberration of the individual-eye lens $31_i$ is small and can be ignored in some cases. However, in a case where the image distortion caused by the lens aberration is large and distortion correction for the image distortion is required, the optical axis center position of the individual-eye image E #i needs to be accurately grasped in order to perform appropriate distortion correction. To accurately grasp the optical axis center position of the individual-eye image E #i, the attachment errors (mount errors) in the horizontal direction and the vertical direction need to be grasped.

Now, as illustrated in FIG. 5, in a certain xy coordinate system (two-dimensional coordinate system), (coordinates of) the optical axis center positions of the individual-eye images E0 to E4 are expressed as (x0, y0), (x1, y1), (x2, y2), (x3, y3), and (x4, y4).

Furthermore, the individual-eye image E0 for the individual-eye lens $31_0$ located in the center (center) is referred to as the central image E0, and the individual-eye images E1 to E4 for the individual-eye lenses $31_1$ to $31_4$ located in the periphery are referred to as the peripheral images E1 to E4, among the individual-eye lenses $31_0$ to $31_4$.

Relative optical axis center positions of the peripheral images E1 to E4 (hereinafter also referred to as relative optical axis center positions) (dx1, dy1), (dx2, dy2), (dx3, dy3), and (dx4, dy4) with reference to one individual-eye image, that is, for example, the central image E0, of the individual-eye images E0 to E4, can be obtained according to the equations (1).

[Math. 1]

$$(dx1, dy1) = (x1-x0, y1-y0)$$

$$(dx2, dy2) = (x2-x0, y2-y0)$$

$$(dx3, dy3) = (x3-x0, y3-y0)$$

$$(dx4, dy4) = (x4-x0, y4-y0) \quad (1)$$

The relative optical axis center positions (dx1, dy1), (dx2, dy2), (dx3, dy3), and (dx4, dy4) are equal to the optical axis center positions (x1, y1), (x2, y2), (x3, y3), and (x4, y4) of the peripheral images E1 to E4 in a case where the optical axis center position (x0, y0) of the central image E0 is set as the origin of the xy coordinate system.

The relative optical axis center position (dx#i, dy#i) (where i=1, 2, 3, 4) can be regarded as a vector in a direction of the base line connecting the optical axis center position (x0, y0) of the central image E0 and the optical axis center position (x#i, y#i) of the peripheral image E #i. According to the relative optical axis center position (dx#i, dy#i), the base line angle ($\tan^{-1}((y\#i-y0)/(x\#i-x0)) = \tan^{-1}(dy\#i/dx\#i)$) representing the direction of the base line L0 #i connecting the optical axis center position (x0, y0) of the central image E0 and the optical axis center position (x#i, y#i) of the peripheral image E #i can be obtained.

Therefore, if the relative optical axis center position (dx#i, dy#i) can be obtained, the base line angle representing the direction of the base line L0 #i at that time can be obtained, and the accurate parallax information not affected by the attachment error in the rotation direction can be obtained using the base line angle.

In the present technology, the optical axis center positions (x0, y0) to (x4, y4) of the respective individual-eye images E0 to E4 on the known captured image in which a predetermined object located at a known distance appears, the known captured image being captured by the image sensor 51, are obtained, that is, in the case where the optical axis center position (x0, y0) of the central image E0 is set as the origin, the relative optical axis center positions (dx1, dy1) to (dx4, dy4) of the respective individual-eye images E1 to E4 are obtained, as the individual difference reflection position information. Furthermore, in the present technology, the optical axis center positions (x0', y0') to (x4', y4') of the respective individual-eye images E0 to E4 on the captured image at the time of imaging the captured image are obtained using the individual difference reflection position information ((x0, y0) to (x4, y4) or (dx1, dy1) to (dx4, dy4)) and the captured image, that is, in the case where the optical axis center position (x0', y0') of the central image E0 is set as the origin, the relative optical axis center positions (dx1', dy1') to (dx4', dy4') of the respective individual-eye images E1 to E4 are obtained, as the mount error reflection position information.

If the relative optical axis center positions (dx1', dy1') to (dx4', dy4') of the respective individual-eye images E1 to E4 on the captured image as the mount error reflection position information are obtained, the base line angle at the time of imaging the captured image can be obtained, and the accurate parallax information not affected by the attachment error in the rotation direction can be obtained using the base line angle.

The position calculation unit 57 in FIG. 2 obtains the relative optical axis center positions (dx1', dy1') to (dx4', dy4') of the respective individual-eye images E1 to E4 on the captured image as the mount error reflection position information, using the relative optical axis center positions (dx1, dy1) to (dx4, dy4) as the individual difference reflection position information.

<Calculation Method of Obtaining Relative Optical Axis Center Position (dx#i', dy#i') of Individual-Eye Image E #i on Captured Image as Mount Error Reflection Position Information>

Figure 6:
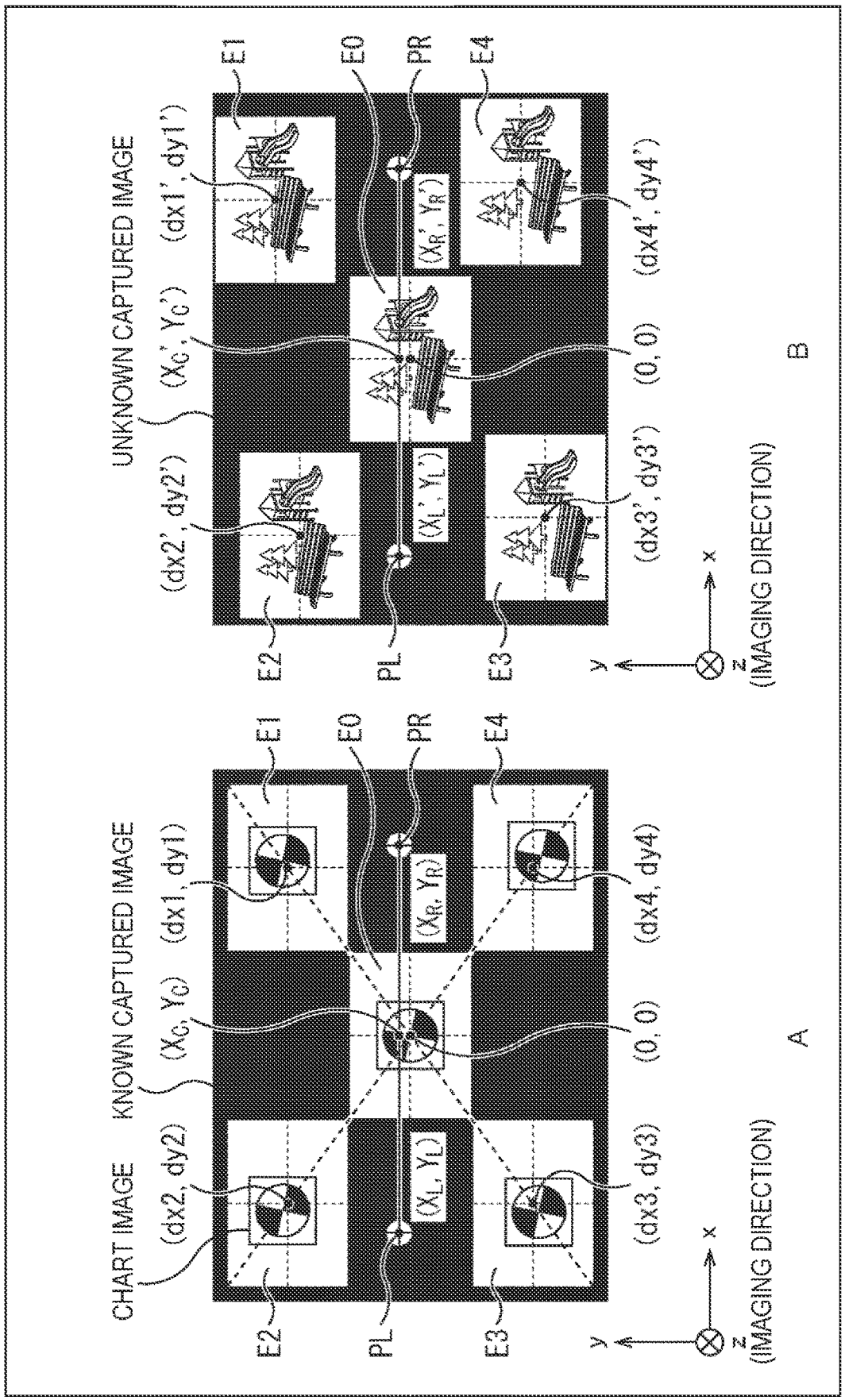
FIG. 6 is views for describing a calculation method of obtaining relative optical axis center positions (dx1', dy1') to (dx4', dy4') as mount error reflection position information.

FIG. 6 is views for describing a calculation method of obtaining relative optical axis center positions (dx1', dy1') to (dx4', dy4') as mount error reflection position information.

Hereinafter, to simplify the description, the xy coordinate system having the optical axis center position (x0, y0) of the central image E0 as the origin is adopted. In this case, as described above, the relative optical axis center positions (dx1, dy1), (dx2, dy2), (dx3, dy3), and (dx4, dy4) are equal to the optical axis center positions (x1, y1), (x2, y2), (x3, y3), and (x4, y4).

A of FIG. 6 illustrates an example of the known captured image obtained by imaging a predetermined object in the camera system 1 in which the multi-eye interchangeable lens 20 is attached to the camera body 10.

The object appearing in the known captured image is, for example, a chart image in which a predetermined chart such as a circle divided into four equal parts by line segments passing through the center of the circle is drawn. The known captured image is captured by arranging the chart image at a position of a known distance on the individual-eye optical axis of the individual-eye lens $31_0$ such that the center of the circle as the chart of the chart image appears, for example, at a predetermined point on the central image E0, that is, for example, the optical axis center position (x0, y0)=(0, 0) of the central image E0. Therefore, the known captured image is an image obtained by imaging the chart image in which a predetermined chart is drawn at a known distance.

Since the known captured image is captured as described above, the chart image having the center of the circle as the chart located at the optical axis center position (x0, y0)=(0, 0) appears in the central image E0 on the known captured image. Furthermore, similarly to the central image E0, the chart image appears in the peripheral image E #i. Note that, in the peripheral image E #i, the position of the circle as the chart is shifted from the position of the circle as the chart appearing in the central image E0 according to the parallax with the central image E0.

Therefore, in the central image E0 on the known captured image, the center of the circle as the chart is located at the optical axis center position (x0, y0)=(0, 0), but in the peripheral image E #i, the center of the circle as the chart is shifted from the optical axis center position (x#i, y#i) according to the parallax with the central image E0.

Since the chart image is placed at a known distance, the parallax between the peripheral image E #i and the central image E0 can be obtained from the known distance and the base line length and the base line angle between the individual-eye lens $31_i$ and the individual-eye lens $31_0$ of when the known captured image is captured.

Here, the imaging of the known captured image can be performed, for example, before shipping the multi-eye interchangeable lens 20 from the factory. Therefore, the base line angle at the time of imaging the known captured image can be measured at the time of imaging the known captured image. Alternatively, the attachment (fixation) of the individual-eye lens $31_i$ to the lens barrel 21 can be adjusted at the time of imaging the known captured image such that the base line angle becomes a predetermined value such as a design value.

Since the optical axis center position (x#i, y#i) of the peripheral image E #i is a position moved from the center of the circle as the chart appearing in the peripheral image E #i according to the parallax with the central image E0, the optical axis center position can be obtained from the position of the center of the circle as the chart appearing in the peripheral image E #i and the parallax with the central image E0.

Furthermore, since the center of the circle as the chart of the chart image appears at the optical axis center position (x0, y0) (=(0, 0)) of the central image E0 on the known captured image, the optical axis center position (x0, y0) of the central image E0 can be obtained by detecting the position of the center of the circle as the chart from the central image E0.

As described above, the optical axis center position (x0, y0) of the central image E0 and the optical axis center positions (x1, y1) to (x4, y4) of the peripheral images E1 to E4 on the known captured image can be obtained from the known captured image.

According to the individual difference reflection position information that is the optical axis center position (x0, y0) of the central image E0 on the known captured image and the individual difference reflection position information that is the optical axis center position (x#i, y#i) of the peripheral image E #i, the relative optical axis center position (dx#i, dy#i) as individual difference reflection relative position information that is the relative individual difference reflection position information of the peripheral image E #i with reference to the individual difference reflection position information (x0, y0) of the central image E0 can be obtained, and the relative optical axis center position (dx#i, dy#i) as the individual difference reflection relative position information is stored in the storage unit 41 of FIG. 2 as the lens information. Here, the individual difference reflection position information (x#i, y#i) is also referred to as individual difference reflection absolute position information in contrast with the individual difference reflection relative position information (dx#i, dy#i).

Note that as the lens information, the individual difference reflection absolute position information (optical axis center position) (x#i, y#i) (i=0, 1, 2, 3, 4) can be adopted, in addition to adopting the individual difference reflection relative position information (relative optical axis center position) (dx#i, dy#i) (i=1, 2, 3, 4). This is because the individual difference reflection relative position information (dx#i, dy#i) can be obtained from the individual difference reflection absolute position information (x#i, y#i) according to the equations (1), and is (substantially) equivalent information to the individual difference reflection absolute position information (x#i, y#i).

In obtaining the relative optical axis center positions (dx1', dy1') to (dx4', dy4') as the mount error reflection position information, the individual difference spot light position information $(X_L, Y_L)$ and $(X_R, Y_R)$ that is the positions of the spot light images PL and PR of the spot lights of the respective light sources 32L and 32R on the known captured image is obtained in advance in addition to the individual difference reflection relative position information (dx#i, dy#i) (or the individual difference reflection absolute position information (x#i, y#i)).

For example, the position of the center of gravity of the spot light image PL on the known captured image can be adopted as the individual difference spot light position information $(X_L, Y_L)$ of the spot light image PL. Similarly, the position of the center of gravity of the spot light image PR on the known captured image can be adopted as the individual difference spot light position information $(X_R, Y_R)$ of the spot light image PR.

As for the individual difference spot light position information $(X_L, Y_L)$ and $(X_R, Y_R)$, a midpoint $(X_C, Y_C)$ of the individual difference spot light position information $(X_L, Y_L)$ and $(X_R, Y_R)$ is obtained, and the individual difference spot light position information $(X_L, Y_L)$ and $(X_R, Y_R)$ and the midpoint $(X_C, Y_C)$ are stored in the storage unit 41 of FIG. 2 as the lens information.

Note that the midpoint $(X_C, Y_C)$ between the individual difference spot light position information $(X_L, Y_L)$ and the $(X_R, Y_R)$ can be excluded from the lens information. This is because the midpoint $(X_C, Y_C)$ of the individual difference spot light position information $(X_L, Y_L)$ and $(X_R, Y_R)$ can be obtained from the individual difference spot light position information $(X_L, Y_L)$ and $(X_R, Y_R)$.

The position calculation unit 57 obtains (relative) optical axis center positions (dx1', dy1') to (dx4', dy4') as the mount error reflection position information on an unknown captured image according to the relative optical axis center positions (hereinafter also simply referred to as the optical axis center position) (dx#i, dy#i) and the individual difference spot light position information $(X_L, Y_L)$ and $(X_R, Y_R)$ as the individual difference reflection relative position information (hereinafter also simply referred to as individual difference reflection position information).

B of FIG. 6 illustrates an example of the unknown captured image captured in the camera system 1 in which the multi-eye interchangeable lens 20 is attached to the camera body 10.

The unknown captured image is an image captured without restrictions (restrictions such as the distance of the object being known) of when the known captured image is captured in the camera system 1 in which the multi-eye interchangeable lens 20 is attached to the camera body 10.

At the time of imaging the unknown captured image, the attachment error (mount error) in the rotation direction different from that at the time of imaging the known captured image may occur.

In the xy coordinate system having the optical axis center position (x0', y0') of the central image E0 on the unknown captured image as the origin (0, 0), the optical axis center position (x#i', y#i') (i=1, 2, 3, 4) of the peripheral image E #i on the unknown captured image is equal to the relative optical axis center position (dx#i', dy#i')=(x#i', y#i')−(x0', y0') of the peripheral image E #i with reference to the optical axis center position (x0', y0') of the central image E0.

Here, the position information regarding the positions of the spot light images PL and PR of the spot lights of the respective light sources 32L and 32R on the unknown captured image is also referred to as mount error spot light position information (unknown light position). The mount error spot light position information is position information including the manufacturing error and the mount error of the multi-eye interchangeable lens 20, similarly to the mount error reflection position information. As the mount error spot light position information, the positions themselves of the spot light images PL and PR of the spot lights of the respective light sources 32L and 32R on the unknown captured image can be adopted. Note that the positions of the spot light images PL and PR of the spot lights of the respective light sources 32L and 32R on the unknown captured image are expressed as ($X_L'$, $Y_L'$) and ($X_R'$, $Y_R'$), respectively.

The mount error spot light position information ($X_L'$, $Y_L'$) and ($X_R'$, $Y_R'$) can be obtained from the spot light images PL and PR on the unknown captured image, similarly to the individual difference spot light position information ($X_L$, $Y_L$) and ($X_R$, $Y_R$).

Furthermore, the midpoint between the mount error spot light position information ($X_L'$, $Y_L'$) and ($X_R'$, $Y_R'$) is expressed as ($X_C'$, $Y_C'$).

Now, assuming that a relative rotation error that is the attachment error in the rotation direction at the time of imaging the unknown captured image with reference to the attachment error in the rotation direction at the time of imaging the known captured image is expressed as $\theta_{Error}$, the relative rotation error $\theta_{Error}$ can be obtained according to the equation (2) using the individual difference spot light position information ($X_L$, $Y_L$) and ($X_R$, $Y_R$) included in the lens information and the mount error spot light position information ($X_L'$, $Y_L'$) and ($X_R'$, $Y_R'$) obtained from the unknown captured image.

[Math. 2]

$$\theta_{Error} = \mathrm{atan}\frac{Y_R' - Y_L'}{X_R' - X_L'} - \mathrm{atan}\frac{Y_R - Y_L}{X_R - X_L} \quad \text{(Note that } X_R > X_L, X_R' > X_L'\text{)} \quad (2)$$

According to the equation (2), the relative rotation error $\theta_{Error}$ is an angle representing a direction of a straight line connecting the mount error spot light position information ($X_L'$, $Y_L'$) and ($X_R'$, $Y_R'$) with reference to an angle representing a direction of a straight line connecting the individual difference spot light position information ($X_L$, $Y_L$) and ($X_R$, $Y_R$), and the more apart the individual difference spot light position information ($X_L$, $Y_L$) and ($X_R$, $Y_R$) (the more apart the mount error spot light position information ($X_L'$, $Y_L'$) and ($X_R'$, $Y_R'$)), the higher the accuracy. Therefore, by arranging the light sources 32L and 32R as far apart as possible, the relative rotation error $\theta_{Error}$ can be accurately obtained.

Note that, in a case where three or more light sources are provided in the multi-eye interchangeable lens 20, the rotation error $\theta_{Error}$ is obtained for each pair of two light sources obtained from the three or more light sources according to the equation (2), and an average value of the rotation errors $\theta_{Error}$ obtained for the respective pairs can be adopted as the final rotation error $\theta_{Error}$.

The relative rotation error $\theta_{Error}$ is a rotation angle between the mount error spot light position information ($X_L'$, $Y_L'$) (or ($X_R'$, $Y_R'$)) and the individual difference spot light position information ($X_L$, $Y_L$) (or ($X_R$, $Y_R$)). By rotating the optical axis center position (dx#i, dy#i) as the individual difference reflection relative position information according to the relative rotation error $\theta_{Error}$ according to the equations (3), the relative optical axis center position (dx#i', dy#i') as the mount error reflection position information on the unknown captured image caused by the relative rotation error $\theta_{Error}$ can be obtained,

[Math. 3]

$$\begin{pmatrix} dx1' \\ dy1' \end{pmatrix} = \begin{pmatrix} \cos\theta\ \text{Error} & -\sin\theta\ \text{Error} \\ \sin\theta\ \text{Error} & \cos\theta\ \text{Error} \end{pmatrix}\begin{pmatrix} dx1 \\ dy1 \end{pmatrix} \quad (3)$$

$$\begin{pmatrix} dx2' \\ dy2' \end{pmatrix} = \begin{pmatrix} \cos\theta\ \text{Error} & -\sin\theta\ \text{Error} \\ \sin\theta\ \text{Error} & \cos\theta\ \text{Error} \end{pmatrix}\begin{pmatrix} dx2 \\ dy2 \end{pmatrix}$$

$$\begin{pmatrix} dx3' \\ dy3' \end{pmatrix} = \begin{pmatrix} \cos\theta\ \text{Error} & -\sin\theta\ \text{Error} \\ \sin\theta\ \text{Error} & \cos\theta\ \text{Error} \end{pmatrix}\begin{pmatrix} dx3 \\ dy3 \end{pmatrix}$$

$$\begin{pmatrix} dx4' \\ dy4' \end{pmatrix} = \begin{pmatrix} \cos\theta\ \text{Error} & -\sin\theta\ \text{Error} \\ \sin\theta\ \text{Error} & \cos\theta\ \text{Error} \end{pmatrix}\begin{pmatrix} dx4 \\ dy4 \end{pmatrix}$$

In the case of obtaining the optical axis center positions (dx1', dy1') to (dx4', dy4') of the respective individual-eye images E1 to E4 on the unknown captured image as the mount error reflection position information according to the equations (2) and (3), the attachment errors in the horizontal direction and the vertical direction can be obtained by obtaining a translation amount between the mount error spot light position information ($X_L'$, $Y_L'$) and ($X_R'$, $Y_R'$) of the spot light images PL and PR of the respective light sources 32L and 32R on the unknown captured image, and the individual difference spot light position information ($X_L$, $Y_L$) and ($X_R$, $Y_R$) of the spot light images PL and PR of the respective light sources 32L and 32R on the known captured image.

That is, the attachment error $X_{Error}$ in the horizontal direction and the attachment error $Y_{Error}$ in the vertical direction can be obtained according to the equations (4), for example.

[Math. 4]

$$X\text{Error} = X_C' - X_C = \frac{X_L' + X_R'}{2} - \frac{X_L + X_R}{2} \quad (4)$$

$$Y\text{Error} = Y_C' - Y_C = \frac{Y_L' + Y_R'}{2} - \frac{Y_L + Y_R}{2}$$

Note that, in the equations (4), the translation amount between the midpoint ($X_C'$, $Y_C'$) of the mount error spot light position information ($X_L'$, $Y_L'$) and ($X_R'$, $Y_R'$) of the spot light images PL and PR of the respective light sources 32L and 32R on the unknown captured image and the midpoint ($X_C$, $Y_C$) of the individual difference spot light position information ($X_L$, $Y_L$) and ($X_R$, $Y_R$) of the spot light images PL and PR of the respective light sources 32L and 32R on the known captured image is obtained as the attachment error $X_{Error}$ in the horizontal direction and the attachment error $Y_{Error}$ in the vertical direction. Alternatively, for example, as the attachment error(Error in the horizontal direction and the attachment error $Y_{Error}$ in the vertical direction, the translation amount between the mount error spot light position information ($X_L'$, $Y_L'$) and the individual difference spot light position information ($X_L$, $Y_L$), or the translation amount between the mount error spot light position information ($X_R'$, $Y_R'$) and the individual difference spot light position information ($X_R$, $Y_R$) can be obtained.

In the camera system 1, in obtaining the optical axis center positions (dx1', dy1') to (dx4', dy4') of the respective individual-eye images E1 to E4 on the unknown captured image as the mount error reflection position information, first, processing of acquiring the individual difference reflection position information and the like of acquiring the optical axis center position (dx#i, dy#i) and the like as the individual difference reflection relative position information necessary in the case of obtaining the optical axis center position (dx#i', dy#i') is performed.

The processing of acquiring the individual difference reflection position information and the like can be performed by the camera body 10, a computer to be described below, or the like. A device that performs the processing of acquiring the individual difference reflection position information and the like is referred to as an acquisition processing device for convenience.

The acquisition processing device acquires the known captured image obtained by imaging the chart image as a predetermined object placed at a position of a known distance on the individual-eye optical axis of the individual-eye lens $31_0$ by the camera system 1 in which the multi-eye interchangeable lens 20 is attached to the camera body 10.

The acquisition processing device obtains a predetermined point of the chart image as a predetermined object appearing in each individual-eye image E #i included in the known captured image, for example, the position of the center of the circle as the chart.

The acquisition processing device obtains, for each of the individual-eye images (peripheral images) E1 to E4, a parallax of the center of the circle as a predetermined point of the chart image as the object appearing in the individual-eye image E #i with the center of the circle as a predetermined point of the chart image as the object appearing in the individual-eye image (central image) E0, using the distance to the chart image as the object, and the base line length and the base line angle of the multi-eye interchangeable lens 20.

Moreover, the acquisition processing device obtains, for each of the individual-eye images E1 to E4, the optical axis center position (the position on the known captured image) (x#i, y#i) of the individual-eye image E #i located at a position moved from the position of the center of the circle according to the parallax of the center of the circle as a predetermined point of the chart image as the object appearing in the individual-eye image E #i, as the individual difference reflection absolute position information (x#i, y#i) of the individual-eye image E #i. Furthermore, the acquisition processing device obtains the optical axis center position (x0, y0) that is the position of the center of the circle of the chart image as the object appearing in the individual-eye image E0 as the individual difference reflection absolute position information (x0, y0) of the individual-eye image E0.

Then, the acquisition processing device obtains, for each of the individual-eye images E1 to E4, the individual difference reflection relative position information (dx#i, dy#i) of the individual-eye image E #i with reference to the individual difference reflection absolute position information (x0, y0) of the individual-eye image E0 according to the equations (1), using the individual difference reflection absolute position information (x#i, y#i).

Moreover, the acquisition processing device obtains the positions of the centers of gravity of the spot light images PL and PR of the spot lights of the light sources 32L and 32R on the known captured image as the individual difference spot light position information $(X_L, Y_L)$ and $(X_R, Y_R)$, respectively.

The individual difference reflection relative position information (dx#i, dy#i) and the individual difference spot light position information $(X_L, Y_L)$ and $(X_R, Y_R)$ obtained in the above processing of acquiring the individual difference reflection position information and the like are stored in the storage unit 41 of FIG. 2 as part of the lens information.

At the time of using the camera system 1 having the multi-eye interchangeable lens 20 mounted on the camera body, mount error reflection position information calculation processing of obtaining the relative optical axis center positions (dx1', dy1') to (dx4', dy4') of the respective individual-eye images E1 to E4 on the unknown captured image and the like as the mount error reflection position information is performed in the camera body 10, using the individual difference reflection relative position information (dx#i, dy#i) and the individual difference spot light position information $(X_L, Y_L)$ and $(X_R, Y_R)$.

That is, in the camera body 10 (FIG. 2), when the multi-eye interchangeable lens 20 is mounted, the communication unit 56 communicates with the communication unit 42 of the multi-eye interchangeable lens 20, receives the lens information of the multi-eye interchangeable lens 20 transmitted from the communication unit 42, and supplies the lens information to the position calculation unit 57. The position calculation unit 57 acquires the lens information supplied from the communication unit 56 as described above.

The position calculation unit 57 waits for the unknown captured image to be captured, which is the captured image in which an arbitrary object appears, and acquires the unknown captured image. That is, in the camera system 1 having the multi-eye interchangeable lens attached to the camera body 10, the position calculation unit 57 acquires the captured image captured by the image sensor 51 as the unknown captured image.

The position calculation unit 57 detects the spot light images PL and PR of the spot lights of the light sources 32L and 32R included in the unknown captured image, and further detects the respective positions (detection light image positions) of the spot light images PL and PR, for example, the positions of the centers of gravity, as the mount error spot light position information $(X_L', Y_L')$ and $(X_R', Y_R')$. The position calculation unit 57 is a part of the processing unit that performs processing according to detection results of the spot light images PL and PR, and specifies the imaging individual-eye image position that is the position of the individual-eye image in the unknown captured image according to the mount error spot light position information $(X_L', Y_L')$ and $(X_R', Y_R')$ as the detection results of the spot light images PL and PR.

That is, the position calculation unit 57 specifies (calculates) the imaging individual-eye image position on the basis of the (positional) relationship between the mount error spot light position information $(X_L', Y_L')$ (or $(X_R', Y_R')$) (detection light image position) and the individual difference spot light position information $(X_L, Y_L)$ (or $(X_R, Y_R)$) (storage light image positions indicating the positions of the spot light images PL and PR of the spot lights of the light sources 32L and 32R emitted to the image sensor 51) included in the lens information.

For example, the position calculation unit 57 specifies the imaging individual-eye image position, that is, the (relative) optical axis center position (dx#i', dy#i') as the mount error reflection position information of each of the individual-eye images E1 to E4 included in the unknown captured image by correcting the relative optical axis center position (dx#i, dy#i) (the storage individual-eye image position indicating the emission position of each imaging light emitted from each of the plurality of individual-eye lenses $31_i$ in the image sensor 51) as the individual difference reflection relative position information included in the lens information on the basis of the (positional) relationship between the mount error spot light position information $(X_L', Y_L')$ (or $(X_R', Y_R')$) (detection light image position) and the individual difference spot light position information $(X_L, Y_L)$ (or $(X_R, Y_R)$) (storage light image position).

Specifically, first, the position calculation unit 57 obtains the rotation angle between the mount error spot light position information $(X_L', Y_L')$ (or $(X_R', Y_R')$) and the individual difference spot light position information $(X_L, Y_L)$ (or $(X_R, Y_R)$) included in the lens information as the (relative) rotation error $\theta_{Error}$.

For example, the position calculation unit 57 obtains the relative angle representing a direction of a line segment connecting the mount error spot light position information $(X_L', Y_L')$ and $(X_R', Y_R')$ with reference to a direction of a line segment connecting the individual difference spot light position information $(X_L, Y_L)$ and $(X_R, Y_R)$ included in the lens information, as the rotation error $\theta_{Error}$ according to the equation (2).

The position calculation unit 57 obtains, according to the equations (3), the (relative) optical axis center position (dx#i', dy#i') as the mount error reflection position information of each of the individual-eye images E1 to E4 included in the unknown captured image where the rotation error $\theta_{Error}$ has occurred by rotating the relative optical axis center position (dx#i, dy#i) as the individual difference reflection relative position information included in the lens information according to the rotation error $\theta_{Error}$ obtained according to the equation (2).

Moreover, the position calculation unit 57 obtains the translation amount between the individual difference spot light position information $(X_L, Y_L)$ or $(X_R, Y_R)$ included in the lens information, and the mount error spot light position information $(X_L', Y_L')$ or $(X_R', Y_R')$ of the spot light images PL and PR of the light sources 32L and 32R on the unknown captured image as the attachment error $X_{Error}$ in the horizontal direction and the attachment error $Y_{Error}$ in the vertical direction, as needed.

That is, for example, the position calculation unit 57 obtains the translation amount of the midpoint $(X_C', Y_C')$ of the mount error spot light position information $(X_L', Y_L')$ and $(X_R', Y_R')$ with respect to the midpoint $(X_C, Y_C)$ of the individual difference spot light position information $(X_L, Y_L)$ and $(X_R, Y_R)$, as the attachment error $X_{Error}$ in the horizontal direction and the attachment error $Y_{Error}$ in the vertical direction according to the equations (4), for example.

In the camera body (FIG. 2), the region specifying unit 52 can perform region specifying processing of specifying the regions of the individual-eye images E #i on the unknown captured image, using the relative optical axis center positions (dx1', dy1') to (dx4', dy4') of the individual-eye images E1 to E4 on the unknown captured image as the mount error reflection position information obtained in the above mount error reflection position information calculation processing.

In the region specifying processing, the region specifying unit 52 acquires the relative optical axis center positions (dx#i', dy#i') as the mount error reflection position information of the individual-eye images E1 to E4 included in the unknown captured image supplied from the position calculation unit 57.

Then, the region specifying unit 52 specifies the regions of the individual-eye images E1 to E4 on the unknown captured image according to the optical axis center positions (dx#i', dy#i') as the mount error reflection position information. That is, the region specifying unit 52 specifies a rectangular region having a predetermined size centered on the mount error reflection position information (dx#i', dy#i') on the unknown captured image, as the region of the individual-eye image E #i (i=1, 2, 3, 4), on the xy coordinate system of when obtaining the individual difference reflection relative position information (dx#i, dy#i), for example. Moreover, the region specifying unit 52 specifies a rectangular region having a predetermined size centered on the origin on the unknown captured image, as the region of the individual-eye image E0.

Thereafter, the region specifying unit 52 extracts the individual-eye images E0 to E4 from the captured image, and outputs the extracted images as the region specification result information.

As described above, in the camera system 1 on which the multi-eye interchangeable lens 20 is mounted, the multi-eye interchangeable lens 20 including the feeding unit 23 provided with the individual-eye lenses $31_0$ to $31_4$ arranged not to overlap (as viewed) in the optical axis direction of the lens barrel optical axis and the light sources 32L and 32R, the optical axis center position (dx#i', dy#i') as the mount error reflection position information on the individual-eye image E #i is obtained for the individual-eye image E #i on the unknown captured image.

Therefore, regardless of the feeding state of the feeding unit 23, images with a plurality of viewpoints, that is, the individual-eye image E #i having the viewpoint at the position of the individual-eye lens $31_i$ can be easily obtained from the unknown captured image.

Moreover, the base line angle $(\tan^{-1}(dy\#i/dx\#i))$ representing the direction of the base line L0 #i (FIG. 5) can be obtained from the optical axis center position (dx#i', dy#i') as the mount error reflection position information, and the accurate parallax information not affected by the attachment error in the rotation direction of the multi-eye interchangeable lens 20 can be obtained using the base line angle.

Here, for example, it is assumed that an xy coordinate system with the optical axis center position (x0, y0) of the individual-eye image E0 on the known captured image as the origin is adopted, and the attachment error $X_{Error}$ in the horizontal direction and the attachment error $Y_{Error}$ in the vertical direction are 0. In this case, in the unknown captured image, the optical axis center position, which is the mount error reflection position information (x0', y0') of the individual-eye image E0, is the origin, and the region of the individual-eye image E0 is the region centered on the origin.

Meanwhile, in a case where the attachment error $X_{Error}$ in the horizontal direction or the attachment error $Y_{Error}$ in the vertical direction is not 0, the optical axis center position of the individual-eye image E0 is shifted from the origin by the attachment error $X_{Error}$ in the horizontal direction and the attachment error $Y_{Error}$ in the vertical direction in the unknown captured image.

In this case, when a rectangular region having a predetermined size centered on the origin is specified as the region of the individual-eye image E0 on the assumption that the optical axis center position that is the mount error reflection position information (x0', y0') of the individual-eye image E0 is the origin, the optical axis center position that is the actual mount error reflection position information (x0', y0') is shifted from the origin, and therefore, a rectangular region having a predetermined size centered on a position shifted from the actual optical axis center position of the individual-eye image E0 on the unknown captured image is specified as the region of the individual-eye image E0.

As a result, for each of the other individual-eye images E1 to E4, a rectangular region having a predetermined size centered on a position shifted from the optical axis center position (x#i', y#i') of the individual-eye image E #i on the unknown captured image is specified as the region of the individual-eye image E #i.

That is, in the case where the attachment error $X_{Error}$ in the horizontal direction or the attachment error $Y_{Error}$ in the vertical direction is not 0, a rectangular region having a predetermined size centered on a position shifted by the same translation amount from the optical axis center position (x#i', y#i') of the individual-eye image E #i on the unknown captured image is specified as the region of the individual-eye image E #i for each of the individual-eye images E0 to E4.

Note that, in both the case where the attachment error $X_{Error}$ in the horizontal direction or the attachment error $Y_{Error}$ in the vertical direction is not 0 and the case where the attachment error $X_{Error}$ in the horizontal direction and the attachment error $Y_{Error}$ in the vertical direction are 0, the base line angle ($\tan^{-1}$(dy#i/dx#i)) at the time of imaging the unknown captured image is obtained from the optical axis center position (dx#i', dy#i') as the relative mount error reflection position information with reference to the position of the individual-eye image E0.

Therefore, the base line angle obtained for the individual-eye image E #i centered on the position shifted from the optical axis center position (x#i', y#i') by the same translation amount is the same as the base line angle obtained for the individual-eye image E #i centered on the optical axis center position (x#i', y#i') on the unknown captured image.

That is, even in the case where the attachment error $X_{Error}$ in the horizontal direction or the attachment error $Y_{Error}$ in the vertical direction is not 0, the same base line angle as that in the case where the attachment error)(Error in the horizontal direction and the attachment error $Y_{Error}$ in the vertical direction are 0 can be obtained. Then, the accurate parallax information not affected by the attachment error of the multi-eye interchangeable lens 20 can be obtained from the individual-eye image E #i with the specified region on the unknown captured image, using the base line angle.

Note that, in the present embodiment, the individual difference reflection position information and the individual difference spot light position information are obtained for each multi-eye interchangeable lens 20 and included and stored in the lens information. However, common values can be adopted for each model of the multi-eye interchangeable lens 20 as the individual difference reflection position information and the individual difference spot light position information. In the case of adopting the common individual difference reflection position information and individual difference spot light position information for each model of the multi-eye interchangeable lens 20, the individual difference reflection relative position information (dx#i, dy#i) and the individual difference spot light position information ($X_L$, $Y_L$) and ($X_R$, $Y_R$) for each model are incorporated into the equations (2) and (3), so that the camera body 10 can obtain the rotation error $\theta_{Error}$ of the equation (2) and eventually the optical axis center position (dx#i', dy#i') as the mount error reflection position information of the equations (3) as long as the model of the multi-eye interchangeable lens 20 can be recognized.

<Configuration Example of Image Processing Unit 53>

Figure 7:
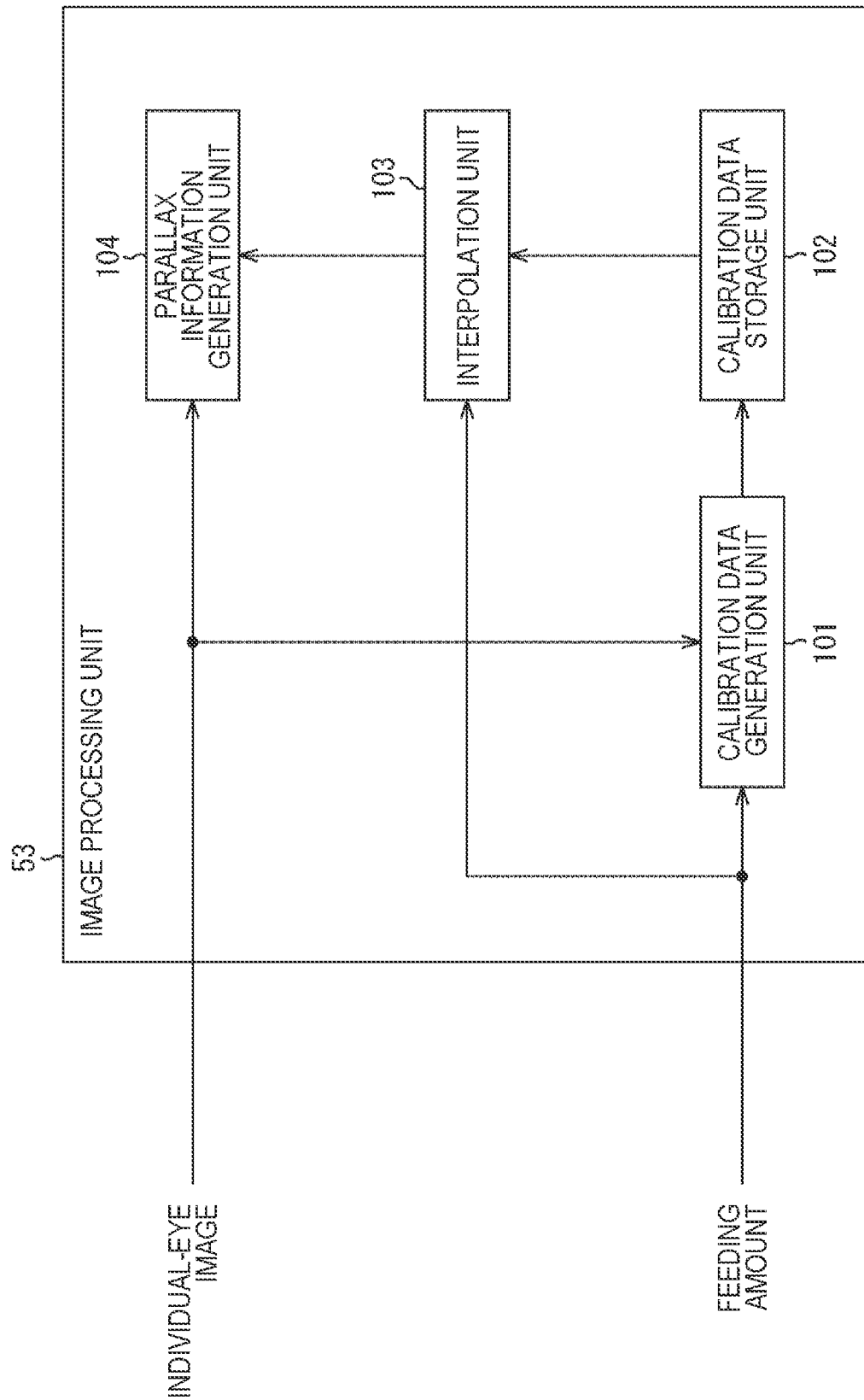
FIG. 7 is a block diagram illustrating a configuration example of an image processing unit 53.

FIG. 7 is a block diagram illustrating a configuration example of the image processing unit 53 in FIG. 2.

FIG. 7 illustrates a configuration example of a part of the image processing unit 53 that performs image processing for obtaining the parallax information, for example.

In FIG. 7, the image processing unit 53 includes a calibration data generation unit 101, a calibration data storage unit 102, an interpolation unit 103, and a parallax information generation unit 104.

The image processing unit 53 generates the parallax information regarding a parallax by using the individual-eye images supplied from the region specifying unit 52. Here, the parallax information includes a disparity representing the parallax by the number of pixels, a distance in the depth direction corresponding to the parallax, and the like.

The parallax information obtained using the individual-eye images is affected by the position of the individual-eye lens $31_i$, lens distortion, and the like. Therefore, to remove the influence of the position of the individual-eye lens $31_i$, lens distortion, and the like, the image processing unit 53 performs calibration to generate parameters regarding the position of the individual-eye lens $31_i$, lens distortion, and the like as calibration data.

In the calibration, for example, the calibration data is generated from calibration images that are the individual-eye images on the captured image obtained by imaging a planar chart for calibration (hereinafter also referred to as a calibration chart) that is a known object.

That is, in the calibration, a focus position of the camera system 1 is controlled to (the position of) a certain predetermined distance, and the calibration chart installed at the focus position is captured. Then, the calibration data for the focus position of the camera system 1 in which the focus position is controlled to the certain predetermined distance is generated using the calibration images that are the individual-eye image obtained by imaging the calibration chart.

The calibration data generated as described above is the calibration data for the focus position of the camera system 1 when the calibration chart is captured. Therefore, for example, in a case where the focus position in a case of imaging a general object is different from the focus position in a case of imaging the calibration chart, the accuracy of the parallax information decreases if calculation of the parallax information using the individual-eye images appearing in the captured image obtained by imaging the general object is performed using the calibration data for the focus position of the camera system 1 when the calibration chart is captured.

Therefore, the image processing unit 53 can obtain highly accurate parallax information by interpolating the calibration data.

The calibration data generation unit 101 generates the calibration data for each of a plurality of feeding amounts from the feeding amount detection unit 64 by using the individual-eye image supplied from the region specifying unit 52, and supplies the calibration data to the calibration data storage unit 102.

That is, the calibration data generation unit 101 generates the calibration data for the plurality of feeding amounts corresponding to a plurality of focus positions from the individual-eye images as calibration images at the plurality of focus positions obtained by imaging the calibration chart at the plurality of focus positions corresponding to the plurality of feeding amounts of the feeding unit 23 in the calibration, and supplies the calibration data to the calibration data storage unit 102.

The calibration data storage unit 102 stores the calibration data for the plurality of feeding amounts supplied from the calibration data generation unit 101.

The interpolation unit 103 generates calibration data for the feeding amount of when imaging a general object (an object other than the calibration chart) (hereinafter also referred to as general imaging), of the feeding amounts supplied from the feeding amount detection unit 64, by interpolation using the calibration data for the plurality of feeding amounts stored in the calibration data storage unit 102 or the like, and supplies the generated calibration data to the parallax information generation unit 104.

The parallax information generation unit 104 generates parallax information by using the calibration data from the interpolation unit 103 and the individual-eye image on the captured image captured by the general imaging (hereinafter also referred to as general captured image) supplied from the region specifying unit 52. The general captured image is equivalent to the unknown captured image.

According to the camera system 1 including the image processing unit 53 as described above, an RGB image as the individual-eye image with image quality similar to that of a general single-eye camera and the parallax information as depth information can be simultaneously obtained, for example. The parallax information can be used, for example, for image processing such as refocusing for generating (reconstructing) an image focused on an arbitrary object, generating an obstacle-removed image in which an obstacle for a desired object desired by the user has been removed, lens emulation for emulating a lens having an arbitrary characteristic, and synthesis in consideration of depth for CG and actual capture.

For the camera system 1, for example, after the camera system 1 is manufactured, an operation mode of the camera system 1 is set to a calibration mode for performing calibration, and the calibration is performed in a manufacturing factory or the like of the camera system 1.

That is, in the camera system 1, the focus of the multi-eye interchangeable lens 20 is controlled to a focus position (hereinafter, also referred to as a reference focus position) at which calibration data is generated, and the calibration chart is installed at the reference focus position and captured. Then, in the camera system 1, the calibration data generation unit 101 generates the calibration data for the feeding amount of the feeding unit 23 corresponding to the reference focus position (hereinafter also referred to as a reference feeding amount) from the calibration image obtained by imaging the calibration chart, and causes the calibration data storage unit 102 to store the calibration data. The calibration is performed for a plurality of the reference focus positions, whereby the calibration data for a plurality of reference feeding amounts corresponding to the plurality of reference focus positions is generated.

When the calibration is performed and the camera system 1 is shipped from the manufacturing factory, the operation mode of the camera system 1 is set to a general imaging mode in which general imaging is performed. In the general imaging mode, the feeding amount (hereinafter also referred to as an imaging feeding amount) of the feeding unit 23 corresponding to the focus position (hereinafter also referred to as imaging focus position) when the general captured image is captured is supplied from the feeding amount detection unit 64 to the interpolation unit 103.

The interpolation unit 103 generates by interpolation calibration data for the imaging feeding amount corresponding to the imaging focus position, using the calibration data for the plurality of reference feeding amounts corresponding to the plurality of reference focus positions stored in the calibration data storage unit 102, and supplies the generated calibration data to the parallax information generation unit 104. Note that, in a case where there is calibration data for all of positions, the interpolation is unnecessary.

The parallax information generation unit 104 generates parallax information from the individual-eye image on the general captured image captured in the state where the feeding unit 23 is fed out by the imaging feeding amount, using the calibration data for the imaging feeding unit from the interpolation unit 103. As a result, accurate parallax information with suppressed influence of the lens distortion or the like is generated.

Figure 8:
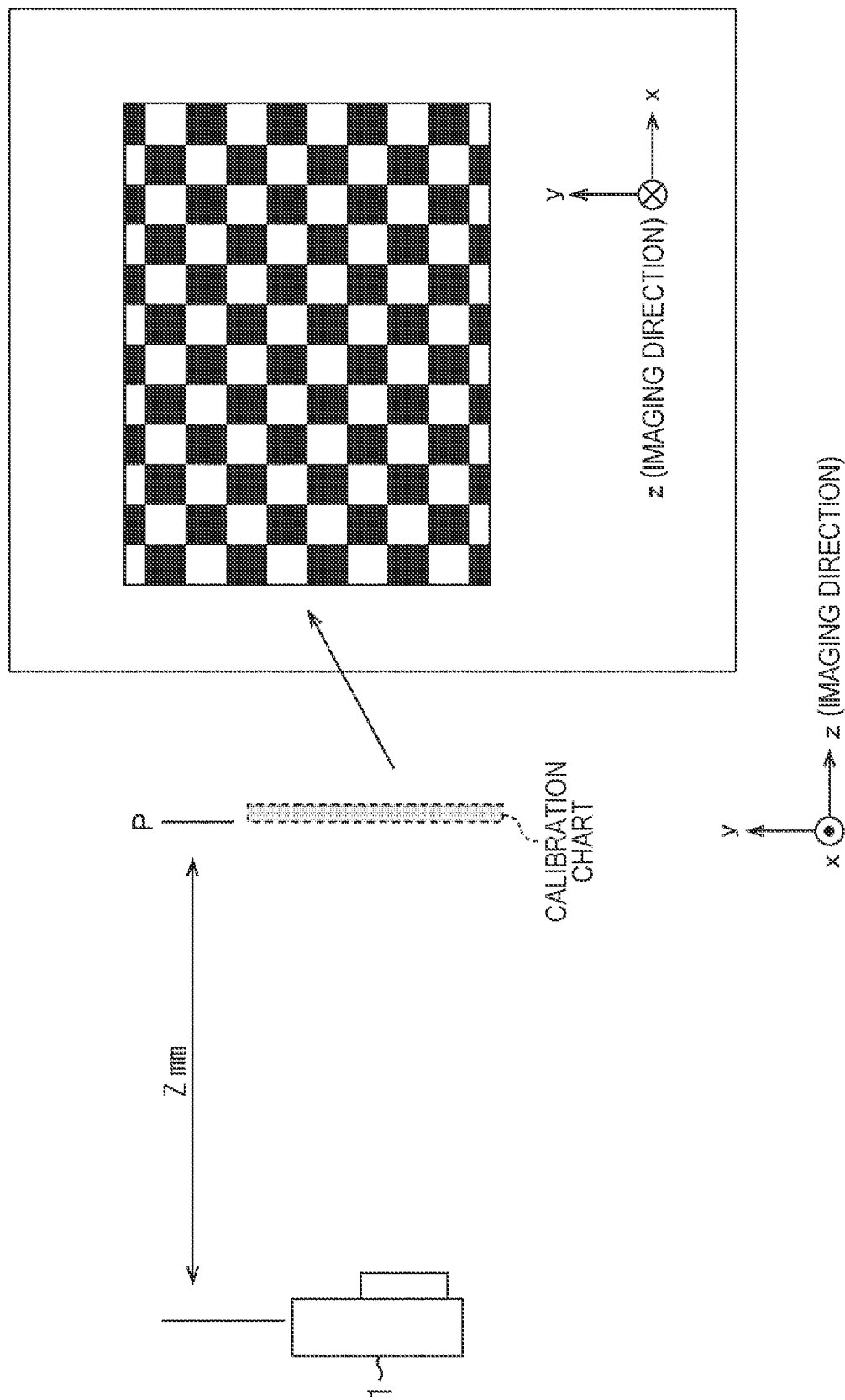
FIG. 8 is a view for describing calibration performed by the camera system 1.

FIG. 8 is a view for describing calibration performed by the camera system 1.

In the calibration, a position P at a predetermined distance Z mm from the camera system 1 is set as a reference focus position P, a calibration chart is installed at the reference focus position P, and the camera system 1 images the calibration chart.

The calibration chart illustrated in FIG. 8 is, for example, an object on which a grid-like pattern is drawn, but any object having a known positional relationship or the like can be adopted as the calibration chart.

In the calibration, calibration data for a feeding amount P corresponding to the reference focus position P is generated from the calibration image obtained by imaging the calibration chart at the reference focus position P.

In the calibration image obtained by imaging the calibration chart by the camera system 1, for example, a positional deviation (distortion) due to the lens distortion or the like of the individual-eye lens 31$_i$, that is, a positional deviation occurs between a true position where the object should appear in the calibration image (a position where the object should originally appear in the case of no lens distortion or the like) and the position where the object actually appears in the calibration image.

Since the calibration image is the individual-eye image on the captured image obtained by installing and imaging the calibration chart, which is a known object, at the focus position P, which is a known position, the true position at which the object should appear, that is, the true position at which each part (for example, a grid point) of the calibration chart should appear in the calibration image can be obtained in advance by calculation.

Furthermore, the actual position where the object appears in the calibration image can be obtained from the calibration image.

The calibration data generation unit 101 obtains the actual position where the object (for example, the grid point of the calibration chart) appears from the calibration image. Then, the calibration data generation unit 101 generates information regarding a positional deviation between the actual position where the object appears and the true position where the object should appear, which can be obtained in advance by calculation, as the calibration data.

Note that, as the calibration data, so-called internal parameters and external parameters of the camera system 1 can be generated, but here, to simplify the description, the information regarding the positional deviation of the object in the calibration image obtained by imaging the calibration chart by the camera system 1 is generated as the calibration data.

Figure 9:
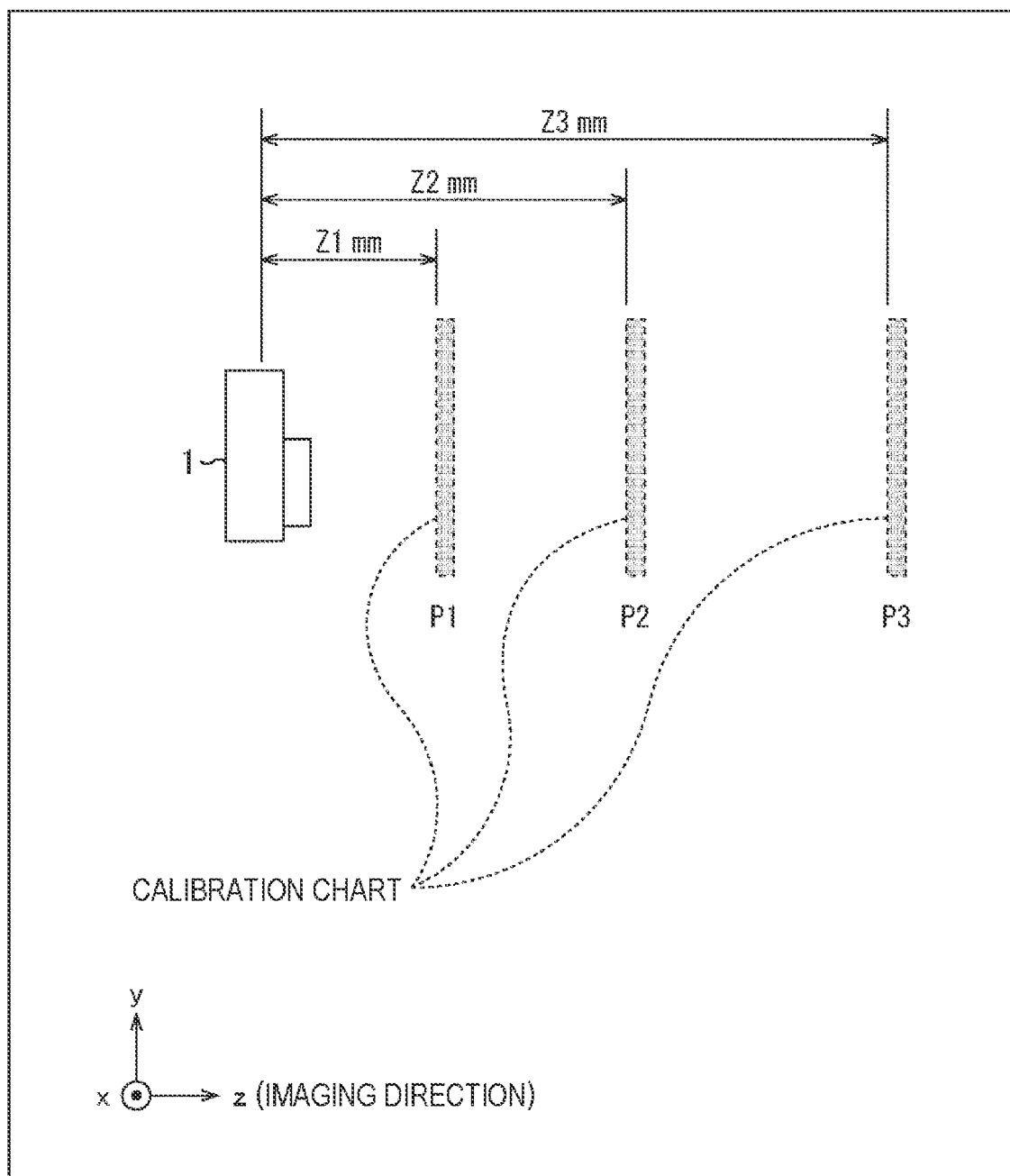
FIG. 9 is a view for describing generation of calibration data for a plurality of feeding amounts corresponding to a plurality of reference focus positions.

FIG. 9 is a view for describing generation of calibration data for a plurality of feeding amounts corresponding to a plurality of reference focus positions.

In generating the calibration data for the plurality of feeding amounts corresponding to the plurality of reference focus positions, first, a position P1 at a predetermined distance Z1 mm from the camera system 1 is set as a reference focus position P1, a calibration chart is installed at the reference focus position P1, and the camera system 1 images the calibration chart.

Then, a position P2 at a distance Z2 mm different from the distance Z1 mm from the camera system 1 is set as a reference focus position P2, the calibration chart is installed at the reference focus position P2, and the camera system 1 images the calibration chart.

Moreover, a position P3 at a distance Z3 mm different from the distances Z1 and Z2 mm from the camera system 1 is set as a reference focus position P3, the calibration chart is installed at the reference focus position P3, and the camera system 1 images the calibration chart.

Note that, in FIG. 9, the distances Z1 mm, Z2 mm, and Z3 mm have a relationship expressed by an expression Z1 mm<Z2 mm<Z3 mm.

The camera system 1 controls the focus position to the position P1 and images the calibration chart installed at the position P1. By this imaging, the calibration image at the reference focus position P1, that is, the calibration image having the position P1 as the reference focus position is obtained.

Similarly, the camera system 1 controls the focus position to the positions P2 and P3, and images the calibration charts installed at the positions P2 and P3. By the imaging, the calibration images at the reference focus positions P2 and P3, that is, the calibration images having the positions P2 and P3 as the reference focus positions are obtained.

Note that the order of imaging the calibration charts installed at the reference focus positions P1, P2, and P3 is not particularly limited.

Furthermore, here, the three different positions P1, P2, and P3 are adopted as the reference focus positions, but two different positions, or four or more different positions can be adopted as the reference focus positions in addition to the three different positions.

In the camera system 1, as described above, the calibration data for a plurality of feeding amounts corresponding to the plurality of reference focus positions (reference focus positions P1, P2, and P3) is generated from the calibration images obtained by imaging the calibration charts by the camera system 1 in which the focus positions are controlled to the plurality of positions (reference focus positions P1, P2, and P3).

Figure 10:
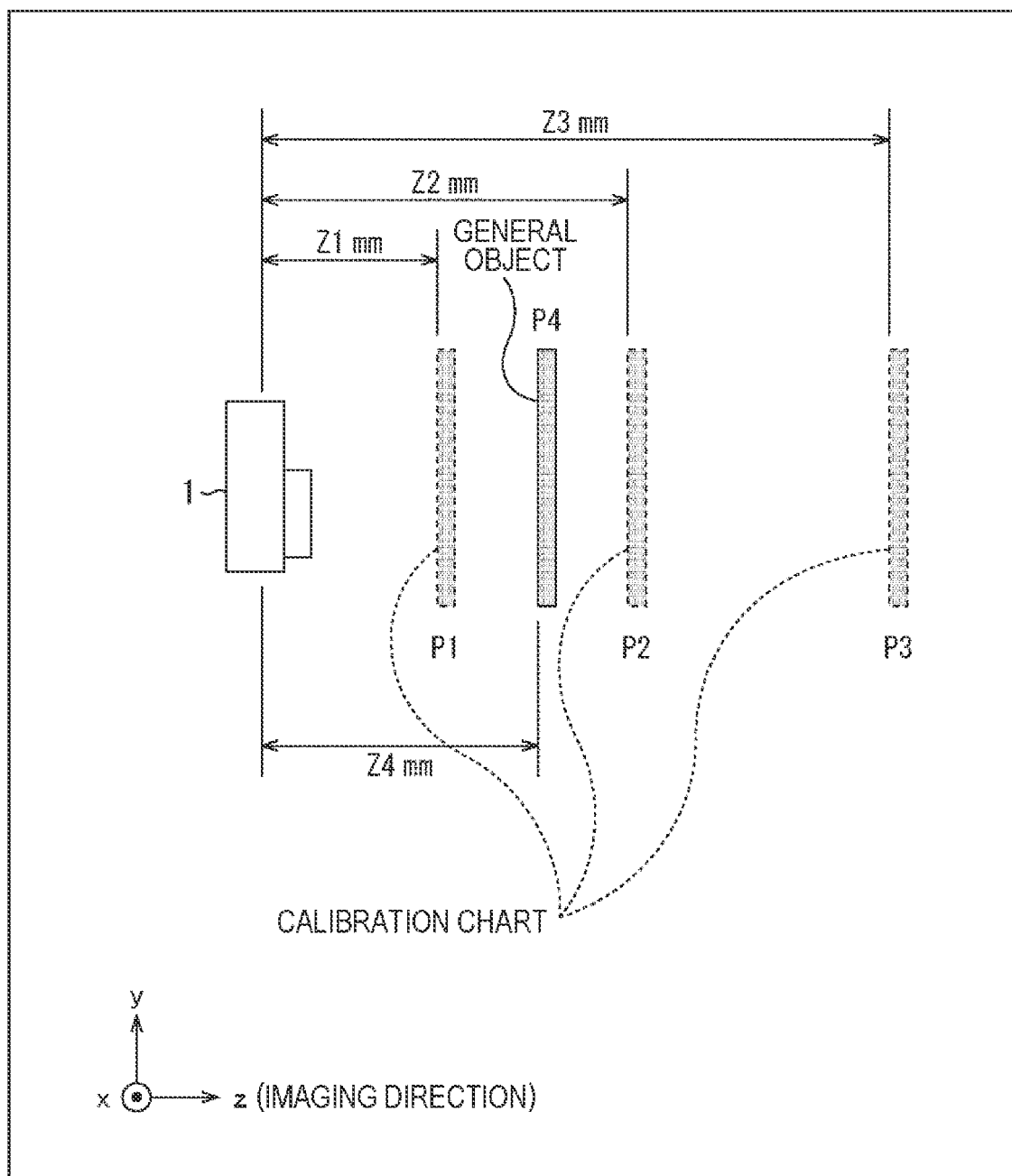
FIG. 10 is a view for describing general imaging performed by the camera system 1.

FIG. 10 is a view for describing general imaging performed by the camera system 1.

In the general imaging, the camera system 1 sets a position P4 at an arbitrary distance Z4 mm from the camera system 1 as an imaging focus position P4, and images the general object present at the imaging focus position P4.

Note that, in FIG. 10, the position P4 does not match any of the positions P1, P2, and P3, and is a position farther than the position P1 and closer than the position P2.

In the camera system 1, image processing is performed for the general captured image obtained by imaging the object in the camera system 1 in which the focus position is controlled to the imaging focus position P4.

Here, in the camera system 1, in a case where the imaging focus position at the time of performing the general imaging does not match any of the plurality of reference focus positions at the time of calibration, if the image processing is performed for the general captured image using the calibration data as is for any reference feeding amount among the plurality of reference feeding amounts corresponding to the plurality of reference focus positions, inappropriate image processing may be performed.

In FIG. 10, since the imaging focus position P4 does not match any of the reference focus positions P1, P2, and P3, if the image processing is performed for the general captured image captured by the camera system 1 in which the focus position is controlled to the imaging focus position P4, that is, the imaging feeding amount is set to the feeding amount corresponding to the imaging focus position P4, using the calibration data as is for any reference feeding amount of the reference feeding amounts P1, P2, and P3 corresponding to the reference focus positions P1, P2, and P3, inappropriate image processing may be performed.

Therefore, in the camera system 1, to perform appropriate image processing for the general captured image, the interpolation unit 153 (FIG. 7) generates by interpolation the calibration data for the imaging feeding amount P4 corresponding to the imaging focus position P4, using the calibration data for the reference feeding amounts P1, P2, and P3 corresponding to the reference focus positions P1, P2, and P3.

That is, in a case where the focus position, that is, the feeding amount of the feeding unit 23 is different, lens conditions (lens state) of the camera system 1 are different. Therefore, even in the same pixel of the general captured image, the positional deviation (amount) is different between a case where the feeding amount of the feeding unit 23 is the feeding amount corresponding to a certain focus position and a case where the feeding amount is the feeding amount corresponding to another focus position.

Therefore, if the parallax information is generated for the general captured image, using the calibration data for the reference feeding amount that does not match the imaging feeding amount, an error for the parallax information caused by the above-described positional deviation is not appropriately corrected, and the accurate parallax information may not be able to be obtained.

To perform appropriate image processing for the general captured image, that is, to obtain the accurate parallax information, for example, the camera system 1 images the calibration charts at a plurality of (different) reference focus positions, and generates the calibration data for the plurality of reference feeding amounts corresponding to the plurality of reference focus positions from the calibration images at the plurality of reference focus positions obtained by the imaging.

Moreover, the camera system 1 generates the calibration data for the imaging feeding amount corresponding to the imaging focus position, using the calibration data for the plurality of reference feeding amounts corresponding to the plurality of reference focus positions by interpolation, and performs the image processing such as generation of the parallax information, using the calibration data for the imaging feeding amount.

FIG. 11 is a diagram for describing generation by interpolation of the calibration data for the imaging feeding amount corresponding to the imaging focus position P4.

In FIG. 11, the vertical direction (vertical axis) represents the calibration data, and the horizontal direction (horizontal axis) represents the feeding amount of the feeding unit 23.

In FIG. 11, the calibration data for each of the reference feeding amounts P1, P2, and P3 corresponding to the reference focus positions P1, P2, and P3 is indicated by a circle.

The interpolation unit 103 generates the calibration data (the portion indicated by the triangle in the drawing) for the imaging feeding amount P4 corresponding to the imaging focus position P4 by performing linear interpolation or another interpolation using the calibration data for at least two or more reference feeding amounts among the calibration data for the reference feeding amounts P1, P2, and P3.

As described above, the camera system 1 generates by interpolation the calibration data for the imaging feeding amount P4, using the calibration data for the plurality of feeding amounts P1, P2, and P3.

Therefore, the appropriate image processing can be performed for the general captured image at the imaging focus position P4 in the case where the feeding amount of the feeding unit 23 is the imaging feeding amount P4, using the calibration data for the imaging feeding amount P4.

The image processing using the calibration data in the image processing unit 53 is useful in a case where there is non-linear distortion (in the object appearing) in the individual-eye images extracted from the captured image, for example. According to the image processing using the calibration data in the image processing unit 53, the image processing in which the distortion of the individual-eye images has been corrected can be performed. Note that, in the calibration, the information regarding the positional deviation from the true position where the object as the calibration data should appear can be generated for some pixels in addition to for each pixel of the individual-eye image, and can be generated by interpolation in a spatial direction for other pixels at the time of general imaging.

<Configuration Example of Light Sources 32L and 32R>

Figure 12:
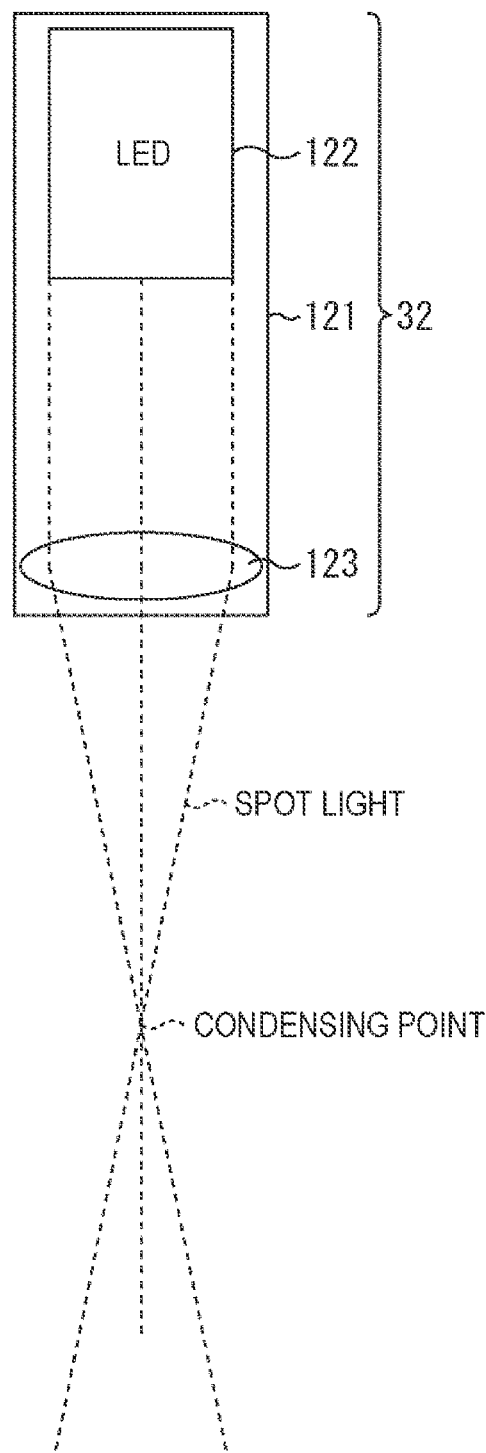
FIG. 12 is a cross-sectional view illustrating a configuration example of the light sources 32L and 32R.

FIG. 12 is a cross-sectional view illustrating a configuration example of the light sources 32L and 32R.

Here, hereinafter, the light sources 32L and 32R will be referred to as light source(s) 32 unless they need to be distinguished.

In FIG. 12, the light source 32 includes a housing 121, an LED 122, and a lens 123.

The housing 121 is, for example, an elongated cylindrical housing, and houses the LED 122 and the lens 123 therein.

The LED 122 emits a light as a spot light.

The lens 123 condenses spot light emitted from the LED 122.

In light source 32 configured as described above, the spot light emitted from LED 122 is condensed by lens 123.

Therefore, the spot light emitted from the light source 32 in FIG. 12 is (ideally) condensed at one point and then spread, and thus is non-parallel light (the light that is not a parallel light).

Here, the point where the non-parallel light as the spot light emitted from the light source 32 in FIG. 12 is condensed is also referred to as a condensing point.

Hereinafter, a method of detecting the feeding amount of the feeding unit 23 will be described assuming that the light source 32 emits the non-parallel light as the spot light.

<Configuration Example of Multi-eye Interchangeable Lens 20>

Figure 13:
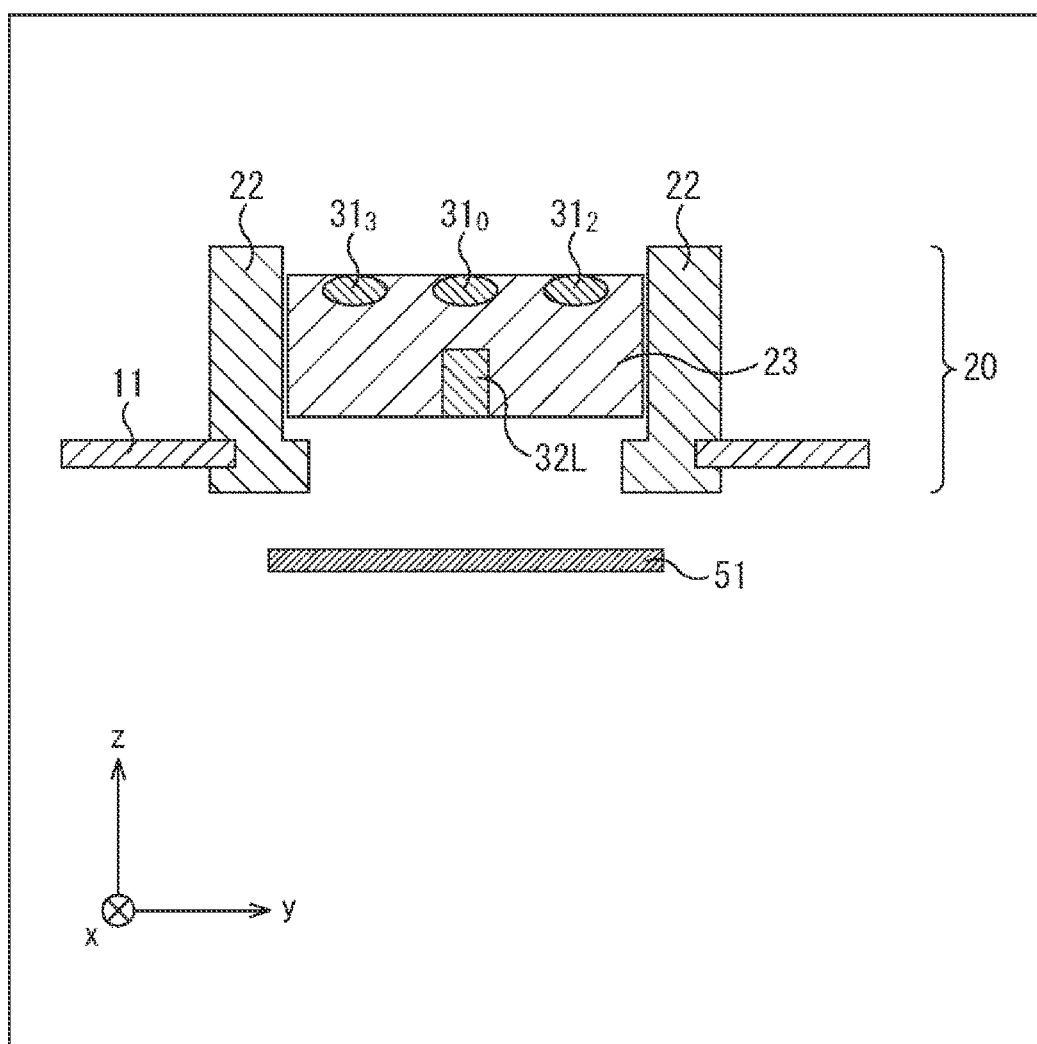
FIG. 13 is a cross-sectional view illustrating a configuration example of the multi-eye interchangeable lens 20.

FIG. 13 is a cross-sectional view illustrating a configuration example of the multi-eye interchangeable lens 20.

As described with reference to FIG. 1, the feeding unit 23 is provided with the individual-eye lens $31_i$ and the light source 32. The feeding unit 23 is configured to be movable inside the cylindrical lens barrel 21 in the optical axis direction (in the figure, an up-down direction) of the lens barrel optical axis, and can be fed out from the frontmost side (from the image sensor 51 side) to the depth side. The feed out of the feeding unit 23 moves the individual-eye lens $31_i$, and the focus is adjusted.

<First Detection Method of Feeding Amount>

Figure 14:
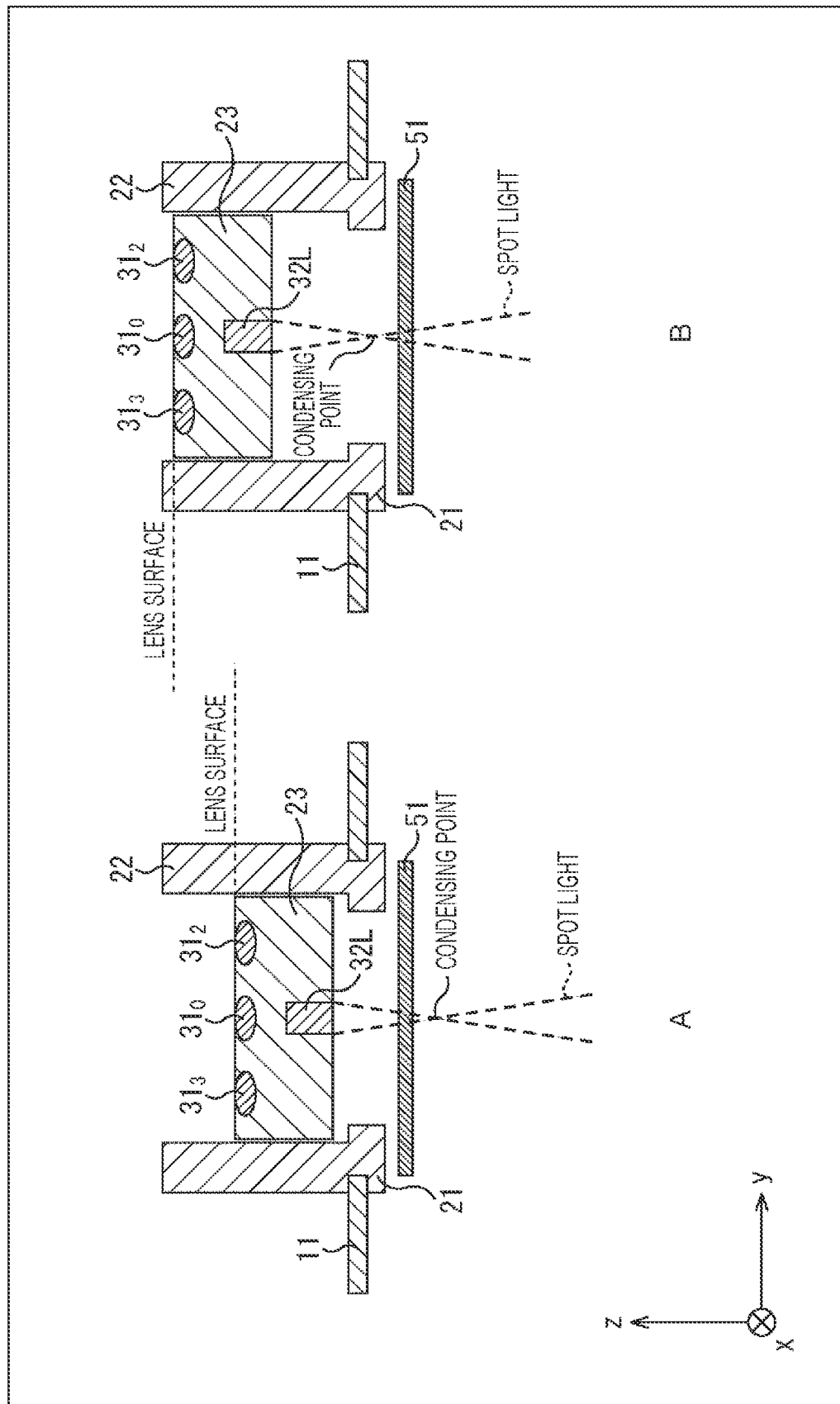
FIG. 14 is views for describing a first detection method of detecting a feeding amount of a feeding unit 23.

FIG. 14 is views for describing a first detection method of detecting the feeding amount of the feeding unit 23.

A of FIG. 14 illustrates a cross section of the multi-eye interchangeable lens 20 in a minimum feeding state (wide end) in which the feeding unit 23 is fed out to the minimum extent (on a frontmost side). B of FIG. 14 illustrates a cross section of the multi-eye interchangeable lens 20 in a maximum feeding state (tele end) in which the feeding unit is fed out to the maximum extent (on a deepest side).

In the case of adopting the first detection method, the camera system 1 is configured to have the image sensor 51 located between the condensing point where the non-parallel light as the spot light is condensed when the feeding unit 23 is in the minimum feeding state and the condensing point where the non-parallel light as the spot light is condensed when the feeding unit 23 is in the maximum feeding state.

Moreover, the light source 32 emits the non-parallel light as the spot light in the same direction as the lens barrel optical axis.

As described above, in the case where the image sensor 51 is located between the condensing point where the spot light is condensed when the feeding unit 23 is in the minimum feeding state and the condensing point where the spot light is condensed when the feeding unit 23 is in the maximum feeding state, a difference between the size of the spot light image (hereinafter also referred to as spot size) (for example, a radius of the spot light image, or the like) in the minimum feeding state and the spot size in the maximum feeding state is minimized.

In the case where the light source 32 emits the non-parallel light as the spot light, the spot size changes depending on the feeding amount of the feeding unit 23. Therefore, the feeding amount of the feeding unit 23 can be detected according to the spot size.

Figure 15:
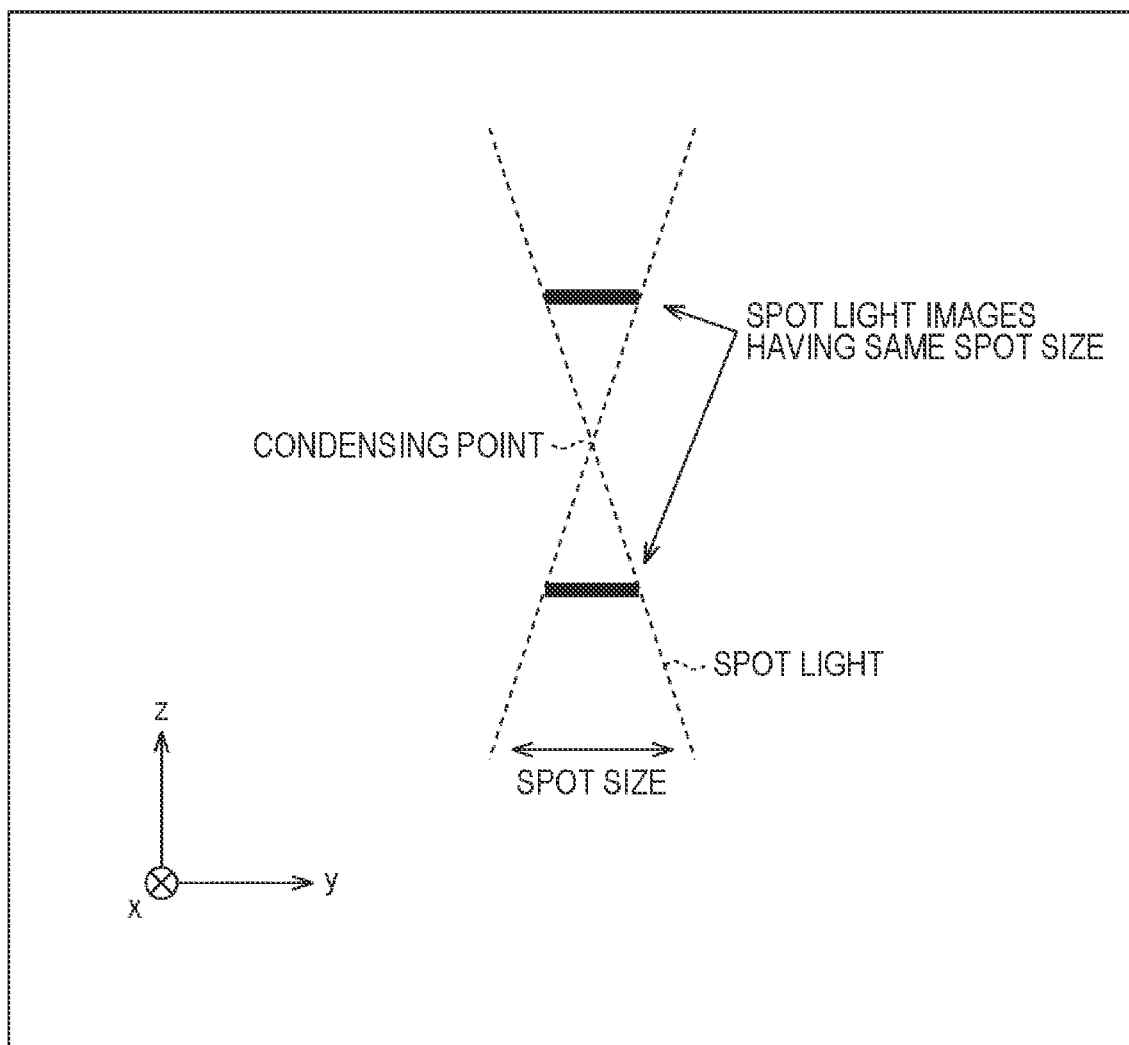
FIG. 15 is a view illustrating an example of a change in a spot size of a non-parallel light as a spot light.

FIG. 15 is a (cross-sectional) view illustrating an example of a change in the spot size of the non-parallel light as the spot light.

As illustrated in FIG. 15, the spot size is minimized at the condensing point, and the spot size increases as the distance from the condensing point increases in the lens barrel optical axis direction.

In the case where the image sensor 51 is located between the condensing point where the spot light is condensed when the feeding unit 23 is in the minimum feeding state and the condensing point where the spot light is condensed when the feeding unit 23 is in the maximum feeding state, there may be two feeding amounts where the spot size becomes the same.

That is, for example, as illustrated in FIG. 15, the two positions located at the same distance from the condensing point in the lens barrel optical axis direction have different feeding amounts but have the same spot size.

As described above, the presence of two feeding amounts for a certain spot size is also referred to as binary indefiniteness.

In the case where two feeding amounts are present for a certain spot size, it is necessary to specify a true feeding amount, that is, a feeding amount in a state where the spot light image of the spot size is obtained from the two feeding amounts, and to resolve the binary indefiniteness.

Examples of a method of specifying the true feeding amount from two feeding amounts in the case where two feeding amounts are present for a certain spot size include a method of performing template matching of the spot light image, and a method of changing the feeding amount to be large or small and detecting a direction of change in which the spot size increases or decreases according to a direction of change in the feeding amount.

Figure 16:
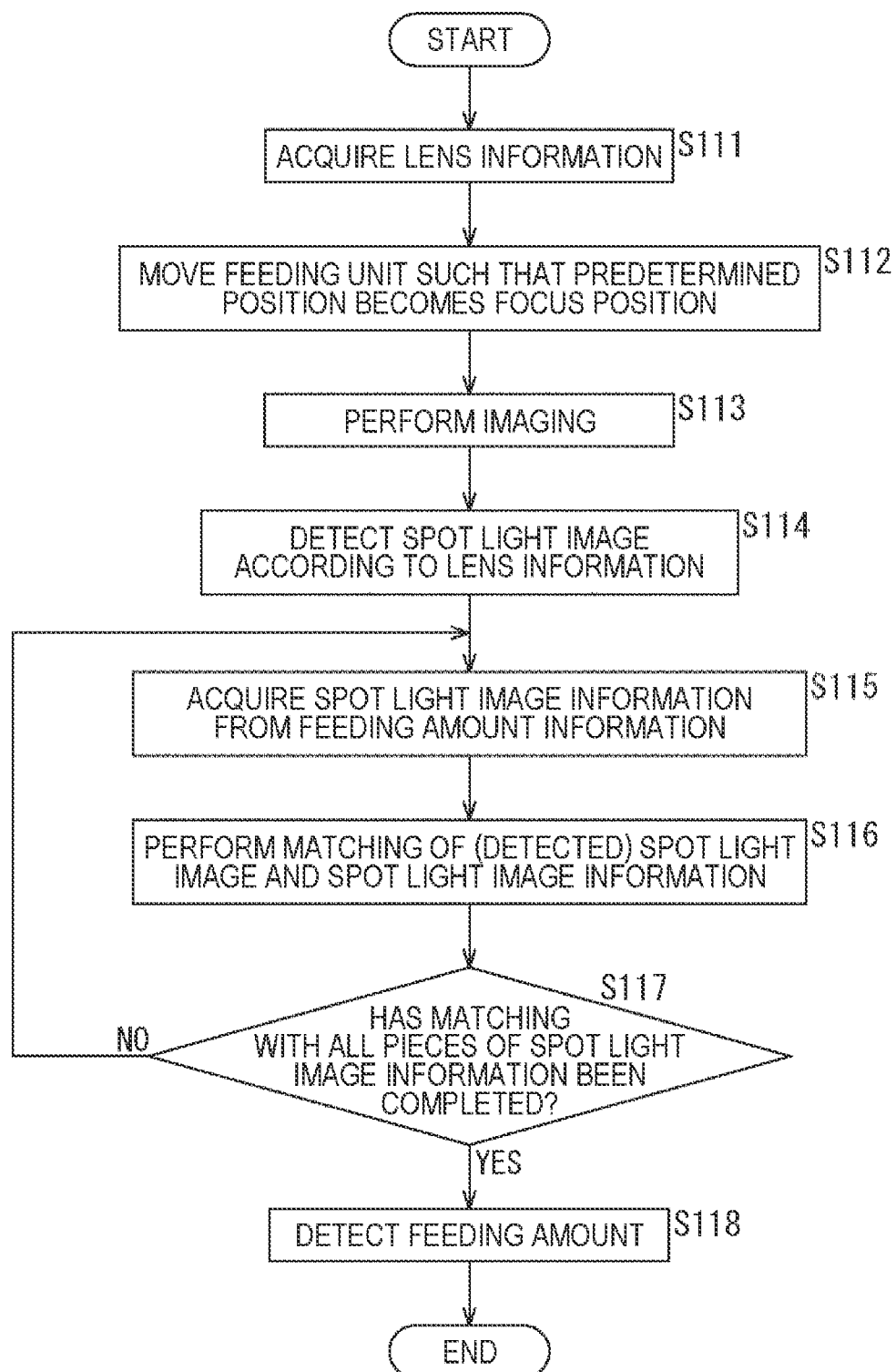
FIG. 16 is a flowchart for describing an example of processing of detecting the feeding amount by the first detection method.

FIG. 16 is a flowchart for describing an example of processing of detecting the feeding amount by the first detection method.

In the processing according to the flowchart of FIG. 16, the binary indefiniteness is resolved by performing template matching of the spot light image.

In step S111, the spot light image detection unit 62 acquires the lens information from the multi-eye interchangeable lens 20 via the communication unit 56, and the processing proceeds to step S112.

In step S112, the control unit 61 waits for the user to perform the operation to adjust the focus, and transmits the information for specifying the focus to the multi-eye interchangeable lens 20 via the communication unit 56 according to the operation. In the multi-eye interchangeable lens 20, the control unit 43 moves (feeds) the feeding unit 23 according to the information for specifying the focus transmitted via the communication unit 56, and the processing proceeds to step S113. Note that the control unit 61 can automatically adjust the focus by an autofocus function or the like without a user operation.

In step S113, the image sensor 51 images the captured image and supplies the captured image to the region specifying unit 52, the position calculation unit 57, and the spot light image detection unit 62, and the processing proceeds to step S114.

In step S114, the spot light image detection unit 62 detects the spot light image from (the vicinity of the individual difference spot light position information of) the captured image from the image sensor 51 according to the individual difference spot light position information included in the lens information acquired from the multi-eye interchangeable lens 20, and supplies the image as the spot light image to the feeding amount detection unit 64, and the processing proceeds to step S115.

Here, as described with reference to FIG. 6, the value common to the multi-eye interchangeable lens 20 of each model can be adopted as the individual difference spot light position information. In the case of adopting the common individual difference spot light position information for the multi-eye interchangeable lens 20 of each model, the individual difference spot light position information for each model is stored in advance in the camera body 10, so that the camera body 10 does not need to acquire (the lens information including) the individual difference spot light position information from the multi-eye interchangeable lens 20. This similarly applies to embodiments described below.

In step S115, the feeding amount detection unit 64 acquires the spot light image information that has not been matched with the spot light image yet from the spot light image information associated with the feeding amount in the feeding amount information stored in the feeding amount information storage unit 63, and the processing proceeds to step S116.

Here, in the case of adopting the first detection method, the feeding amount information storage unit 63 stores the feeding amount information in which each of the plurality of feeding amounts is associated with the spot light image information of when the feeding unit 23 is fed out by the feeding amount, where the image as the spot light image is used as the spot light image information.

In step S116, the feeding amount detection unit 64 performs (template) matching between the spot light image (hereinafter also referred to as a detected spot light image) detected from the captured image in step S114 with the spot light image information acquired in immediately preceding step S115, and the processing proceeds to step S117.

In step S117, the feeding amount detection unit 64 determines whether matching with the detected spot light image has been performed for all the spot light image information associated with the feeding amounts in the feeding amount information stored in the feeding amount information storage unit 63.

In step S117, in the case where it is determined that all the spot light image information associated with the feeding amounts in the feeding amount information stored in the feeding amount information storage unit 63 have not been completed, the processing returns to step S115.

Then, in step S115, the spot light image information that has not been matched with the spot light image yet is acquired from the spot light image information associated with the feeding amount in the feeding amount information stored in the feeding amount information storage unit 63, and similar processing is hereinafter repeated.

Furthermore, in step S117, in the case where it is determined that all the spot light image information associated with the feeding amounts in the feeding amount information stored in the feeding amount information storage unit 63 have been completed, the processing proceeds to step S118.

In step S118, the spot light image information that most matches the detected spot light image is selected from the spot light image information associated with the feeding amount in the feeding amount information stored in the feeding amount information storage unit 63, and the feeding amount associated with the spot light image information is detected as the feeding amount of the feeding unit 23 and is supplied to the image processing unit 53, and the processing is terminated. Here, for example, in a case where the current focus position, which is the focus position after the focus adjustment in step S112, is not used as the focus position at the time of generating the feeding amount information, the current focus position and the focus position when generating the feeding amount information having the feeding amount detected in step S118 do not completely match each other, and the accuracy of the feeding amount detected in step S118 may deteriorate. Therefore, as the feeding amount information, information in which the focus position of when the feeding unit 23 is fed out by the feeding amount is associated in addition to the feeding amount and the spot light image information can be adopted. In this case, in step S112, when the current focus position does not match any of the focus positions included in the feeding amount information, the current focus position can be drawn (readjusted) to the focus position closest to the current focus position among the focus positions included in the feeding amount information. As a result, in step S118, an accurate feeding amount can be detected.

Note that, in FIG. 16, the feeding amount is detected using the image as the spot light image as the spot light image information and performing image matching. Alternatively, for example, the feeding amount can be detected using one-dimensional intensity distribution or two-dimensional intensity distribution of the spot light image as the spot light image information and performing matching of the one-dimensional intensity distribution or the two-dimensional intensity distribution.

Furthermore, the first detection method can be adopted in a case where one or more light sources 32 are provided.

<Second Detection Method of Feeding Amount>

Figure 17:
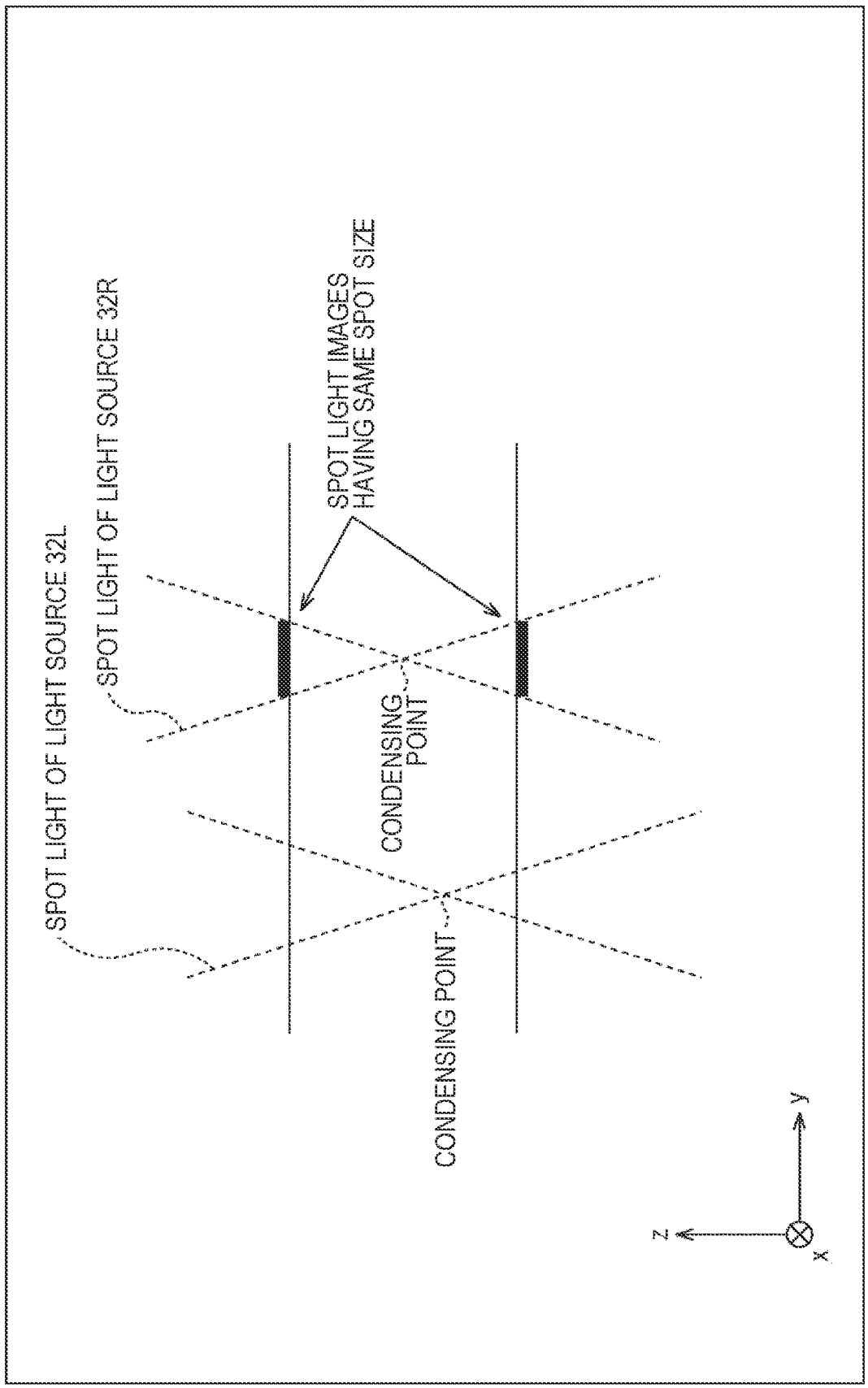
FIG. 17 is a view for describing a second detection method of detecting the feeding amount of the feeding unit 23.

FIG. 17 is a view for describing a second detection method of detecting the feeding amount of the feeding unit 23.

In the case of adopting the second detection method, similarly to the first detection method, the camera system 1 is configured to have the image sensor 51 located between the condensing point where the non-parallel light as the spot light is condensed when the feeding unit 23 is in the minimum feeding state and the condensing point where the non-parallel light as the spot light is condensed when the feeding unit 23 is in the maximum feeding state.

Moreover, similarly to the first detection method, the light sources 32L and 32R emit the non-parallel light as the spot light in the same direction as the lens barrel optical axis.

Note that, in the case of adopting the second detection method, the camera system 1 is configured such that the condensing point of the spot light emitted by the light source 32L and the condensing point of the spot light emitted by the light source 32R with each feeding amount are located at points with different distances from the image sensor 51.

In FIG. 17, the distance from the image sensor 51 to the condensing point of the spot light emitted from the light source 32L with a certain feeding amount is different from the distance from the image sensor 51 to the condensing point of the spot light emitted from the light source 32R. That is, in FIG. 17, the image sensor 51 is present on the lower side in the drawing, and the condensing point of the spot light emitted by the light source 32L is located closer to the image sensor 51 than the condensing point of the spot light emitted by the light source 32R.

In this case, the binary indefiniteness cannot be resolved only by the spot size of the spot light emitted by one of the light sources 32L and 32R, but the binary indefiniteness can be resolved by a combination of the spot sizes of the spot lights emitted by the light sources 32L and 32R.

Figure 18:
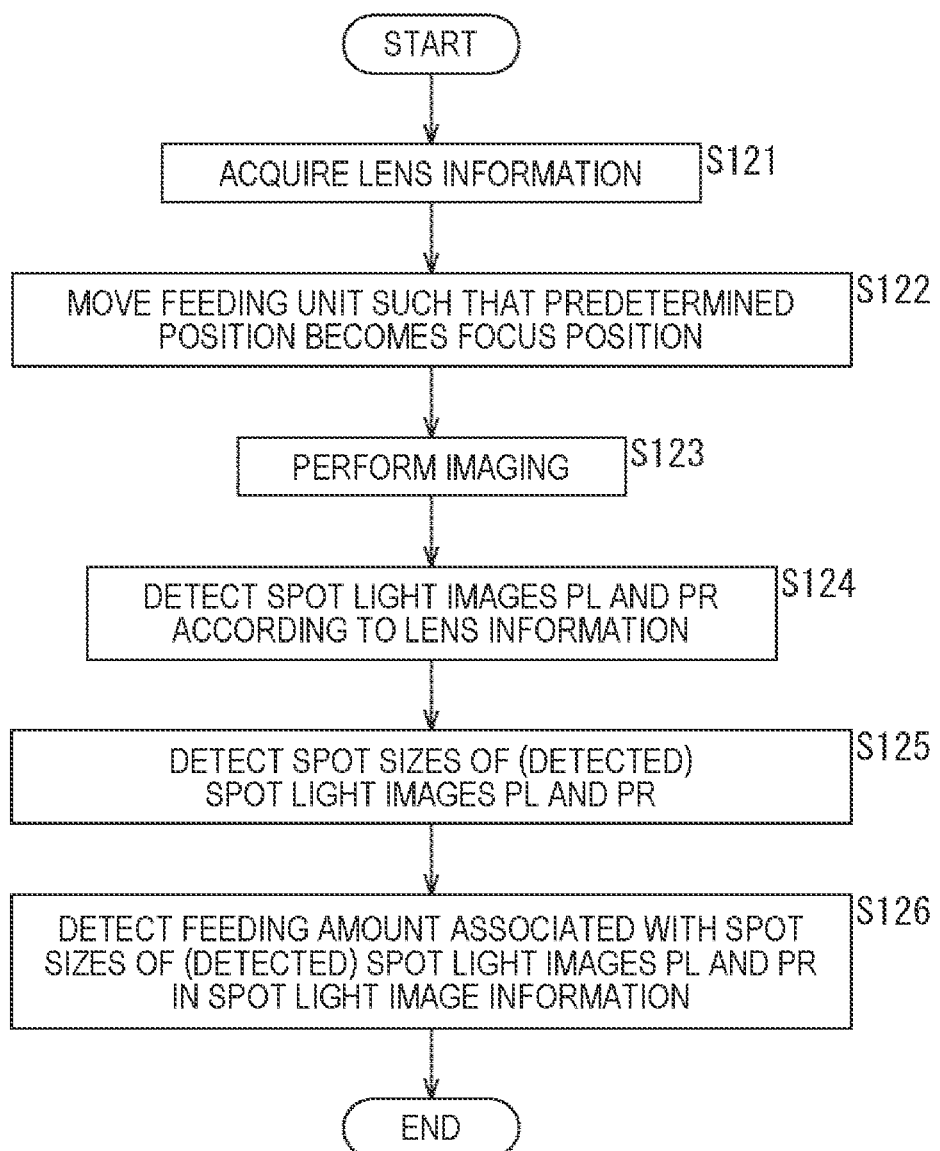
FIG. 18 is a flowchart for describing an example of processing of detecting the feeding amount by the second detection method.

FIG. 18 is a flowchart for describing an example of processing of detecting the feeding amount by the second detection method.

In the processing according to the flowchart of FIG. 18, the binary indefiniteness is resolved by using a combination of the spot sizes of the spot lights emitted by the light sources 32L and 32R.

In steps S121 to S123, processing similar to that in steps S111 to S113 in FIG. 16 is performed.

Then, in step S124, the spot light image detection unit 62 detects (an image as) the spot light image PL of the spot light emitted from the light source 32L and the spot light image PR of the spot light emitted from the light source 32R from the captured image from the image sensor 51 according to the individual difference spot light position information included in the lens information acquired from the multi-eye interchangeable lens 20, and the processing proceeds to step S125.

In step S125, the spot light image detection unit 62 detects the spot sizes of the spot light images PL and PR and supplies the spot sizes to the feeding amount detection unit 64, and the processing proceeds to step S126.

In step S126, the feeding amount detection unit 64 selects the spot light image information matching the combination of the spot sizes (hereinafter also referred to as the combination of detection spot sizes) of the spot light images PL and PR detected in step S125 from the spot light image information associated with the feeding amount in the feeding amount information stored in the feeding amount information storage unit 63. Moreover, in step S126, the feeding amount detection unit 64 detects the feeding amount associated with the spot light image information matching the combination of the detection spot sizes as the feeding amount of the feeding unit 23, supplies the feeding amount to the image processing unit 53, and terminates the processing.

Here, in the case of adopting the second detection method, the feeding amount information storage unit 63 stores the feeding amount information in which each of the plurality of feeding amounts is associated with the spot light image information of when the feeding unit 23 is fed out by the feeding amount, where the combination of the spot sizes of the spot light images PL and PR is used as the spot light image information.

In the second detection method, in the feeding amount information in which each of the plurality of feeding amounts is associated with the combination of the spot sizes of the spot light images PL and PR as the spot light image information of when the feeding unit 23 is fed out by the feeding amount, the feeding amount associated with the combination of the spot sizes of the spot light images PL and PR that matches the combination of the detection spot sizes is detected as the feeding amount of the feeding unit 23.

According to the second detection method, the binary indefiniteness is resolved, and the feeding amount of the feeding unit 23 can be detected according to (the combination of) the detection spot sizes.

Note that the second detection method can be adopted in a case where two or more light sources 32 are provided.

<Third Detection Method of Feeding Amount>

Figure 19:
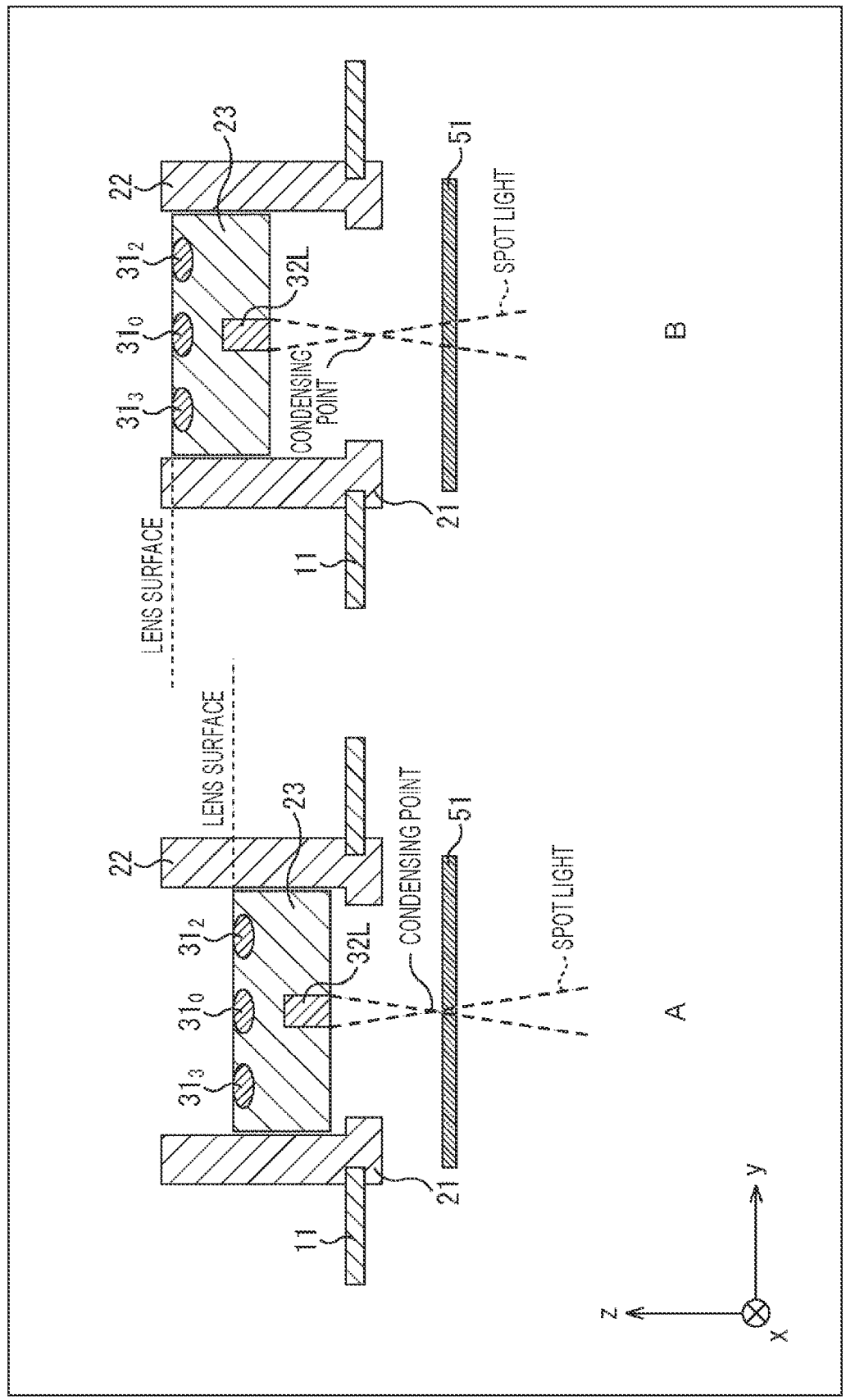
FIG. 19 is views for describing a third detection method of detecting the feeding amount of the feeding unit 23.

FIG. 19 is views for describing a third detection method of detecting the feeding amount of the feeding unit 23.

A of FIG. 19 illustrates a cross section of the multi-eye interchangeable lens 20 in the minimum feeding state in which the feeding unit 23 is fed out to the minimum extent (on the frontmost side). B of FIG. 19 illustrates a cross section of the multi-eye interchangeable lens 20 in the maximum feeding state in which the feeding unit is fed out to the maximum extent (on the deepest side).

In the case of adopting the third detection method, the camera system 1 is configured such that the condensing point where the non-parallel light as the spot light is condensed is located on one of the front side and the depth side including an image sensor 51 when the feeding unit 23 is moved from the minimum feeding state to the maximum feeding state.

Moreover, the light source 32 emits the non-parallel light as the spot light in the same direction as the lens barrel optical axis.

As described above, in the case where the feeding unit 23 is moved from the minimum feeding state to the maximum feeding state, when the condensing point where the non-parallel light as the spot light is condensed is located on one of the front side and the depth side including the image sensor 51, the difference between the spot size of the spot light image in the minimum feeding state and the spot size in the maximum feeding state is maximized. Moreover, the spot size in the case where the feeding unit 23 is moved from the minimum feeding state to the maximum feeding state monotonically decreases or monotonically increases. Therefore, the binary indefiniteness does not occur.

Figure 20:
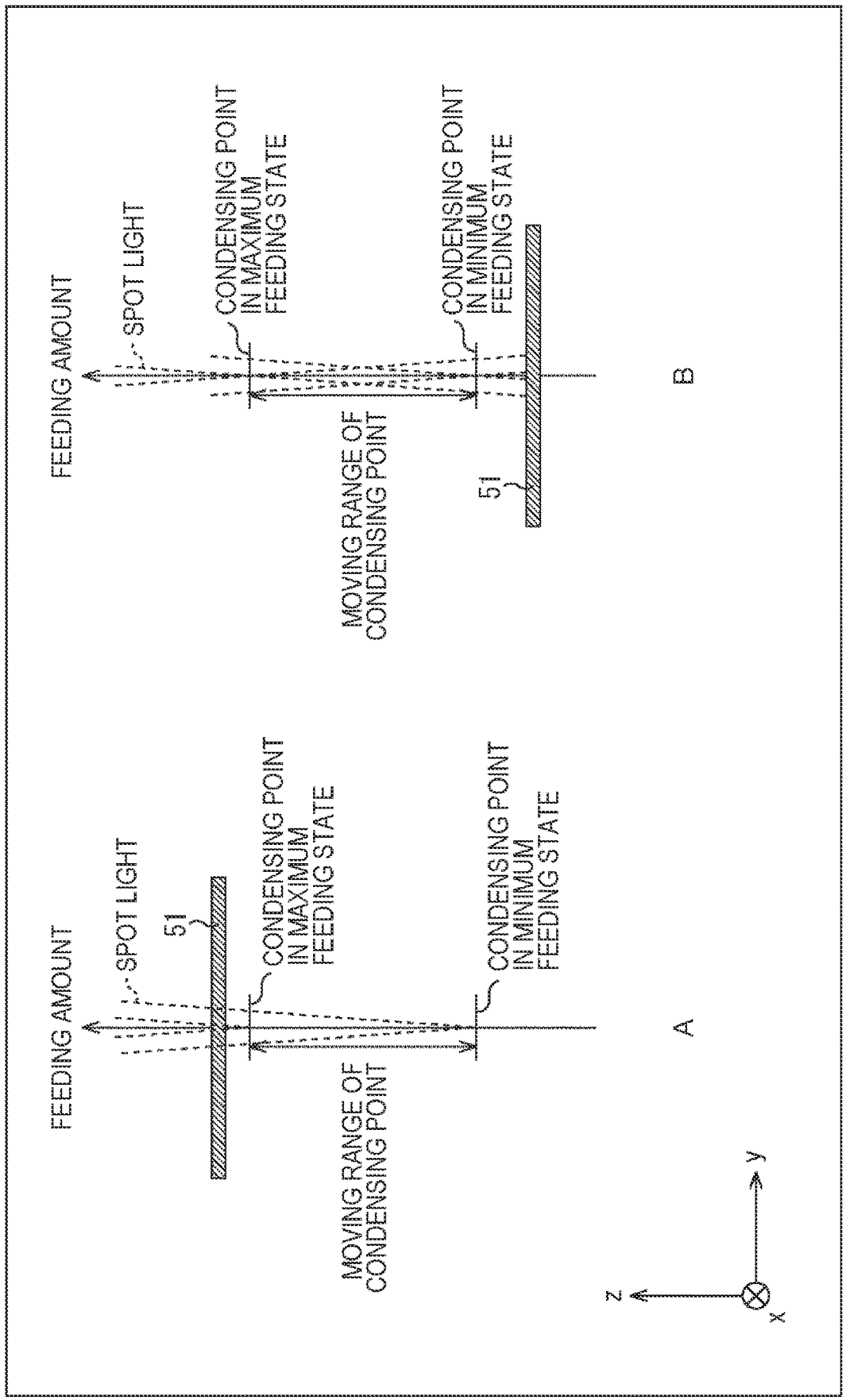
FIG. 20 is views for describing a state in which a condensing point where the non-parallel light as the spot light is condensed is located on one of a front side and a depth side including an image sensor 51 when the feeding unit 23 is moved from a minimum feeding state to a maximum feeding state.

FIG. 20 is views for describing a state in which a condensing point where the non-parallel light as the spot light is condensed is located on one of a front side and a back side including an image sensor 51 when the feeding unit 23 is moved from a minimum feeding state to a maximum feeding state.

A of FIG. 20 illustrates a state in which, when the feeding unit 23 is moved from the minimum feeding state to the maximum feeding state, the condensing point where the non-parallel light as the spot light is condensed is located on the front side including the image sensor 51 (the side opposite to the side where the individual-eye lens 31, is provided).

In A of FIG. 20, when the feeding unit 23 is moved from the minimum feeding state to the maximum feeding state, the spot size monotonically decreases.

B of FIG. 20 illustrates a state in which, when the feeding unit 23 is moved from the minimum feeding state to the maximum feeding state, the condensing point where the non-parallel light as the spot light is condensed is located on the depth side including the image sensor 51 (the side where the individual-eye lens 31, is provided).

In B of FIG. 20, when the feeding unit 23 is moved from the minimum feeding state to the maximum feeding state, the spot size monotonically increases.

In the case of adopting the third detection method, the feeding amount information storage unit 63 stores the feeding amount information in which each of the plurality of feeding amounts is associated with the spot light image information of when the feeding unit 23 is fed out by the feeding amount, where the spot size of the spot light image is used as the spot light image information.

Then, in the third detection method, the spot light image detection unit 62 detects the spot size of the spot light image, similarly to the second detection method.

Moreover, in the feeding amount detection unit 64, in the feeding amount information in which each of the plurality of feeding amounts is associated with the spot size of the spot light image as the spot light image information of when the feeding unit 23 is fed out by the feeding amount, the feeding amount associated with the spot size as the spot light image information matching the spot size detected by the spot light image detection unit 62 is detected as the feeding amount of the feeding unit 23.

According to the third detection method, the binary indefiniteness does not occur, and the feeding amount of the feeding unit 23 can be detected according to the spot size.

Note that the third detection method can be adopted in a case where one or more light sources 32 are provided.

<Fourth Detection Method of Feeding Amount>

Figure 21:
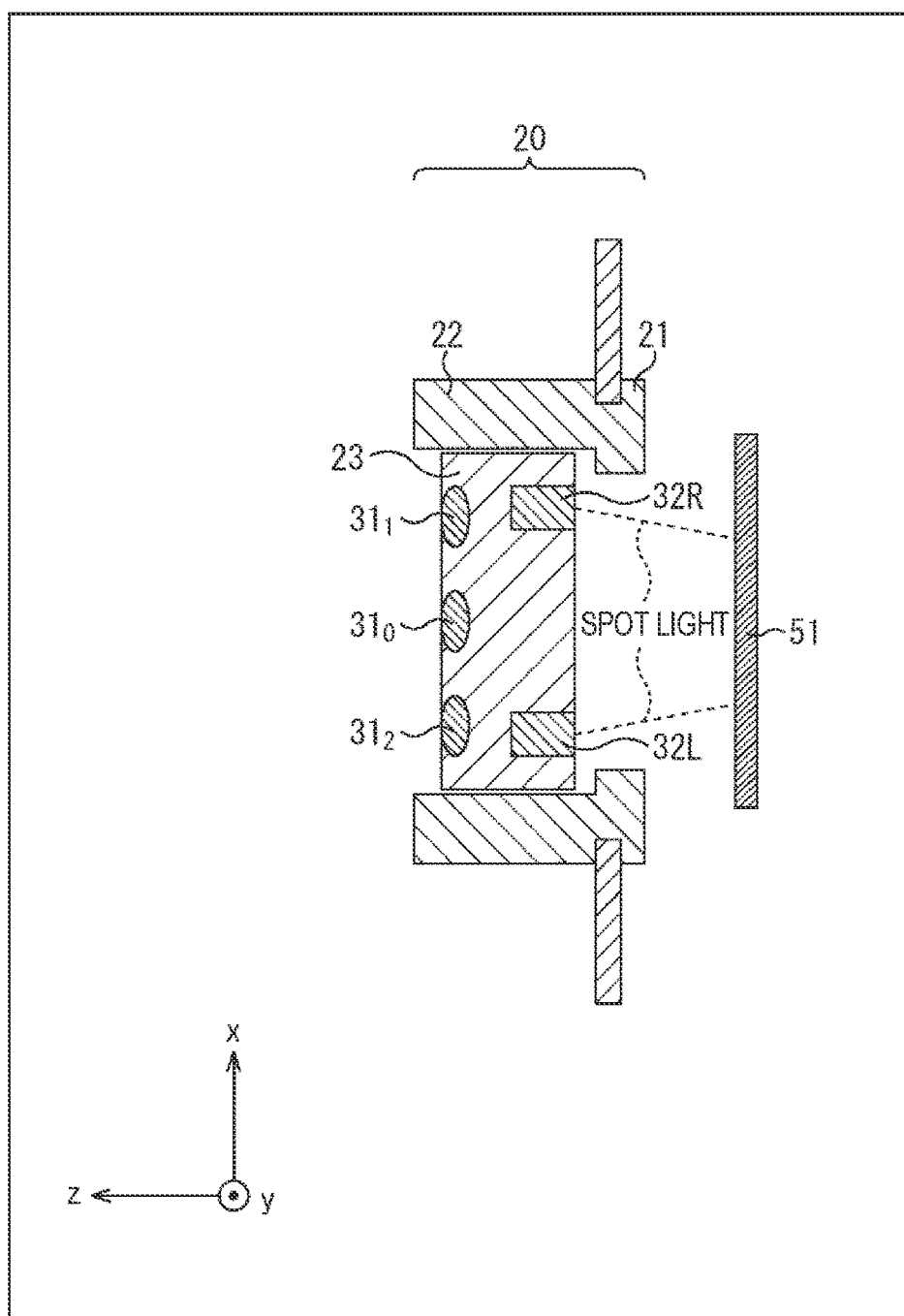
FIG. 21 is a view for describing a fourth detection method of detecting the feeding amount of the feeding unit 23.

FIG. 21 is a view for describing a fourth detection method of detecting the feeding amount of the feeding unit 23. Note that the fourth detection method can be applied not only to the case where the spot light is a non-parallel light but also to a case where the spot light is a parallel light as will be described below.

That is, FIG. 21 illustrates a cross section of the multi-eye interchangeable lens 20.

In the case of adopting the fourth detection method, the camera system 1 is configured such that the light source 32 emits the spot light in an oblique direction inclined from the lens barrel optical axis direction.

In FIG. 21, the light source 32 emits the spot light in a direction from a peripheral portion toward a central portion of the image sensor 51.

Figure 22:
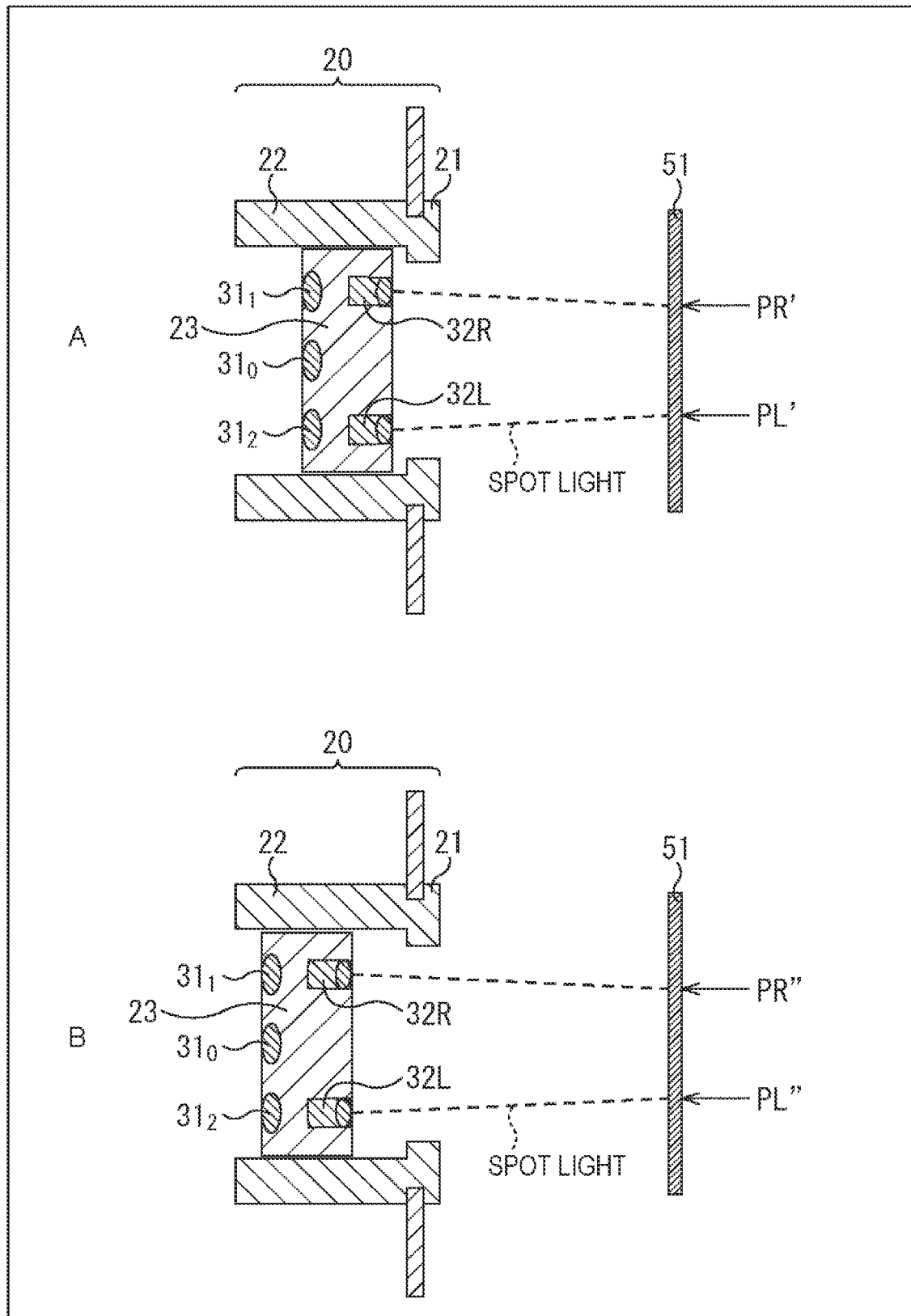
FIG. 22 is views illustrating an irradiation position of the spot light in the case where the feeding unit 23 is in the minimum feeding state and an irradiation position of the spot light in the case where the feeding unit 23 is in the maximum feeding state.

FIG. 22 is views illustrating an irradiation position of the spot light in the case where the feeding unit 23 is in the minimum feeding state and an irradiation position of the spot light in the case where the feeding unit 23 is in the maximum feeding state.

A of FIG. 22 illustrates the irradiation position of the spot light in the case where the feeding unit 23 is in the minimum feeding state, and B of FIG. 22 illustrates the irradiation position of the spot light in the case where the feeding unit 23 is in the maximum feeding state.

In FIG. 22, the irradiation position of the spot light in the case where the feeding unit 23 is in the minimum feeding state, that is, the positions of spot light images PL' and PR' of the spot lights emitted by the light sources 32L and 32R are positions closest to a peripheral side of (the captured image captured by) the image sensor 51 in the movable ranges of the spot light images PL and PR of the spot lights.

When the feeding unit 23 is moved from the minimum feeding state to the maximum feeding state, the spot light images PL and PR move toward the center of the image sensor 51.

Then, the irradiation position of the spot light in the case where the feeding unit 23 is in the maximum feeding state, that is, the positions of spot light images PL" and PR" of the spot lights emitted by the light sources 32L and 32R are positions closest to the center side of the image sensor 51 in the movable ranges of the spot light images PL and PR of the spot lights.

FIG. 23 is views illustrating an example of a captured image in which spot light images PL' and PR' appear in the case where the feeding unit 23 is in the minimum feeding state, and a captured image in which spot light images PL" and PR" appear in the case where the feeding unit 23 is in the maximum feeding state.

In FIG. 23, the spot light images PL' and PR' in the case where the feeding unit 23 is in the minimum feeding state are located on the most peripheral side of the captured image.

When the feeding unit 23 is moved from the minimum feeding state to the maximum feeding state, the spot light images PL and PR move toward the center of the captured image.

Then, the spot light images PL" and PR" in the case where the feeding unit 23 is in the maximum feeding state are located on the most center side of the captured image.

As described above, in the case where the light sources 32L and 32R emit the spot lights in the oblique direction, the positions of the spot light images PL and PR change depending on the feeding amount of the feeding unit 23.

Moreover, in the case where the light sources 32L and 32R emit the spot lights in, for example, a direction from the peripheral portion toward the central portion of the image sensor 51 as the oblique direction, the distance between (the positions of) the spot light images PL and PR changes in addition to the positions of the spot light images PL and PR depending on the feeding amount of the feeding unit 23. In FIG. 23, the distance between the spot light images PL' and PR' when the feeding unit 23 is in the minimum feeding state is the maximum value of the distance between the spot light images PL and PR. Furthermore, the distance between the spot light images PL" and PR" when the feeding unit 23 is in the maximum feeding state is the minimum value of the distance between the spot light images PL and PR.

In the fourth detection method, the feeding amount of the feeding unit 23 is detected according to the positions of (one or both of) the spot light images PL and PR or the distance between the spot light images PL and PR obtained from the positions.

Figure 24:
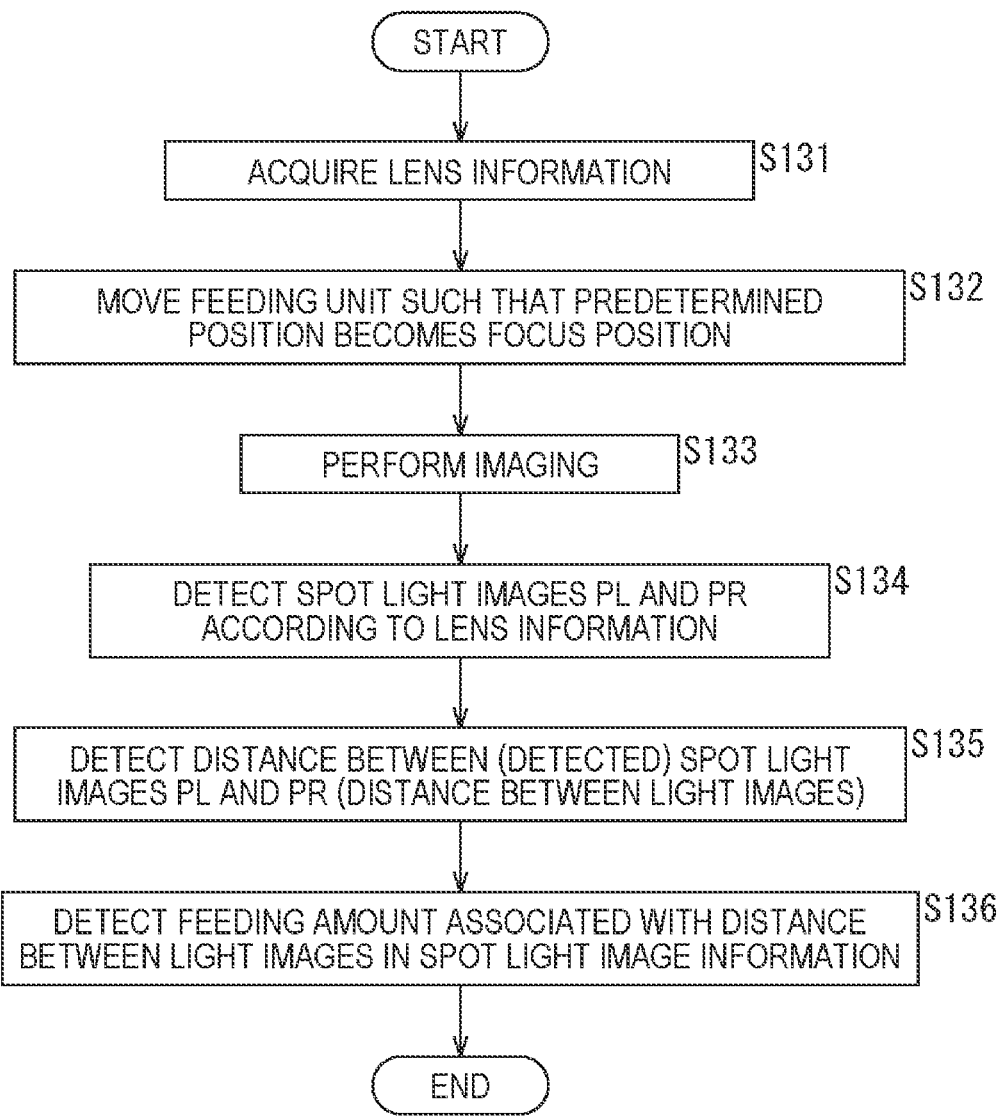
FIG. 24 is a flowchart for describing an example of processing of detecting the feeding amount by the fourth detection method.

FIG. 24 is a flowchart for describing an example of processing of detecting the feeding amount by the fourth detection method.

In steps S131 to S134, processing similar to that in steps S121 to S124 in FIG. 18 is performed.

Then, in step S135, the spot light image detection unit 62 detects the positions (detection light image positions) of the spot light images PL and PR, and detects a distance between light images, which is the distance between the positions. The spot light image detection unit 62 supplies the distance between light images to the feeding amount detection unit 64, and the processing proceeds from step S135 to step S136.

In step S136, the feeding amount detection unit 64 selects the spot light image information matching the distance between light images (hereinafter also referred to as detection distance between light images) detected in step S135 from the spot light image information associated with the feeding amount in the feeding amount information stored in the feeding amount information storage unit 63. Moreover, in step S136, the feeding amount detection unit 64 detects the feeding amount associated with the spot light image information matching the distance between detection light images as the feeding amount of the feeding unit 23, supplies the feeding amount to the image processing unit 53, and terminates the processing.

Here, in the case of adopting the fourth detection method, the feeding amount information storage unit 63 stores the feeding amount information in which each of the plurality of feeding amounts is associated with the spot light image information of when the feeding unit 23 is fed out by the feeding amount, where the distance between light images is used as the spot light image information.

In the fourth detection method, in the feeding amount information in which each of the plurality of feeding amounts is associated with the distance between light images as the spot light image information of when the feeding unit 23 is fed out by the feeding amount, the feeding amount associated with the distance between light images matching the distance between detection light images is detected as the feeding amount of the feeding unit 23.

According to the fourth detection method, the feeding amount of the feeding unit 23 can be detected according to the distance between detection light images without causing the binary indefiniteness.

Note that, in the fourth detection method, the position of the spot light image (detection light image position) can be adopted as the spot light image information instead of the distance between light images. In the case of adopting the position of the spot light image as the spot light image information, the feeding amount information storage unit 63 stores the feeding amount information in which each of the plurality of feeding amounts is associated with the position of the spot light image as the spot light image information of when the feeding unit 23 is fed out by the feeding amount. Moreover, in this case, the spot light image detection unit 62 detects the position of the spot light image.

Then, the feeding amount detection unit 64 detects the feeding amount associated with the position of the spot light image matching the position of the spot light image detected in the spot light image detection unit 62 as the feeding amount of the feeding unit 23 in the feeding amount information stored in the feeding amount information storage unit 63.

In addition, in the fourth detection method, the image as the spot light image can be adopted as the spot light image information similarly to the first detection method, and the spot size can be adopted as the spot light image information similarly to the second and third detection methods.

Here, in the fourth detection method, in the case of adopting the distance between light images as the spot light image information, two or more light sources 32 need to be provided. However, not all of the two or more light sources 32 need to emit spot light in the oblique direction, and at least one light source 32 is required to emit the spot light in the oblique direction.

Furthermore, in the fourth detection method, in the case of adopting the position of the spot light image as the spot light image information, one or more light sources 32 need to be provided.

<Another Configuration Example of Multi-eye Interchangeable Lens 20>

Figure 25:
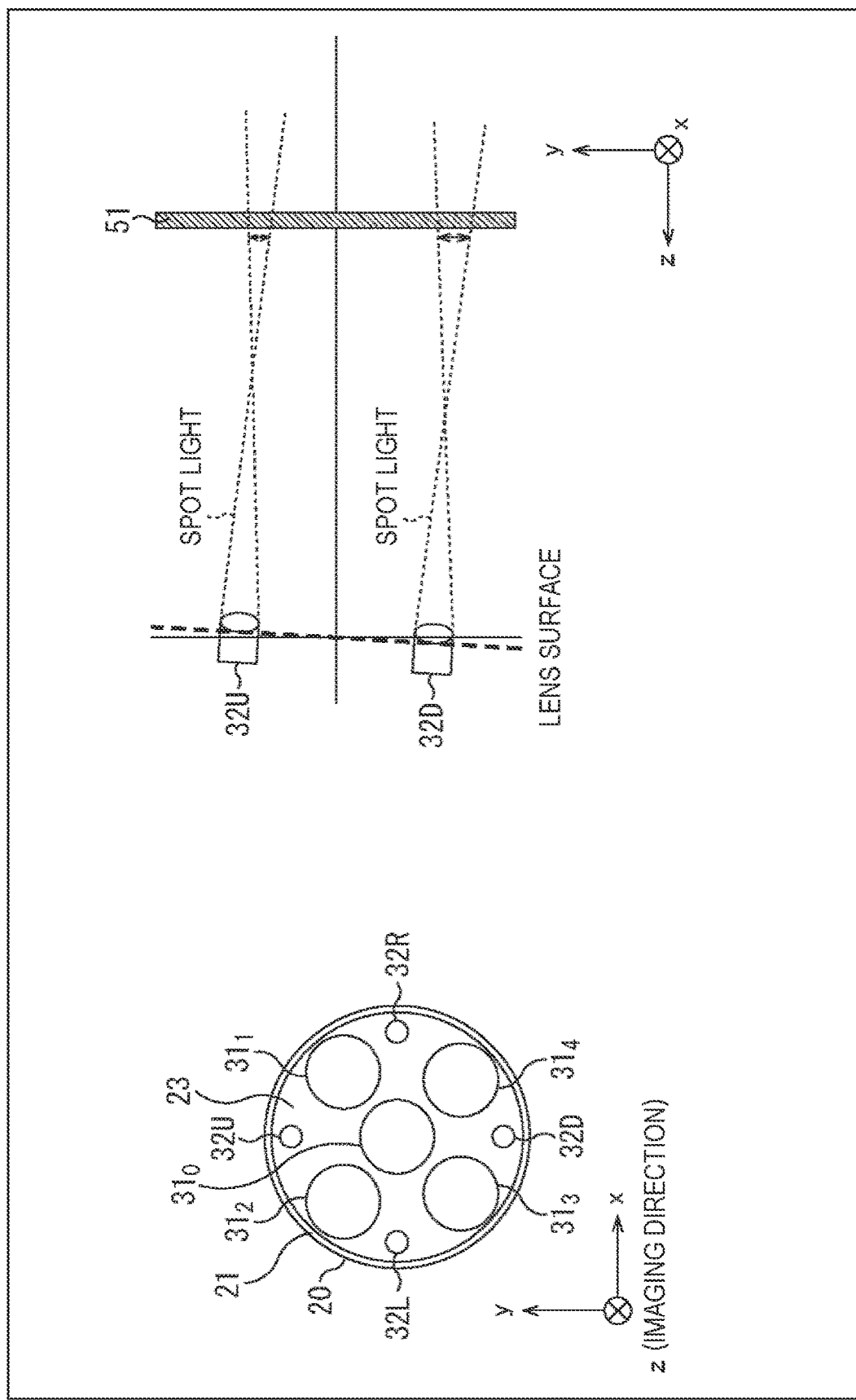
FIG. 25 is views illustrating another configuration example of the multi-eye interchangeable lens 20.

FIG. 25 is views illustrating another configuration example of the multi-eye interchangeable lens 20.

Note that, in the drawing, parts corresponding to those in FIGS. 4, 13, and the like are given the same reference numerals, and hereinafter, description thereof will be omitted as appropriate.

The multi-eye interchangeable lens 20 in FIG. 25 is configured similarly to the cases of FIGS. 4 and 13, and the like except that light sources 32U and 32D configured similarly to the light sources 32L and 32R are newly provided.

The multi-eye interchangeable lens 20 of FIG. 25 has a configuration in which the two light sources 32U and 32D as a plurality of light sources are provided on a straight line not parallel to a straight line connecting the light sources 32L and 32R, for example, an orthogonal straight line in plan view.

In a case where the multi-eye interchangeable lens having the two light sources 32U and 32D provided on the straight line orthogonal to the straight line connecting the light sources 32L and 32R as described above is mounted on the camera body 10, the spot sizes and positions of the spot light images of the spot lights emitted by the light sources 32L, 32R, 32U, and 32D change as illustrated in FIG. 25 when there is a lens tilt about the x axis or a lens tilt about the y axis of the multi-eye interchangeable lens 20, with respect to a case where there is no lens tilt.

Therefore, the lens tilt about the x axis and the lens tilt about the y axis of the multi-eye interchangeable lens 20 can be detected according to (the spot sizes and positions of) the spot light images.

In this case, when a lens tilt of an amount exceeding an allowable amount is detected, the user can be urged to re-attach the multi-eye interchangeable lens 20. Moreover, the amount of the lens tilt is detected, and the parallax information can be obtained or the region of the individual-eye image can be specified so as to cancel the influence of the lens tilt amount.

<Another Configuration Example of Light Sources 32L and 32R>

Figure 26:
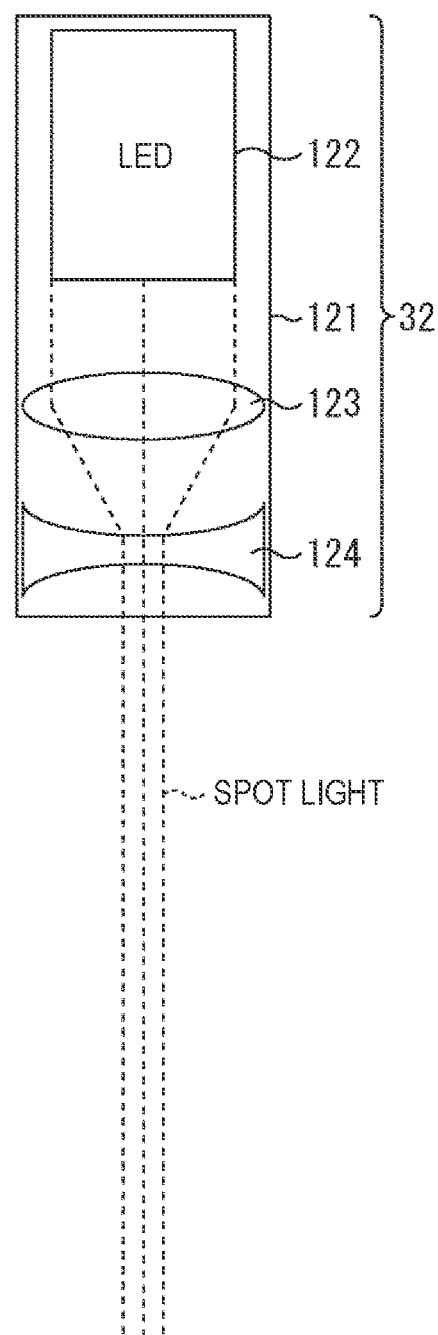
FIG. 26 is a cross-sectional view illustrating another configuration example of the light sources 32L and 32R.

FIG. 26 is a cross-sectional view illustrating another configuration example of the light sources 32L and 32R.

Note that, in the drawing, parts corresponding to those in FIG. 12 are given the same reference numerals, and hereinafter, description thereof will be omitted as appropriate.

In FIG. 26, the light source 32 includes the housing 121, the LED 122, and lenses 123 and 124.

Therefore, the light source 32 of FIG. 26 is common to the case of FIG. 12 in including the housing 121 to the lens 123, and is different from the case of FIG. 12 in newly including the lens 124.

The lens 124 is provided on the image sensor 51 side of the lens 123, and converts the spot light condensed by the lens 123 into a parallel light and emits the parallel light.

Therefore, the spot light emitted from the light source 32 in FIG. 26 is the parallel light. The light source 32 that emits the parallel light as the spot light is hereinafter also referred to as a parallel light source 32.

The parallel light source 32 can be provided in the feeding unit 23 of the multi-eye interchangeable lens 20. In the case of providing the parallel light source 32 in the feeding unit 23, the spot size is constant regardless of the feed out of the feeding unit 23. Therefore, by reducing the spot size, a calculation error and a calculation amount when obtaining the center of gravity of the spot light image as the position of the spot light image are reduced as compared with the case of adopting the non-parallel light, in which the spot size changes, as the spot light. Therefore, the attachment error and the feeding amount can be obtained with higher accuracy, and the load of calculation when obtaining the attachment error and the feeding amount can be reduced.

The parallel light source 32 can be provided in the feeding unit 23 such that the spot light becomes parallel to the lens barrel optical axis. Note that, in this case, the attachment error can be obtained using the spot light (spot light image) but the feeding amount cannot be detected.

The parallel light source 32 is provided in the feeding unit 23 such that the spot light is emitted in an oblique direction inclined from the lens barrel optical axis direction, whereby the feeding amount can be detected by the fourth detection method described with reference to FIGS. 21 to 24.

In addition, even in the case of adopting the parallel light sources 32, the two parallel light sources 32U and 32D as a plurality of parallel light sources can be provided on the straight line that is not parallel to the straight line connecting the parallel light sources 32L and 32R, for example, on the orthogonal straight line in plan view, as in the case of FIG. 25, for example.

In this case, when the multi-eye interchangeable lens 20 is mounted on the camera body 10, the positions of the spot light images of the spot lights emitted by the parallel light sources 32L, 32R, 32U, and 32D change according to the lens tilt about the x axis or the lens tilt about the y axis of the multi-eye interchangeable lens 20.

Figure 27:
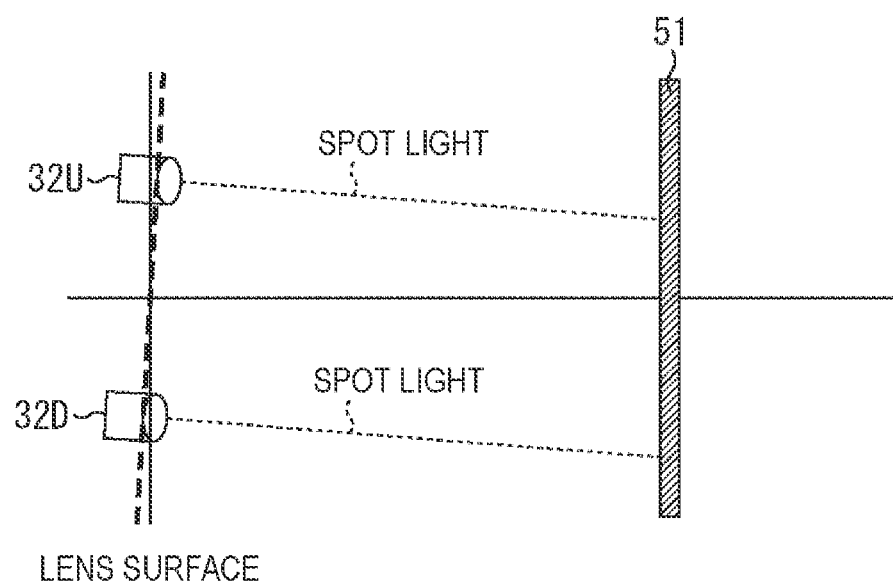
FIG. 27 is a view illustrating a state in which the position of the spot light image changes according to lens tilt.

FIG. 27 is a view illustrating a state in which the positions of the spot light images of the parallel lights emitted by the parallel light sources 32 change according to the lens tilt.

In the case where the multi-eye interchangeable lens 20 having the two light sources 32U and 32D provided on the straight line orthogonal to the straight line connecting the parallel light sources 32L and 32R is mounted on the camera body 10, the positions of the spot light images of the parallel lights emitted by the parallel light sources 32 change according to the lens tilt about the x axis or the lens tilt about the y axis of the multi-eye interchangeable lens 20.

Therefore, the lens tilt about the x axis and the lens tilt about the y axis of the multi-eye interchangeable lens 20 can be detected according to the positions of the spot light images.

In this case, when a lens tilt of an amount exceeding an allowable amount is detected, the user can be urged to re-attach the multi-eye interchangeable lens 20. Moreover, the amount of the lens tilt is detected, and the parallax information can be obtained or the region of the individual-eye image can be specified so as to cancel the influence of the lens tilt amount.

<Another Electrical Configuration Example of Camera System 1>

Figure 28:
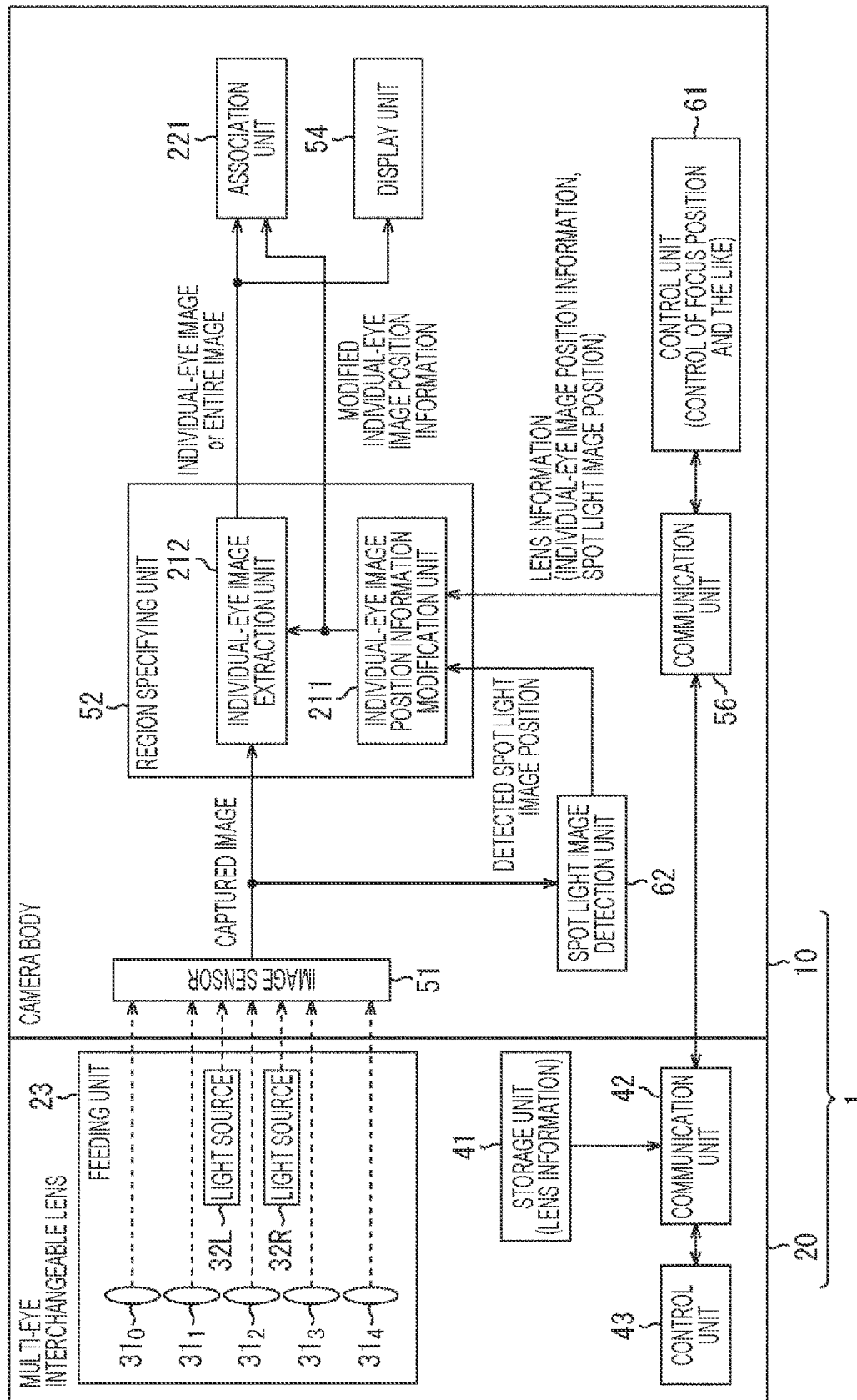
FIG. 28 is a block diagram illustrating another electrical configuration example of the camera system 1.

FIG. 28 is a block diagram illustrating another electrical configuration example of the camera system 1 of FIG. 1.

Note that, in the drawing, parts corresponding to those in FIG. 2 are given the same reference numerals, and hereinafter, description thereof will be omitted as appropriate.

Here, the camera system 1 (or lens-integrated camera system) to which the present technology is applied holds the individual-eye image position information for specifying the positions of the individual-eye images on the entire image (captured image) captured by the image sensor 51, that is, the individual-eye image position information indicating the emission positions of the imaging lights emitted from the plurality of individual-eye lenses $31_i$ in the image sensor 51. Moreover, the camera system 1 holds the spot light image position information for specifying the positions of the spot light images of the spot lights of the light sources 32.

Here, the entire image means the whole of the captured image captured by the image sensor 51, or an image obtained by deleting a part or the whole of an outside of all the individual-eye images included in the captured image from the whole of the captured image.

Note that the individual-eye image position information and the spot light image position information may be information calculated for each camera system 1 or may be information calculated for each model.

Furthermore, the individual-eye image position information may be information of absolute positions of the individual-eye images, or may be information of the absolute positions of the individual-eye images with respect to a reference lens using one predetermined individual-eye lens $31_i$ as the reference lens and information of relative positions of the other individual-eye images based on the position of the individual-eye image with respect to the reference lens.

The individual-eye image position information and the spot light image position information held by the camera system 1 may be, but not limited thereto, for example, values corresponding to the individual difference reflection position information (known reference position) and the individual difference spot light position information (known light position), respectively.

The camera system 1 corrects the individual-eye image position information by using the position of the spot light image (detected spot light image position information) detected from the entire image at the time of actual imaging (at the time of imaging the general captured image (unknown captured image)).

In the multi-eye interchangeable lens 20 of the camera system 1, the individual-eye lenses $31_i$ and the light sources 32 are integrally fed out. Therefore, even if the individual-eye lens $31_i$ is fed out with adjusted focus (or zoom), the individual-eye image position information can be accurately modified (corrected) using the detected spot light image position information of the light sources 32 integrally fed out with the individual-eye lenses $31_i$.

That is, when the individual-eye lenses $31_i$ are fed out, different positional deviation amounts are generated according to the feeding amount for "various reasons". However, even if the individual-eye lenses $31_i$ are fed out, the positional relationship between the individual-eye images and the light sources 32, that is, the positional relationship between the individual-eye images and the spot light images does not change. Therefore, by detecting the positions (detected spot light image position information) of the spot light images on the entire image at the time of actual imaging and grasping the deviation from the spot light image position information held by the camera system 1, the individual-eye image position information of the individual-eye images can be accurately modified.

The "various reasons" include, for example, a group of the individual-eye lenses $31_i$ (individual-eye lens unit) integrally moved at the time of feed out is inclined, the individual-eye lens unit rotates at the time of feed out, the multi-eye interchangeable lens 20 has a rotation error, an inclination error, and the like at the time of attachment even in the case of the same feeding amount due to the attachment error, and the like.

Since the camera system 1 can accurately modify the individual-eye image position information of the individual-eye images, the camera system 1 can accurately extract (cut out) a predetermined range centered on the optical axis center position from the entire image as the individual-eye images and can perform processing (generation of the parallax information or the like) of suppressing the influence of lens distortion or the like, using the modified individual-eye image position information (modified individual-eye image position information).

Note that the detected spot light image position information detected from the entire image at the time of actual imaging may be, but not limited to, for example, a value corresponding to the mount error spot light position information (unknown light position). In addition, the modified individual-eye image position information obtained by modifying the individual-eye image position information using the detected spot light image position information may be, but not limited to, for example, a value corresponding to the mount error reflection position information (unknown reference position).

In FIG. 28, the region specifying unit 52 includes an individual-eye image position information modification unit 211 and an individual-eye image extraction unit 212.

The individual-eye image position information and the spot light image position information stored as (part of) the lens information of the storage unit 41 of the multi-eye interchangeable lens 20 are supplied from the communication unit 56 to the individual-eye image position information modification unit 211. Moreover, the detected spot light image position information detected from the entire image (captured image) captured by the image sensor 51 is supplied from the spot light image detection unit 62 to the individual-eye image position information modification unit 211.

The individual-eye image position information modification unit 211 modifies the individual-eye image position information from the communication unit 56, using the spot light image position information from the communication unit 56 and the detected spot light image position information from the spot light image detection unit 62, and supplies the resultant modified individual-eye image position information to the individual-eye image extraction unit 212 and the association unit 221. In the individual-eye image position information modification unit 211, modification of the individual-eye image position information is performed similarly to the processing of obtaining the mount error reflection position information in the position calculation unit 57 (FIG. 2).

As described above, the modified individual-eye image position information is supplied from the individual-eye image position information modification unit 211 and the entire image (captured image) is supplied from the image sensor 51 to the individual-eye image extraction unit 212.

The individual-eye image extraction unit 212 obtains the region information indicating the regions of the individual-eye images for the individual-eye lenses $31_0$ to $31_4$ on the entire image from the image sensor 51, using the modified individual-eye image position information from the individual-eye image position information modification unit 211. For example, the individual-eye image extraction unit 212 obtains information indicating a rectangular region centered on the modified individual-eye image position information as the region information.

Then, the individual-eye image extraction unit 212 extracts the region indicated by the region information from the entire image from the image sensor 51 as the individual-eye image, and supplies the extracted individual-eye images to the display unit 54 and the association unit 221 as necessary.

Furthermore, the individual-eye image extraction unit 212 supplies the entire image from the image sensor 51 to the display unit 54 and the association unit 221 as necessary.

The display unit 54 displays the entire image and the individual-eye images from the individual-eye image extraction unit 212.

The association unit 221 associates the modified individual-eye image position information from the individual-eye image position information modification unit 211 and the individual-eye images or the entire image from the individual-eye image extraction unit 212.

The association unit 221 associates, for example, the individual-eye images extracted from the same entire image from the individual-eye image extraction unit 212. Furthermore, the association unit 221 associates, for example, the individual-eye images extracted from the same entire image and the modified individual-eye image position information used for extracting the individual-eye images from the individual-eye image extraction unit 212. Moreover, the association unit 221 associates, for example, the entire image (captured image) from the individual-eye image extraction unit 212 with the modified individual-eye image position information (imaging individual-eye image position) obtained by modifying the individual-eye image position information, using the detected spot light image position information detected from the entire image, from the individual-eye image position information modification unit 211.

The association can be performed by, for example, recording association targets in the same recording medium or by assigning the same identification (ID) to the association targets. Alternatively, the association can be performed using, for example, metadata of the association targets (metadata of the individual-eye images or the entire image to which the modified individual-eye image position information is associated).

The association unit 221 can collectively record or transmit information (associated information) associated by association.

Note that the association unit 221 can associate, for example, the spot light image position information (included in the lens information) with the detected spot light image position information detected from the entire image.

Furthermore, the associated information obtained in the association unit 221 can be a target for post-processing in the camera system 1 or an external device. In the post-processing, for example, the individual-eye images can be extracted from the entire image included in the associated information in which the entire image is associated with the modified individual-eye image position information, using the modified individual-eye image position information included in the associated information.

Furthermore, the association unit 221 can associate the entire image (captured image), the detected spot light image position information (detection light image position) detected from the entire image, the spot light image position information (storage light image position), and the individual-eye image position information (storage individual-eye image position). In this case, in the post-processing for the associated information in which the entire image, the detected spot light image position information, the spot light image position information, and the individual-eye image position information are associated with each other, the individual-eye image position information is modified using the detected spot light image position information and the spot light image position information, and the individual-eye images can be extracted from the entire image, using the resultant modified individual-eye image position information.

In addition, the association unit 221 can associate, for example, the spot light image position information (storage light image position), the difference between the spot light image position information and the detected spot light image position information (the difference between the storage light image position and the detection light image position), the individual-eye image position information (storage individual-eye image position), and the entire image (captured image).

Furthermore, the association unit 221 can adopt any association capable of specifying the position of the individual-eye image on the captured image.

As the target image to be associated, one composite image in which the individual-eye images extracted from the entire image are arranged can be adopted in addition to the entire image and the individual-eye images extracted from the entire image.

Furthermore, as the target information to be associated with the target image, arbitrary information capable of specifying the position of the individual-eye image on the captured image can be adopted in addition to the modified individual-eye image position information.

As the target information, for example, a set of the individual-eye image position information, the spot light image position information, and the detected spot light image position information can be adopted.

In the association of the target image and the target information, the target image and the target information can be associated with each other and stored in a storage medium, transmitted via a transmission medium, or made into one file.

Here, the "association" means, for example, making one data usable (linkable) when the other data is processed. The form of the target image and the target information as data (file) is arbitrary. For example, the target image and the target information may be collected as one piece of data (file) or may be individually set as data (file). For example, the target information associated with the target image may be transmitted on a transmission path different from a transmission path of the target image. Furthermore, for example, the target information associated with the target image may be recorded in a different recording medium from the target image or may be recorded in a different recording area in the same recording medium. The target image and the target information can be combined into one stream data or one file.

The target image may be a still image or a moving image. In the case of a moving image, the target image and the target information of each frame can be associated with each other.

The "association" can be performed for part of the data (file) instead of the entire data of the target image. For example, in a case where the target image is a moving image including a plurality of frames, the target information can be associated with an arbitrary unit of the target image, such as a plurality of frames, one frame, or a part in a frame.

Note that, in a case where the target image and the target information are individual data (files), the target image and the target information can be associated with each other by assigning the same ID (identification number) to both the target image and the target information. Furthermore, in a case where the target image and the target information are put together in one file, for example, the target information may be added to a header or the like of the file.

<Post-Processing Device>

Figure 29:
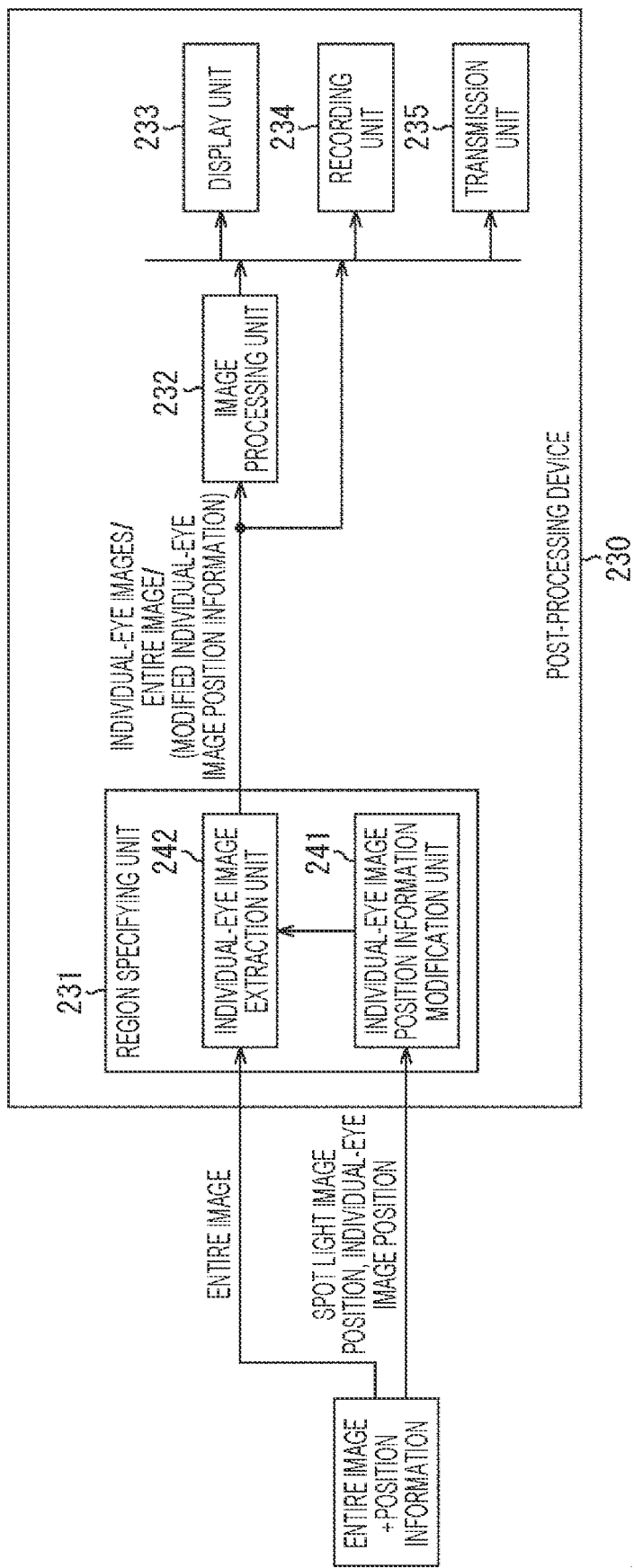
FIG. 29 is a block diagram illustrating a configuration example of a post-processing device that performs post-processing for associated information.

FIG. 29 is a block diagram illustrating a configuration example of a post-processing device that performs the post-processing for the associated information.

In FIG. 29, a post-processing device 230 includes a region specifying unit 231, an image processing unit 232, a display unit 233, a recording unit 234, and a transmission unit 235. The region specifying unit 231 includes an individual-eye image position information modification unit 241 and an individual-eye image extraction unit 242.

The associated information in which the entire image, the detected spot light image position information, the spot light image position information, and the individual-eye image position information are associated is supplied from a recording medium or a transmission medium (not illustrated) to the post-processing device 230.

Note that there are many ways for what types of information are associated and how to modify the information. For example, it is not necessary to associate the detected spot light image position information and the spot light image position information with the entire image or the like if spot light image positional deviation information indicating a positional deviation of the spot light image is calculated in advance from the detected spot light image position information and the spot light image position information, and the entire image or the individual-eye images are associated with the spot light image positional deviation information. Furthermore, the individual-eye image position information may be modified in advance, and the modified individual-eye image position information may be associated with the entire image or the individual-eye images. In this case, the modification for the individual-eye image position information in the post-processing becomes unnecessary. Moreover, as the detected spot light image position information, for example, information of an image portion of a region where the spot light image appears in the entire image can be adopted, in addition to the position itself of the spot light image on the entire image. In the case of adopting the information of an image portion of a region where the spot light image appears in the entire image as the detected spot light image position information, for example, the position of the spot light image on the entire image can be obtained from the information.

The detected spot light image position information, the spot light image position information, and the individual-eye image position information included in the associated information are supplied to the individual-eye image position information modification unit 241. The entire image included in the associated information is supplied to the individual-eye image extraction unit 242.

The individual-eye image position information modification unit 241 modifies the individual-eye image position information included in the associated information by using the detected spot light image position information and the spot light image position information included in the associated information, and supplies the resultant modified individual-eye image position information to the individual-eye image extraction unit 242. The individual-eye image position information modification unit 241 modifies the individual-eye image position information similarly to the individual-eye image position information modification unit 211 (FIG. 28).

The individual-eye image extraction unit 242 obtains the region information indicating the regions of the individual-eye images for the individual-eye lenses $31_0$ to $31_4$ on the entire image included in the associated information, using the modified individual-eye image position information from the individual-eye image position information modification unit 241.

Then, the individual-eye image extraction unit 242 extracts the region indicated by the region information from the entire image as an individual-eye image, and supplies the extracted individual-eye image to the image processing unit 232, the display unit 233, the recording unit 234, and the transmission unit 235 as necessary.

Note that the individual-eye image extraction unit 242 can supply the entire image and the modified individual-eye image position information in addition to the individual-eye image to the image processing unit 232, the display unit 233, the recording unit 234, and the transmission unit 235 as necessary.

The image processing unit 232 performs image processing for the individual-eye image from the individual-eye image extraction unit 242, and supplies a result of the image processing to the display unit 233, the recording unit 234, and the transmission unit 235 as necessary. The image processing unit 232 can generate the parallax information, using the individual-eye images from the individual-eye image extraction unit 242 and the modified individual-eye image position information, and can perform refocusing, using the parallax information and the individual-eye images, for example.

The display unit 233 displays the entire image, the individual-eye images, the modified individual-eye image position information from the individual-eye image extraction unit 242, and the result of the image processing of the image processing unit 232 as necessary. The recording unit 234 records the entire image, the individual-eye images, the modified individual-eye image position information from the individual-eye image extraction unit 242, and the result of the image processing of the image processing unit 232 in a recording medium (not illustrated) as necessary. The transmission unit 235 transmits the entire image, the individual-eye images, the modified individual-eye image position information from the individual-eye image extraction unit 242, and the result of the image processing of the image processing unit 232 via a transmission medium (not illustrated) as necessary.

The post-processing device 230 can perform, as the post-processing, processing of modifying the individual-eye image position information, using the detected spot light image position information and the spot light image position information, and processing of extracting the individual-eye images from the entire image, using the modified individual-eye image position information obtained by the modification of the individual-eye image position information.

The post-processing device 230 as described above can be provided in a device that reproduces, displays, and performs image processing for the individual-eye images.

Figure 30:
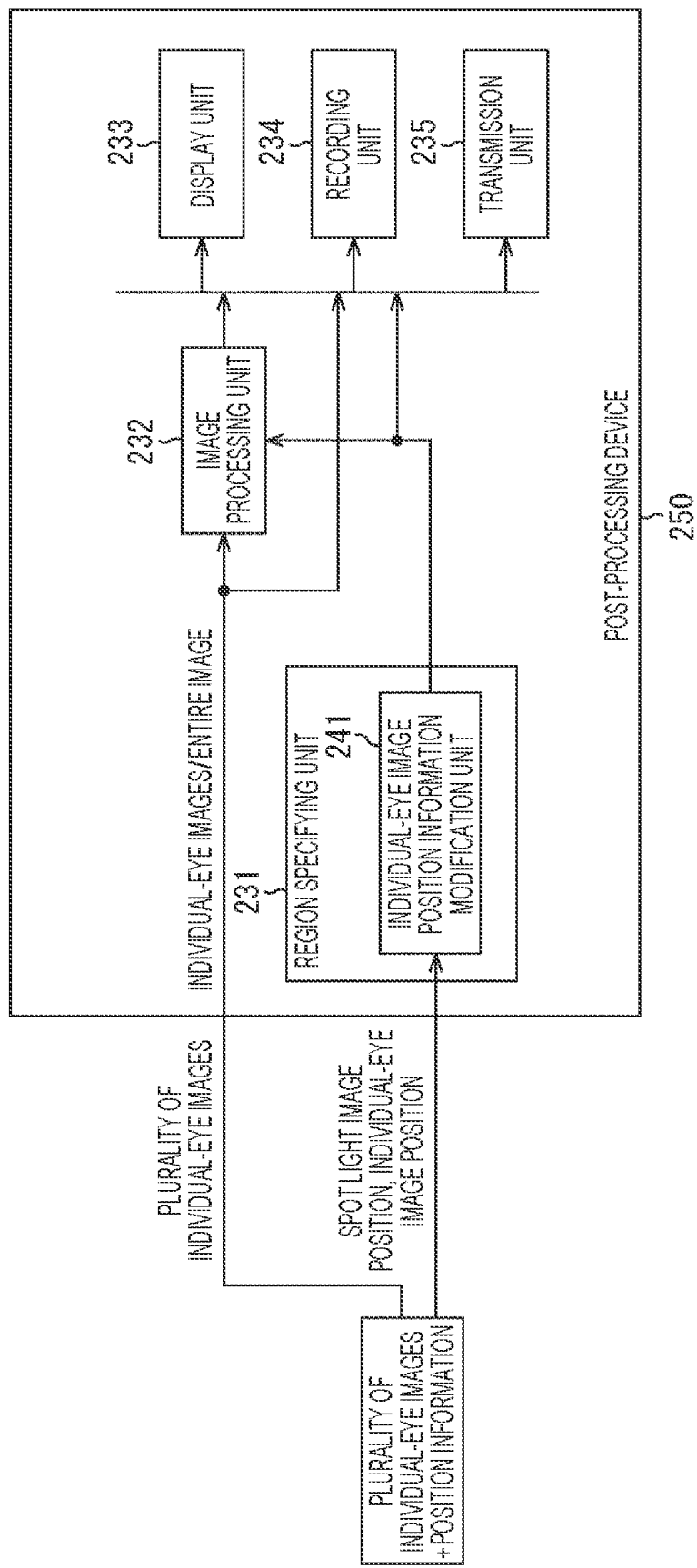
FIG. 30 is a block diagram illustrating another configuration example of the post-processing device that performs post-processing for associated information.

FIG. 30 is a block diagram illustrating another configuration example of the post-processing device that performs post-processing for associated information.

Note that, in the drawing, parts corresponding to the post-processing device 230 in FIG. 29 are given the same reference numerals, and hereinafter, description thereof will be omitted as appropriate.

In FIG. 30, a post-processing device 250 includes the region specifying unit 231 to the transmission unit 235. The region specifying unit 231 includes the individual-eye image position information modification unit 241.

Therefore, the post-processing device 250 is common to the post-processing device 230 in FIG. 29 in including the region specifying unit 231 to the transmission unit 235. However, the post-processing device 250 is different from the post-processing device 230 in that the region specifying unit 231 does not include the individual-eye image extraction unit 242.

Associated information in which a plurality of the individual-eye images, the detected spot light image position information, the spot light image position information, and a plurality of pieces of the individual-eye image position information respectively corresponding to the plurality of individual-eye images are associated is supplied from a recording medium or a transmission medium (not illustrated) to the post-processing device 250.

The detected spot light image position information, the spot light image position information, and the individual-eye image position information included in the associated information are supplied to the individual-eye image position information modification unit 241. The individual-eye images included in the associated information are supplied to the image processing unit 232, the display unit 233, the recording unit 234, and the transmission unit 235 as necessary.

The individual-eye image position information modification unit 241 modifies, as described with reference to FIG. 29, the individual-eye image position information included in the associated information by using the detected spot light image position information and the spot light image position information included in the associated information. The individual-eye image position information modification unit 241 supplies the modified individual-eye image position information obtained by the modifying the individual-eye image position information to the image processing unit 232, the display unit 233, the recording unit 234, and the transmission unit 235 as necessary.

The image processing unit 232 performs the image processing for the individual-eye images and supplies a result of the image processing to the display unit 233, the recording unit 234, and the transmission unit 235 as necessary. The image processing unit 232 can generate the parallax information, using the individual-eye images and the modified individual-eye image position information, and can perform refocusing, using the parallax information and the individual-eye images, similarly to the case of FIG. 29, for example.

The display unit 233 displays the entire image, the individual-eye images, the modified individual-eye image position information from the individual-eye image extraction unit 242, the result of the image processing of the image processing unit 232, and the modified individual-eye image position information obtained by the individual-eye image position information modification unit 241 as necessary. The recording unit 234 records the individual-eye images, the modified individual-eye image position information, the result of the image processing by the image processing unit 232, and the modified individual-eye image position information obtained by the individual-eye image position information modification unit 241 as necessary. The transmission unit 235 transmits the individual-eye images, the modified individual-eye image position information, the result of the image processing by the image processing unit 232, and the modified individual-eye image position information obtained by the individual-eye image position information modification unit 241 as necessary.

The post-processing device 250 can perform, as the post-processing, processing of modifying the individual-eye image position information, using the detected spot light image position information and the spot light image position information. Note that, in FIG. 30, the entire image can be included in the associated information. The entire image can be supplied to the image processing unit 232 to the transmission unit 235 and can be processed.

The post-processing device 250 as described above can be provided in a device that reproduces, displays, and performs image processing for the individual-eye images. Note that, as described above, the post-processing device 230 and the post-processing device 250 may be provided as a post processing function in the camera system 1.

<Other Embodiments of Camera System to which Present Technology is Applied>

<First Another Embodiment of Camera System>

Figure 31:
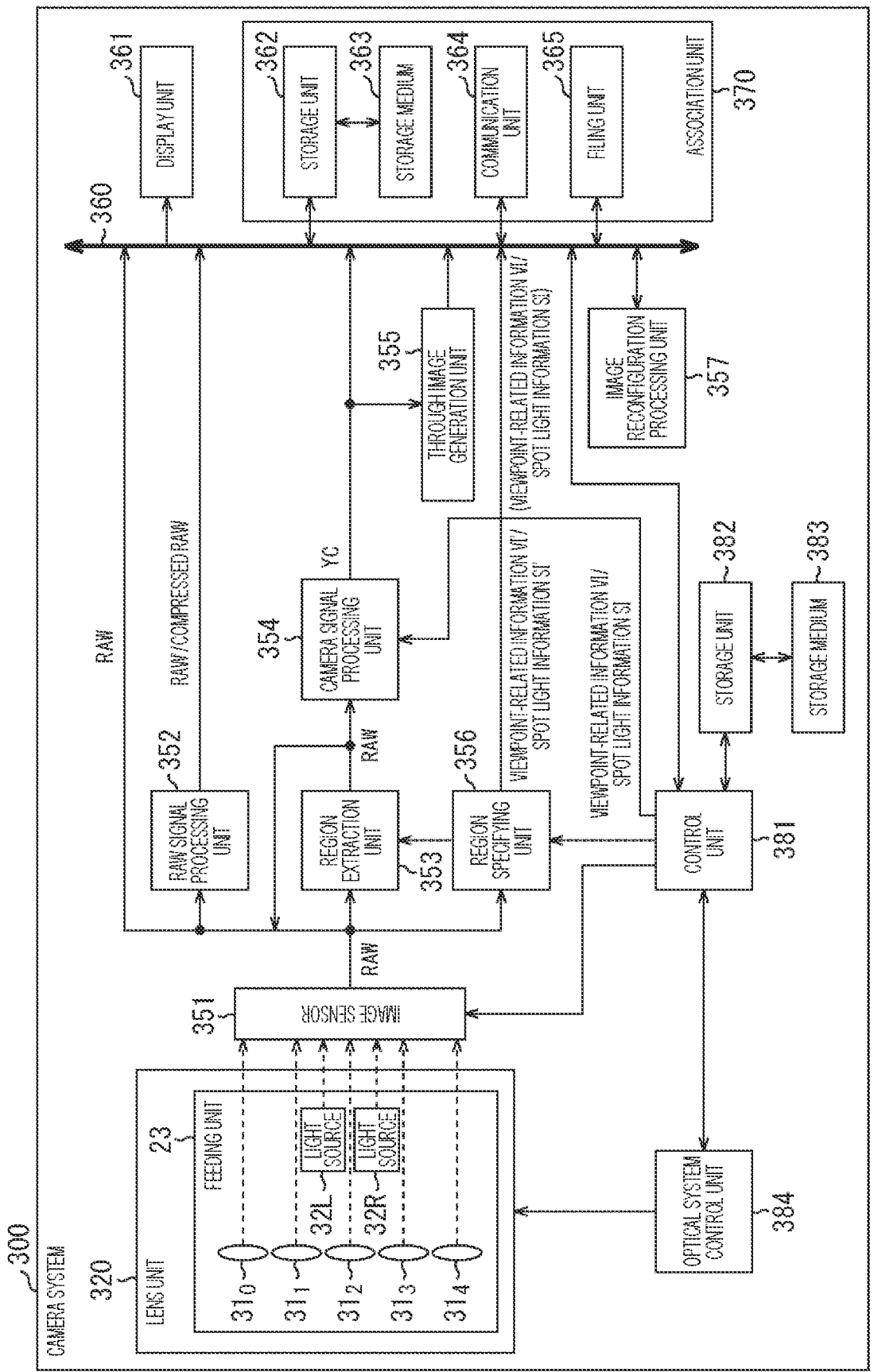
FIG. 31 is a block diagram illustrating an electrical configuration example of a first another embodiment of a camera system to which the present technology is applied.

FIG. 31 is a block diagram illustrating an electrical configuration example of a first another embodiment of a camera system to which the present technology is applied.

Note that, in the drawing, parts corresponding to those in FIG. 2 are given the same reference numerals, and hereinafter, description thereof will be omitted as appropriate.

In FIG. 31, a camera system 300 is a lens-integrated camera system. The camera system 300 includes a lens unit 320, an image sensor 351, a RAW signal processing unit 352, a region extraction unit 353, a camera signal processing unit 354, a through image generation unit 355, a region specifying unit 356, an image reconfiguration processing unit 357, a bus 360, a display unit 361, a storage unit 362, a communication unit 364, a filing unit 365, a control unit 381, a storage unit 382, and an optical system control unit 384.

The lens unit 320 includes the feeding unit 23. As described with reference to FIGS. 1 and 2, the feeding unit 23 includes the individual-eye lenses $31_0$ to $31_4$ and the light sources 32L and 32R.

The feeding unit 23 is moved inside the lens barrel 21 (FIG. 1) not illustrated in FIG. 31 in the optical axis direction of the lens barrel optical axis. Along with the movement of the feeding unit 23, the individual-eye lenses $31_0$ to $31_4$ and the light sources 32L and 32R included in the feeding unit 23 are also integrally moved.

The individual-eye lenses $31_i$ are configured such that optical paths of lights passing through the lenses are independent from one another. That is, the lights having passed through the individual-eye lenses $31_i$ are emitted at different positions from one another on the light-receiving surface (for example, an effective pixel region) of the image sensor 351 without entering the other individual-eye lenses $31_j$. At least the optical axes of the individual-eye lenses $31_i$ are located at different positions from one another on the light-receiving surface of the image sensor 351, and at least some of the lights having passed through the individual-eye lenses $31_i$ are emitted at different positions from one another on the light-receiving surface of the image sensor 351.

Therefore, in the captured image generated by the image sensor 351 (the entire image output by the image sensor 351), the images of an object formed via the individual-eye lenses $31_i$ are formed at different positions from one another. In other words, the images (individual-eye images) having viewpoints at the positions of the individual-eye lenses $31_i$ are obtained from the captured image.

The image sensor 351 is a complementary metal oxide semiconductor (CMOS) image sensor, and images an object to generate the captured image, similarly to the image sensor 51, for example. The light-receiving surface of the image sensor 351 is irradiated with the light beams condensed by the individual-eye lenses $31_0$ to $31_4$. The image sensor 351 receives the light beams (irradiation light) from the individual-eye lenses $31_0$ to $31_4$ and performs photoelectric conversion, thereby generating the captured image including the individual-eye images having viewpoints at the individual-eye lenses $31_i$.

The image sensor 351 may be a single-color (so-called monochrome) image sensor, similarly to the image sensor 51, or may be a color image sensor in which, for example, color filters in a Bayer array are arranged in a pixel group. That is, the captured image output by the image sensor 351 may be a monochrome image or a color image. Hereinafter, description will be given on the assumption that the image sensor 351 is a color image sensor and generates and outputs a captured image in a RAW format.

Note that, in the present embodiment, the RAW format means an image in a state where the positional relationship of arrangement of color filters of the image sensor 351 is maintained, and may include an image obtained by performing signal processing such as image size conversion processing, noise reduction processing, and defect correction processing of the image sensor 351, and compression encoding, for the image output from the image sensor 351.

The image sensor 351 can output the captured image (entire image) in the RAW format, which is generated by photoelectrically converting the irradiation light. For example, the image sensor 351 can supply the captured image (entire image) in the RAW format to at least one of the bus 360, the RAW signal processing unit 352, the region extraction unit 353, or the region specifying unit 356.

For example, the image sensor 351 can supply the captured image (entire image) in the RAW format to the storage unit 362 via the bus 360 and store the captured image in a storage medium 363. Furthermore, the image sensor 351 can supply the captured image (entire image) in the RAW format to the communication unit 364 via the bus 360 to transmit the captured image to the outside of the camera system 300. Furthermore, the image sensor 351 can supply the captured image (entire image) in the RAW format to the filing unit 365 via the bus 360 to convert the captured image into a file. Furthermore, the image sensor 351 can supply the captured image (entire image) in the RAW format to the image reconfiguration processing unit 357 via the bus 360 to perform the image reconfiguration processing.

Note that the image sensor 351 may be a single-plate image sensor or may be a set of image sensors (also referred to as a multi-plate image sensor) including a plurality of image sensors, such as a three-plate image sensor.

Note that, in the case of the multi-plate image sensor, the image sensors are not limited to the ones for RGB. All the image sensors may be for monochrome or may include color filters of a Bayer array or the like. Note that, in the case where all the color filters are of Bayer array, noise reduction can be performed by setting all the arrays to be the same and adjusting the positional relationships of mutual pixels, and it is also possible to improve the image quality, using the effect by so-called spatial pixel shifting, by shifting the positional relationship of the image sensors of RGB.

Even in the case of such a multi-plate imaging device, a plurality of individual-eye images or a plurality of viewpoint images is included in the captured image output from each image sensor, that is, from one image sensor.

The RAW signal processing unit 352 performs processing related to signal processing for the image in the RAW format. For example, the RAW signal processing unit 352 can acquire the captured image (entire image) in the RAW format supplied from the image sensor 351. Furthermore, the RAW signal processing unit 352 can perform predetermined signal processing for the acquired captured image. The content of this signal processing is arbitrary. For example, the signal processing may be defect correction, noise reduction, compression (encoding), or the like, or another signal processing. Of course, the RAW signal processing unit 352 can also perform a plurality of types of signal processing for the captured image. Note that the signal processing that can be performed for the image in the RAW format is limited to the signal processing in which the image after the signal processing is an image in a state where the positional relationship of arrangement of the color filters of the image sensor 351 is maintained as described above (in the case of the multi-plate imaging device, the image keeps a state of an R image, a G image, and a B image).

The RAW signal processing unit 352 can supply the captured image (RAW') in the RAW format to which the signal processing has been applied or the compressed (coded) captured image (compressed RAW) to the storage unit 362 via the bus 360 and store the captured image in the storage medium 363. Furthermore, the RAW signal processing unit 352 can supply the captured image (RAW') in the RAW format to which the signal processing has been applied or the compressed (coded) captured image (compressed RAW) to the communication unit 364 via the bus 360 to transmit the captured image. Moreover, the RAW signal processing unit 352 can supply the captured image (RAW') in the RAW format to which the signal processing has been applied or the compressed (coded) captured image (compressed RAW) to the filing unit 365 via the bus 360 to convert the captured image into a file. Furthermore, the RAW signal processing unit 352 can supply the captured image (RAW') in the RAW format to which the signal processing has been applied or the compressed (coded) captured image (compressed RAW) to the image reconfiguration processing unit 357 via the bus 360 to perform the image reconfiguration processing. Note that, in a case where it is not necessary to distinguish and describe RAW, RAW', and compressed RAW, they are referred to as RAW images.

The region extraction unit 353 performs processing related to extraction of a partial region (cutting out of a partial image) from the captured image in the RAW format. For example, the region extraction unit 353 can acquire the captured image (entire image) in the RAW format from the image sensor 351. Furthermore, the region extraction unit 353 can acquire information indicating a region to be extracted from the captured image (also referred to as extraction region information) supplied from the region specifying unit 356. Then, the region extraction unit 353 can extract a partial region (cut out a partial image) from the captured image on the basis of the extraction region information.

For example, the region extraction unit 353 can cut out the individual-eye image having the viewpoint at the position of each individual-eye lens $31_i$ from the captured image (entire image). Furthermore, in the captured image, a region from which the individual-eye image is cut out (a region corresponding to the individual-eye image) is also referred to as an individual-eye image region. For example, the region extraction unit 353 can acquire viewpoint-related information that is information supplied from the region specifying unit 356 and used to specify the individual-eye image region as the extraction region information, and can extract each individual-eye image region indicated in the viewpoint-related information, that is, cut out each individual-eye image, from the captured image. Then, the region extraction unit 353 can supply the cut out individual-eye images (RAW format) to the camera signal processing unit 354.

The viewpoint-related information may be, for example, a value corresponding to the individual difference reflection position information or the mount error reflection position information but is not limited thereto, and does not need to be set with the intention of distinguishing or correcting such an individual difference, a mount error, and the like. Even information simply indicating the relationship between the region of the individual-eye image on the captured image and the position of the spot light can be modified in consideration of various errors including the above-described errors.

The region extraction unit 353 can combine the individual-eye images cut out from the captured image (entire image) to generate a composite image. The composite image is obtained by combining the individual-eye images into one data or one image. For example, the region extraction unit 353 can generate one image in which the individual-eye images are arranged in a plane as a composite image. The region extraction unit 353 can supply the generated composite image (RAW format) to the camera signal processing unit 354.

Furthermore, for example, the region extraction unit 353 can supply the entire image to the camera signal processing unit 354. For example, the region extraction unit 353 can extract a partial region including all the individual-eye images from the acquired captured image (that is, cut out a partial image including all the individual-eye images) and supply the cut out partial image (that is, an image obtained by deleting a part or the whole of a region outside all of the individual-eye images included in the captured image) to the camera signal processing unit 354 as the entire image in the RAW format. The location (range) of the region to be extracted in this case may be determined in advance in the region extraction unit 353 or may be designated by the viewpoint-related information supplied from the region specifying unit 356.

Furthermore, the region extraction unit 353 can also supply the acquired captured image (that is, not the cut out partial image including all the individual-eye images but the entire captured image) to the camera signal processing unit 354 as the entire image in the RAW format.

Note that the region extraction unit 353 can supply the partial image (the entire image, the individual-eye images, or the composite image) in the RAW format cut out from the captured image as described above to the storage unit 362, the communication unit 364, the filing unit 365, the image reconfiguration processing unit 357, or the like via the bus 360, similarly to the case of the image sensor 351.

Furthermore, the region extraction unit 353 can supply the partial image (the entire image, the individual-eye images, or the composite image) in the RAW format to the RAW signal processing unit 352 to perform the predetermined signal processing or compression (encoding). Even in this case, the RAW signal processing unit 352 can supply the captured image (RAW') in the RAW format to which the signal processing has been applied or the compressed (coded) captured image (compressed RAW) to the storage unit 362, the communication unit 364, the filing unit 365, the image reconfiguration processing unit 357, or the like via the bus 360.

That is, at least one of the entire image, the individual-eye images, or the composite image may be a RAW image.

The camera signal processing unit 354 performs processing related to camera signal processing for the image. For example, the camera signal processing unit 354 can acquire the image (the entire image, the individual-eye images, or the composite image) supplied from the region extraction unit 353. Furthermore, the camera signal processing unit 354 can apply camera signal processing (camera process) to the acquired image. For example, the camera signal processing unit 354 can perform, for the image to be processed, color separation processing of separating each color of RGB to generate an R image, a G image, and a B image each having the same number of pixels as the image to be processed (demosaic processing in the case of using a mosaic color filter such as a Bayer array), YC conversion processing of converting a color space of the image after the color separation from RGB to YC (luminance/color difference), and the like. Furthermore, the camera signal processing unit 354 can perform processing such as defect correction, noise reduction, automatic white balance (AWB), or gamma correction for the image to be processed. Moreover, the camera signal processing unit 354 can also compress (encode) the image to be processed. Of course, the camera signal processing unit 354 can perform a plurality of pieces of camera signal processing for the image to be processed and can also perform camera signal processing other than the above-described example.

Note that, in the following description, the camera signal processing unit 354 is assumed to acquire the image in the RAW format, perform color separation processing or YC conversion for the image, and output an image (YC) in the YC format. This image may be the entire image, the individual-eye images, or the composite image. Furthermore, the image (YC) in the YC format may be encoded or may not be encoded. That is, the data output from the camera signal processing unit 354 may be coded data or uncoded image data.

That is, at least one of the entire image, the individual-eye images, or the composite image may be an image in the YC format (also referred to as a YC image).

Furthermore, the image output by the camera signal processing unit 354 may be an image to which complete development processing has not been applied, and may be an image to which some or all pieces of processing related to irreversible image quality adjustment (color adjustment) such as gamma correction and color matrix have not been applied, as the image (YC) in the YC format. In this case, the image (YC) in the YC format can be returned to the image in the RAW format substantially without deterioration in a subsequent stage, reproduction, or the like.

The camera signal processing unit 354 can supply the image (YC) in the YC format to which the camera signal processing has been applied to the storage unit 362 via the bus 360 and store the image (YC) in the storage medium 363. Furthermore, the camera signal processing unit 354 can supply the image (YC) in the YC format to which the camera signal processing has been applied to the communication unit 364 via the bus 360 to transmit the image to the outside. Furthermore, the camera signal processing unit 354 can supply the image (YC) in the YC format to which the camera signal processing has been applied to the filing unit 365 via the bus 360 to convert the image into a file. Moreover, the camera signal processing unit 354 can supply the image (YC) in the YC format to which the camera signal processing has been applied to the image reconfiguration processing unit 357 via the bus 360 to perform the image reconfiguration processing.

Furthermore, for example, the camera signal processing unit 354 can supply the image (YC) in the YC format to the through image generation unit 355.

Note that, in the case where the image in the RAW format (the entire image, the individual-eye images, or the composite image) is stored in the storage medium 363, the camera signal processing unit 354 may read the image in the RAW format from the storage medium 363 and perform the signal processing. Even in this case, the camera signal processing unit 354 can supply the image (YC) in the YC format to which the camera signal processing has been applied to the display unit 361, the storage unit 362, the communication unit 364, the filing unit 365, the image reconfiguration processing unit 357, or the like via the bus 360.

Furthermore, the camera signal processing unit 354 may perform the camera signal processing for the captured image (entire image) in the RAW format output from the image sensor 351, and the region extraction unit 353 may extract a partial region from the captured image (entire image) after the camera signal processing.

The through image generation unit 355 performs processing related to generation of a through image. The through image is an image displayed for the user to check the image in preparation for capture during capture or during preparation for capture (during non-recording). The through image is also referred to as a live view image or an electronic to electronic (EE) image. Note that the through image is an image before capture at the time of capturing a still image. However, at the time of capturing a moving image, the through images corresponding not only to an image during preparation for capture but also to an image during capture (recording) are displayed For example, the through image generation unit 355 can acquire the image (the entire image, the individual-eye images, or the composite image) supplied from the camera signal processing unit 354. Furthermore, the through image generation unit 355 can generate a through image that is an image for display by performing image size (resolution) conversion of converting the acquired image into the image size according to the resolution of the display unit 361, for example. The through image generation unit 355 can supply the generated through image to the display unit 361 via the bus 360 to display the through image.

The region specifying unit 356 performs processing related to specification (setting) of a region to be extracted from the captured image by the region extraction unit 353. For example, the region specifying unit 356 acquires the viewpoint-related information VI for specifying the region to be extracted from the captured image, and supplies the viewpoint-related information VI to the region extraction unit 353 as the extraction region information.

The viewpoint-related information VI may be, for example, a value corresponding to the above-described individual difference reflection position information but is not limited thereto. The viewpoint-related information VI indicates, for example, a design position of the individual-eye image in the captured image, a position at the time of imaging the known captured image, and the like.

The viewpoint-related information VI includes, for example, individual-eye region information indicating the individual-eye image region in the captured image. The individual-eye region information may represent the individual-eye image region in any manner. For example, the individual-eye image region may be represented by coordinates (also referred to as center coordinates of the individual-eye image region) indicating the position (optical axis center position) corresponding to the optical axis of the individual-eye lens 31 in the captured image and the resolution (the number of pixels) of the individual-eye image (individual-eye image region). That is, the individual-eye region information may include the center coordinates of the individual-eye image region and the resolution of the individual-eye image region in the captured image. In this case, the location of the individual-eye image region in the entire image can be specified according to the center coordinates of the individual-eye image region and the resolution (the number of pixels) of the individual-eye image region.

Note that the individual-eye image region information is set for each individual-eye image region. That is, in a case where the captured image includes a plurality of individual-eye images, the viewpoint-related information VI can include, for each individual-eye image (each individual-eye image region), viewpoint identification information (for example, an ID) for identifying the individual-eye image (region) and the individual-eye region information.

Furthermore, the viewpoint-related information VI can include other arbitrary information. For example, the viewpoint-related information VI may include viewpoint time information indicating the time when the captured image from which the individual-eye images are to be extracted is captured.

The region specifying unit 356 can supply the viewpoint-related information VI to the bus 360. For example, the region specifying unit 356 can supply the viewpoint-related information VI to the storage unit 362 via the bus 360 and store the viewpoint-related information VI in the storage medium 363. Furthermore, the region specifying unit 356 can supply the viewpoint-related information VI to the communication unit 364 via the bus 360 to transmit the viewpoint-related information VI. Moreover, the region specifying unit 356 can supply the viewpoint-related information VI to the filing unit 365 via the bus 360 to convert the viewpoint-related information VI into a file. In addition, the region specifying unit 356 can supply the viewpoint-related information VI to the image reconfiguration processing unit 357 via the bus 360 to be used for the image reconfiguration processing.

For example, the region specifying unit 356 may acquire the viewpoint-related information VI from the control unit 381 and supply the viewpoint-related information VI to the region extraction unit 353 and the bus 360. In this case, the control unit 381 reads the viewpoint-related information VI stored in the storage medium 383 via the storage unit 382, and supplies the viewpoint-related information VI to the region specifying unit 356. The region specifying unit 356 supplies the viewpoint-related information VI to the region extraction unit 353 and the bus 360.

The viewpoint-related information VI supplied to the storage unit 362, the communication unit 364, or the filing unit 365 via the bus 360 in this manner is associated with the image (the entire image, the individual-eye images, or the composite image) therein. For example, the storage unit 362 can store the supplied viewpoint-related information VI and the image (the entire image, the individual-eye images, or the composite image) in the storage medium 363 in association with each other. Furthermore, the communication unit 364 can transmit the supplied viewpoint-related information VI to the outside in association with the image (the entire image, the individual-eye images, or the composite image). Moreover, the filing unit 365 can generate one file including the supplied viewpoint-related information VI and the image (the entire image, the individual-eye images, or the composite image) in association with each other.

Furthermore, the region specifying unit 356 may acquire the captured image in the RAW format supplied from the image sensor 351, generate viewpoint-related information VI' on the basis of the captured image, and supply the generated viewpoint-related information VI' to the region extraction unit 353 and the bus 360. In this case, the region specifying unit 356 specifies each individual-eye image region from the captured image, and generates the viewpoint-related information VI' indicating the individual-eye image region (for example, indicating the individual-eye image region by the center coordinates of the individual-eye image region in the captured image and the resolution of the individual-eye image region). Then, the region specifying unit 356 supplies the generated viewpoint-related information VI' to the region extraction unit 353 and the bus 360. Note that spot light information SI' generated on the basis of the captured image by the region specifying unit 356 may be supplied together with the viewpoint-related information VI'.

The spot light information is information regarding the spot light image, and may be, but not limited to, for example, a value corresponding to the above-described individual difference spot light position information or mount error spot light position information.

The region specifying unit 356 may acquire the viewpoint-related information VI from the control unit 381, acquire the captured image in the RAW format supplied from the image sensor 351, generate the spot light information SI' on the basis of the captured image, add the spot light information SI' to the viewpoint-related information VI, and supply the viewpoint-related information VI to the region extraction unit 353 and the bus 360. In this case, the control unit 381 reads the viewpoint-related information VI stored in the storage medium 383 via the storage unit 382, and supplies the viewpoint-related information VI to the region specifying unit 356. The region specifying unit 356 corrects the viewpoint-related information VI using the spot light information SI', and generates the corrected viewpoint-related information VI'. The region specifying unit 356 supplies the viewpoint-related information VI' to the region extraction unit 353 and the bus 360.

Furthermore, the region specifying unit 356 may acquire the viewpoint-related information VI from the control unit 381, acquire the captured image in the RAW format supplied from the image sensor 351, generate the spot light information SI' on the basis of the captured image, correct the viewpoint-related information VI using the spot light information SI', and supply the corrected viewpoint-related information VI' to the region extraction unit 353 and the bus 360. In this case, the control unit 381 reads the viewpoint-related information VI stored in the storage medium 383 via the storage unit 382, and supplies the viewpoint-related information VI to the region specifying unit 356. The region specifying unit 356 corrects the viewpoint-related information VI using the spot light information SI' to generate the viewpoint-related information VI'. The region specifying unit 356 supplies the viewpoint-related information VI' to the region extraction unit 353 and the bus 360.

For example, the spot light information SI' may be, but not limited to, a value corresponding to the above-described mount error spot light position information or spot light image information. The spot light information SI' indicates, for example, the position and/or the spot size of the spot light image appearing in the captured image.

Here, the position of the individual-eye image in the captured image may be shifted with the movement of the feeding unit 23 due to various shifts associated with the movement of the feeding unit 23, such as a shift between the direction perpendicular to the light-receiving surface of the image sensor 351 and the moving direction of the feeding unit 23 and a rotational shift of the individual-eye lens $31_i$ associated with the movement of the feeding unit 23.

In the case where the position of the individual-eye image in the captured image is shifted with the movement of the feeding unit 23, when an image is cut out (extracted) from the position of the captured image indicated by the viewpoint-related information VI, an image of a region shifted from the individual-eye image region of the (original) individual-eye image as the individual-eye image.

Therefore, the region specifying unit 356 can detect a positional deviation (amount) of the individual-eye image in the captured image, using the position and/or spot size of the spot light image indicated by the spot light information SI' generated from the captured image.

Then, the region specifying unit 356 can obtain information for modifying the position of cutting out the individual-eye image from the captured image according to the positional deviation of the individual-eye image, and supply the information to the region extraction unit 353.

That is, the region specifying unit 356 corrects the viewpoint-related information VI so as to represent the position of the individual-eye image after the positional deviation according to the positional deviation of the individual-eye image, and supplies the viewpoint-related information VI' obtained by the correction to the region extraction unit 353.

Here, the storage medium 383 stores, for example, the viewpoint-related information VI and the spot light information SI. The spot light information SI may be, but not limited to, for example, a value corresponding to the above-described individual difference spot light position information. The spot light information SI indicates, for example, a design position and/or spot size of the spot light image in the captured image, a position and/or a spot size during imaging of the known captured image, and the like.

The viewpoint-related information VI and the spot light information SI are information obtained at the same timing. For example, in a case where the viewpoint-related information VI is information indicating the position (viewpoint) or the like of a design individual-eye image, the spot light information SI is also information indicating the position or the like of a design spot light image. Furthermore, for example, in a case where the viewpoint-related information VI is information indicating the position or the like of the individual-eye image detected at the time of imaging the known captured image, the spot light information SI is also information indicating the position or the like of the spot light image detected at the time of imaging the known captured image.

For example, the region specifying unit 356 can detect a difference between the spot light information SI and the spot light information SI' generated from the captured image as the positional deviation of the individual-eye image in the captured image. Then, the region specifying unit 356 can correct the viewpoint-related information VI, using the positional deviation of the individual-eye image in the captured image, that is, the difference between the spot light information SI and the spot light information SI' generated from the captured image, and generate the viewpoint-related information VI' in which the positional deviation of the individual-eye image in the captured image has been corrected (modified).

In addition, the region specifying unit 356 can detect the feeding amount of the feeding unit 23, using the spot light information SI' generated from the captured image.

The image reconfiguration processing unit 357 performs processing related to image reconfiguration. For example, the image reconfiguration processing unit 357 can acquire the image in the YC format (the entire image, the individual-eye images, or the composite image) from the camera signal processing unit 354 or the storage unit 362 via the bus 360. Furthermore, the image reconfiguration processing unit 357 can acquire the viewpoint-related information from the region specifying unit 356 or the storage unit 362 via the bus 360.

Moreover, the image reconfiguration processing unit 357 can perform image processing such as generation of depth information and refocusing for generating (reconfiguring) an image focused on an arbitrary object, for example, using the acquired image and the viewpoint-related information associated with the acquired image. For example, in the case where the individual-eye image is to be processed, the image reconfiguration processing unit 357 performs the processing such as generation of depth information and refocusing, using each individual-eye image. Furthermore, in the case where the captured image or the composite image is to be processed, the image reconfiguration processing unit 357 extracts each individual-eye image from the captured image or the composite image, and performs the processing such as generation of depth information and refocusing, using the extracted individual-eye image.

The image reconfiguration processing unit 357 can supply the generated depth information and the refocused image as processing results to the storage unit 362 via the bus 360 and store the processing results in the storage medium 363. Furthermore, the image reconfiguration processing unit 357 can supply the generated depth information and the refocused image as the processing results to the communication unit 364 via the bus 360 to transmit the processing results to the outside. Moreover, the image reconfiguration processing unit 357 can supply the generated depth information and the refocused image as the processing results to the filing unit 365 via the bus 360 to convert the processing results into a file.

The image sensor 351, the RAW signal processing unit 352, the region extraction unit 353, the camera signal processing unit 354, the through image generation unit 355, the region specifying unit 356, the image reconfiguration processing unit 357, the display unit 361, the storage unit 362, the communication unit 364, and the filing unit 365 are connected to the bus 360. The bus 360 functions as a transmission medium (transmission path) for various data exchanged between these blocks. Note that the bus 360 may be implemented by wire or wireless means.

The display unit 361 includes, for example, a liquid crystal panel, an organic electro luminescence (EL) panel, or the like, and is provided integrally with or separately from the housing of the camera system 300. For example, the display unit 361 may be provided on a back surface (a surface opposite to a surface on which the lens unit 320 is provided) of the housing of the camera system 300.

The display unit 361 performs processing related to image display. For example, the display unit 361 can acquire the through image in the YC format supplied from the through image generation unit 355, convert the through image into the RGB format, and display the image in the RGB format. In addition, the display unit 361 can also display information such as a menu and settings of the camera system 300, for example.

Furthermore, the display unit 361 can acquire and display the image in the YC format (the entire image, the individual-eye images, or the composite image) supplied from the storage unit 362. Furthermore, the display unit 361 can acquire and display a thumbnail image in the YC format supplied from the storage unit 362. Moreover, the display unit 361 can acquire and display the image in the YC format (the entire image, the individual-eye images, or the composite image) supplied from the camera signal processing unit 354.

The storage unit 362 controls storage of the storage medium 363 including, for example, a semiconductor memory or the like. The storage medium 363 may be a removable storage medium or a storage medium built in the camera system 300. For example, the storage unit 362 can store the image (the entire image, the individual-eye images, or the composite image) supplied via the bus 360 in the storage medium 363 according to the control unit 381, or the user's operation, or the like.

For example, the storage unit 362 can acquire the image in the RAW format (the entire image, the individual-eye images, or the composite image) supplied from the image sensor 351 or the region extraction unit 353 and store the image in the storage medium 363. Furthermore, the storage unit 362 can acquire the image (the entire image, the individual-eye images, or the composite image) in the RAW format to which the signal processing has been applied or the compressed (coded) image (the entire image, the individual-eye images, or the composite image) in the RAW format supplied from the RAW signal processing unit 352, and store the image in the storage medium 363. Moreover, the storage unit 362 can acquire the image in the YC format (the entire image, the individual-eye images, or the composite image) supplied from the camera signal processing unit 354 and store the image in the storage medium 363.

At that time, the storage unit 362 can acquire the viewpoint-related information supplied from the region specifying unit 356 and associate the viewpoint-related information with the above-described image (the entire image, the individual-eye images, or the composite image). That is, the storage unit 362 can store the image (the entire image, the individual-eye images, or the composite image) and the viewpoint-related information in the storage medium 363 in association with each other. That is, the storage unit 362 functions as an association unit that associates at least one of the entire image, the individual-eye images, or the composite image with the viewpoint-related information.

Furthermore, for example, the storage unit 362 can acquire the depth information and the refocused image supplied from the image reconfiguration processing unit 357, and store the information in the storage medium 363. Moreover, the storage unit 362 can acquire the file supplied from the filing unit 365 and store the file in the storage medium 363. This file includes, for example, the image (the entire image, the individual-eye images, or the composite image) and the viewpoint-related information. That is, in this file, the image (the entire image, the individual-eye images, or the composite image) and the viewpoint-related information are associated with each other.

Furthermore, for example, the storage unit 362 can read the data, files, and the like stored in the storage medium 363 according to the control unit 381, the user's operation, or the like, and supply the read data, files, and the like to the camera signal processing unit 354, the display unit 361, the communication unit 364, the filing unit 365, the image reconfiguration processing unit 357, or the like via the bus 360. For example, the storage unit 362 can read the image in the YC format (the entire image, the individual-eye images, or the composite image) from the storage medium 363, supply the image to the display unit 361, and display the image. Furthermore, the storage unit 362 can read the image in the RAW format (the entire image, the individual-eye images, or the composite image) from the storage medium 363, supply the image to the camera signal processing unit 354, and apply the camera signal processing to the image.

Furthermore, the storage unit 362 can read the image (the entire image, the individual-eye images, or the composite image) and the data or files of the viewpoint-related information stored in the storage medium 363 in association with each other, and supply the data or files to other processing units. For example, the storage unit 362 can read the image (the entire image, the individual-eye images, or the composite image) and viewpoint-related information associated with each other from the storage medium 363, and supply the image and viewpoint-related information to the image reconfiguration processing unit 357 to perform the processing such as generation and refocusing of depth information. Furthermore, the storage unit 362 can read the image (the entire image, the individual-eye images, or the composite image) and the viewpoint-related information associated with each other from the storage medium 363, and supply the image and the viewpoint-related information to the communication unit 364 to transmit the image and the viewpoint-related information. Moreover, the storage unit 362 can read the image (the entire image, the individual-eye images, or the composite image) and the viewpoint-related information associated with each other from the storage medium 363, and supply the image and the viewpoint-related information to the filing unit 365 to convert the image and the viewpoint-related information into a file.

Note that the storage medium 363 may be a read only memory (ROM) or a rewritable memory such as a random access memory (RAM) or a flash memory. In the case of a rewritable memory, the storage medium 363 can store any information.

The communication unit 364 communicates with a server on the Internet, a PC on a wired or wireless LAN, other external devices, or the like by an arbitrary communication method. For example, the communication unit 364 can transmit the data or files of the image (the entire image, the individual-eye images, or the composite image) and the viewpoint-related information to a communication partner (external device) by a streaming method, an upload method, or the like through the communication according to the control unit 381, the user's operation, or the like.

For example, the communication unit 364 can acquire and transmit the image in the RAW format (the entire image, the individual-eye images, or the composite image) supplied from the image sensor 351 or the region extraction unit 353. Furthermore, the communication unit 364 can acquire and transmit the image in the RAW format (the entire image, the individual-eye images, or the composite image) to which the signal processing has been applied or the compressed (coded) image (the entire image, the individual-eye images, or the composite image) supplied from the RAW signal processing unit 352. Moreover, the communication unit 364 can acquire and transmit the image in the YC format (the entire image, the individual-eye images, or the composite image) supplied from the camera signal processing unit 354.

At that time, the communication unit 364 can acquire the viewpoint-related information supplied from the region specifying unit 356 and associate the viewpoint-related information with the above-described image (the entire image, the individual-eye images, or the composite image). That is, the communication unit 364 can transmit the image (the entire image, the individual-eye images, or the composite image) and the viewpoint-related information in association with each other. For example, in the case of transmitting the image by a streaming method, the communication unit 364 repeats processing of acquiring the image to be transmitted (the entire image, the individual-eye images, or the composite image) from the processing unit that supplies the image, and transmitting the image and the viewpoint-related information supplied from the region specifying unit 356 in association with each other. That is, the communication unit 364 functions as an association unit that associates at least one of the entire image, the individual-eye images, or the composite image with the viewpoint-related information.

Furthermore, for example, the communication unit 364 can acquire and transmit the depth information and the refocused image supplied from the image reconfiguration processing unit 357. Moreover, the communication unit 364 can acquire and transmit the file supplied from the filing unit 365. This file includes, for example, the image (the entire image, the individual-eye images, or the composite image) and the viewpoint-related information. That is, in this file, the image (the entire image, the individual-eye images, or the composite image) and the viewpoint-related information are associated with each other.

The filing unit 365 performs processing related to file generation. For example, the filing unit 365 can acquire the image in the RAW format (the entire image, the individual-eye images, or the composite image) supplied from the image sensor 351 or the region extraction unit 353. Furthermore, the filing unit 365 can acquire the image in the RAW format (the entire image, the individual-eye images, or the composite image) to which the signal processing has been applied or the compressed (coded) image (the entire image, the individual-eye images, or the composite image) in the RAW format supplied from the RAW signal processing unit 352. Moreover, the filing unit 365 can acquire the image in the YC format (the entire image, the individual-eye images, or the composite image) supplied from the camera signal processing unit 354. Furthermore, for example, the filing unit 365 can acquire the viewpoint-related information supplied from the region specifying unit 356.

The filing unit 365 can associate a plurality of pieces of acquired data with one another by converting the plurality of data into a file and generating one file including the plurality of pieces of data. For example, the filing unit 365 can associate the above-described image (the entire image, the individual-eye images, or the composite image) and the viewpoint-related information with each other by generating one file from the image and the viewpoint-related information. That is, the filing unit 365 functions as an association unit that associates at least one of the entire image, the individual-eye images, or the composite image with the viewpoint-related information.

Furthermore, for example, the filing unit 365 can acquire the depth information and the refocused image supplied from the image reconfiguration processing unit 357 and convert the information into a file. Moreover, the filing unit 365 can generate one file from the image (the entire image, the individual-eye images, or the composite image) and the viewpoint-related information associated with each other supplied from the storage unit 362.

Note that the filing unit 365 can generate a thumbnail image of the image to be filed (for example, the individual-eye images) and include the thumbnail image in the generated file. That is, the filing unit 365 can associate the thumbnail image with the image (the entire image, the individual-eye images, or the composite image) and the viewpoint-related information by generating the file.

The filing unit 365 can supply the generated file (the image and the viewpoint-related information associated with each other) to the storage unit 362 via the bus 360, for example, and store the file in the storage medium 363. Furthermore, the filing unit 365 can supply the generated file (the image and the viewpoint-related information associated with each other) to the communication unit 364 via the bus 360, for example, to transmit the file.

The storage unit 362, the communication unit 364, and the filing unit 365 are also referred to as an association unit 70. The association unit 70 associates the image (the entire image, the individual-eye images, or the composite image) with the viewpoint-related information. For example, the storage unit 362 can cause the storage medium 363 to store at least one of the entire image, the individual-eye images, or the composite image in association with the viewpoint-related information. Furthermore, the communication unit 364 can transmit at least one of the entire image, the individual-eye images, or the composite image in association with the viewpoint-related information. Moreover, the filing unit 365 can associate the entire image, the individual-eye images, or the composite image, and the viewpoint-related information by generating one file from at least one of the entire image, the individual-eye images, or the composite image, and the viewpoint-related information.

The association unit 70 can associate the spot light information in addition to the image (the entire image, the individual-eye images, or the composite image) and the viewpoint-related information.

The control unit 381 performs control processing regarding the camera system 300. That is, the control unit 381 can cause each unit of the camera system 300 to execute processing. For example, the control unit 381 can cause the lens unit 320 (each of the individual-eye lenses $31_i$) via the optical system control unit 384 to set the optical system regarding imaging such as an aperture and a focus position. Furthermore, the control unit 381 can control the image sensor 351 to cause the image sensor 351 to perform imaging (photoelectric conversion) and generate the captured image.

Moreover, the control unit 381 can supply the viewpoint-related information VI and further the spot light information SI to the region specifying unit 356 to specify the region to be extracted from the captured image. The control unit 381 can read the viewpoint-related information VI and the spot light information SI stored in the storage medium 383 via the storage unit 382 and supply the read information to the region specifying unit 356.

Furthermore, the control unit 381 can acquire the image via the bus 360 and control the aperture via the optical system control unit 384 on the basis of brightness of the image. Moreover, the control unit 381 can control the focus via the optical system control unit 384 on the basis of sharpness of the image. Furthermore, the control unit 381 can control the camera signal processing unit 354 on the basis of an RGB ratio of the image to control a white balance gain.

The storage unit 382 controls storage of the storage medium 383 including, for example, a semiconductor memory or the like. The storage medium 383 may be a removable storage medium or a built-in memory. The storage medium 383 stores, for example, the viewpoint-related information VI. The viewpoint-related information VI is information corresponding to (each of the individual-eye lenses 31 of) the lens unit 320 and the image sensor 351. That is, the viewpoint-related information VI is information regarding the individual-eye image having the viewpoint at the position of each individual-eye lens 31 of the lens unit 320, and is information used to specify the individual-eye image region. The storage medium 383 can further store the spot light information SI.

For example, the storage unit 382 can read the viewpoint-related information VI and the spot light information SI stored in the storage medium 383 according to the control unit 381 or the user's operation, and supply the read information to the control unit 381.

Note that the storage medium 383 may be a ROM or a rewritable memory such as a RAM or a flash memory. In the case of a rewritable memory, the storage medium 383 can store arbitrary information.

Furthermore, the storage unit 382 and the storage medium 383 may be substituted by the storage unit 362 and the storage medium 363. That is, the information (viewpoint-related information VI or the like) to be stored in the storage medium 383 may be stored in the storage medium 363. In this case, the storage unit 382 and the storage medium 383 may be omitted.

The optical system control unit 384 controls (the feeding unit 23, the individual-eye lenses $31_i$, and the like of) the lens unit 320 under the control of the control unit 381. For example, the optical system control unit 384 can control each individual-eye lens $31_i$ and the aperture to control one or both of a focal length and an f-number of each of the individual-eye lenses $31_i$. Note that, in a case where the camera system 300 has an electric focus adjustment function, the optical system control unit 384 can control the focus (focal length) (of each individual-eye lens $31_i$) of the lens unit 320. Furthermore, the optical system control unit 384 may be able to control the aperture (F value) of each individual-eye lens $31_i$.

Note that the camera system 300 may include a mechanism (physical configuration) that controls the focal length by manually operating a focus ring provided in the lens barrel instead of having such an electric focus adjustment function. In that case, the optical system control unit 384 can be omitted.

<Association of Viewpoint-related Information and the Like>

In the camera system 300, as described above, an object is captured in the image sensor 351 via the lens unit 320 (the plurality of individual-eye lenses $31_i$), and the captured image including the individual-eye images that are images corresponding to the individual-eye lenses $31_i$ is generated. The camera system 300 extracts some or all of the individual-eye images from the captured image, thereby generating the individual-eye images having the viewpoints at the positions of the individual-eye lenses $31_i$. Since the plurality of individual-eye images extracted from one captured image is images of different viewpoints from one another, it is possible to perform processing such as depth estimation by multi-eye matching and correction for suppressing the attachment error of the multi-eye lens, using these individual-eye images, for example. However, to perform the processing, information such as a relative position between the individual-eye images is necessary.

Therefore, the camera system 300 associates the viewpoint-related information that is information used to specify regions of the plurality of individual-eye images in the captured image, with the captured image generated by imaging the object with the image sensor 351 as one imaging element via the plurality of individual-eye lenses $31_i$ having independent optical paths of each other, the plurality of individual-eye images having the viewpoints at the positions of the plurality of individual-eye lenses $31_i$ extracted from the captured image, or the composite image obtained by combining the plurality of individual-eye images.

For example, the association unit 70 acquires the viewpoint-related information corresponding to the image (the entire image, the individual-eye images, or the composite image) from the region specifying unit 356, and associates the image with the viewpoint-related information. For example, the storage unit 362 causes the storage medium 363 to store at least one of the entire image, the individual-eye images, or the composite image in association with the viewpoint-related information. Furthermore, the communication unit 364 transmits at least one of the entire image, the individual-eye images, or the composite image in association with the viewpoint-related information. Moreover, the filing unit 365 associates the entire image, the individual-eye images, or the composite image, and the viewpoint-related information by generating one file from at least one of the entire image, the individual-eye images, or the composite image, and the viewpoint-related information.

With the above association, not only the camera system 300 but also a system other than the camera system 300 can perform high-accuracy image processing for the individual-eye images or the like, using the viewpoint-related information.

In the association, the individual-eye images and the like can be associated with the viewpoint-related information VI. Furthermore, in the association, the individual-eye images and the like can be associated with the corrected viewpoint-related information VI' obtained by correcting the viewpoint-related information VI. Furthermore, in the association, the individual-eye images and the like can be associated with the viewpoint-related information VI, the spot light information SI, and the spot light information SI'. Furthermore, in the association, the individual-eye images and the like can be associated with the viewpoint-related information VI and the difference between the spot light information SI and the spot light information SI'.

In the case of associating the individual-eye images and the like with the viewpoint-related information VI', in the case of associating the individual-eye image and the like with the viewpoint-related information VI, the spot light information SI, and the spot light information SI', and in the case of associating the individual-eye image and the like with the viewpoint-related information VI and the difference between the spot light information SI and the spot light information SI', even if the positional deviation of the individual-eye image in the captured image occurs with the movement of the feeding unit 23, the position of each individual-eye image (the position of the viewpoint) in the captured image can be accurately recognized.

<Treatment of Deviation of Attachment Position of Lens Unit 320>

In the lens-integrated camera system 300, the attachment position of the lens unit 320 may deviate due to the manufacturing error. Moreover, the attachment position of the lens unit 320 may deviate with the movement of the feeding unit 23. When the attachment position of the lens unit 320 deviates and the attachment error occurs at the attachment position, the accuracy of processing of cutting out the individual-eye images from the captured image and calculating the parallax information using the individual-eye images is reduced.

Therefore, the region specifying unit 356 can detect the attachment error as the deviation (amount) of the attachment position of the lens unit 320, using the spot light images appearing in the captured image.

For example, the region specifying unit 356 can detect, from the captured image, the incident ranges of the spot lights emitted from the light sources 32L and 32R to the image sensor 351, that is, the spot light images appearing in the captured image, and can generate (detect) the spot light information SI' related to the spot light images.

Moreover, the region specifying unit 356 can detect the difference between the spot light information SI' and the spot light information SI, for example, the difference between the position of the spot light image represented by the spot light information SI' and the position of the spot light image represented by the spot light information SI, as the attachment error.

Then, the region specifying unit 356 can correct the viewpoint-related information VI using the attachment error and generate the viewpoint-related information VI'. For example, the region specifying unit 356 can correct the position of the individual-eye image represented by the viewpoint-related information VI by the difference between the position of the spot light image represented by the spot light information SI' and the position of the spot light image represented by the spot light information SI according to the spot light information SI and the spot light information SI', and generate the viewpoint-related information VI' as the information for specifying the position of the individual-eye image that deviates according to the attachment error.

The region extraction unit 353 can accurately cut out the individual-eye image by cutting out the individual-eye image from the captured image, using the viewpoint-related information VI'. Moreover, the region extraction unit 353 accurately specifies the position of the viewpoint of the individual-eye image, using the viewpoint-related information VI', and can accurately obtain the parallax information, using the position of the viewpoint and the individual-eye image.

Here, the region specifying unit 356 that generates the spot light information SI' from the captured image can be said to be a detection unit that detects the incident ranges of the spot lights emitted from the light sources 32L and 32R to the image sensor 351.

Moreover, the region specifying unit 356 that generates the viewpoint-related information VI' by correcting the viewpoint-related information VI using the difference between the spot light information SI' and the spot light information SI as the attachment error can also be said to be a processing unit that performs processing of correcting the viewpoint-related information VI according to the detection result of the detection unit, that is, the optical image on the captured image.

<Second Another Embodiment of Camera System>

FIG. 31 is a block diagram illustrating an electrical configuration example of a second another embodiment of a camera system to which the present technology is applied.

Note that, in the drawing, parts corresponding to those in FIGS. 2 and 31 are given the same reference numerals, and hereinafter, description thereof will be omitted as appropriate.

Figure 32:
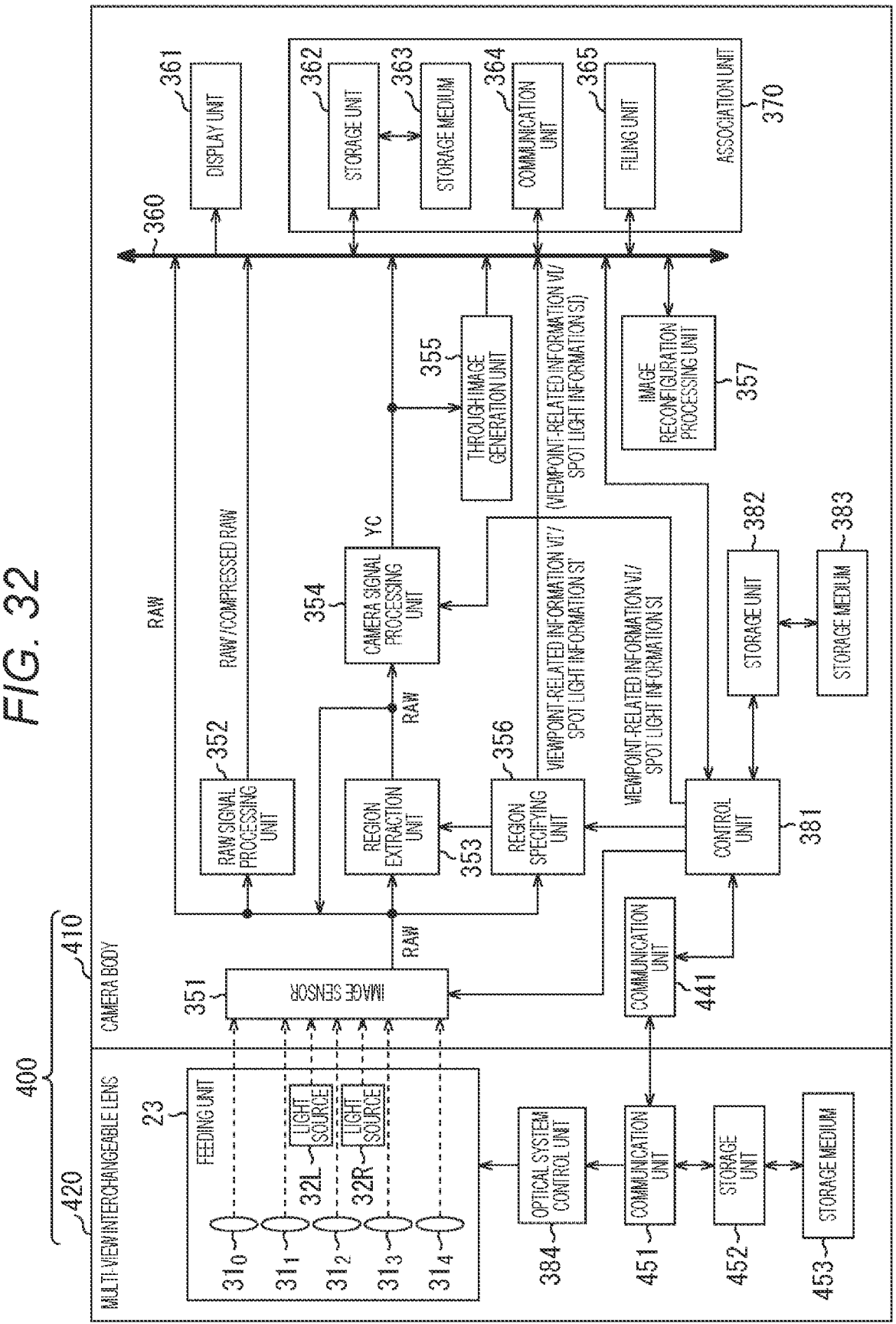
FIG. 32 is a block diagram illustrating an electrical configuration example of a second another embodiment of a camera system to which the present technology is applied.

In FIG. 32, a camera system 400 is a lens interchangeable camera system. The camera system 400 includes a camera body 410 and a multi-eye interchangeable lens 420 (lens unit). In a state where the multi-eye interchangeable lens 420 is mounted on the camera body 410, the camera system 400 has a substantially similar configuration to the camera system 300, and basically performs similar processing. That is, the camera system 400 functions as an imaging device that images an object and generates image data of a captured image similar to the camera system 300.

The camera body 410 has a configuration in which the multi-eye interchangeable lens 420 and other general interchangeable lenses can be attached and detached, similarly to the camera body 10 having the configuration in which the multi-eye interchangeable lens 20 and the like can be attached or detached.

The multi-eye interchangeable lens 420 includes the feeding unit 23. As described with reference to FIGS. 1 and 2, the feeding unit 23 includes the individual-eye lenses $31_0$ to $31_4$ and the light sources 32L and 32R.

The feeding unit 23 is moved inside the lens barrel 21 (FIG. 1) not illustrated in FIG. 32 in the optical axis direction of the lens barrel optical axis. Along with the movement of the feeding unit 23, the individual-eye lenses $31_0$ to $31_4$ and the light sources 32L and 32R included in the feeding unit 23 are also integrally moved.

In FIG. 32, the individual-eye lenses $31_i$ are configured such that optical paths of lights passing through the lenses are independent from one another, similarly to the case of the camera system 300. That is, the lights having passed through the individual-eye lenses $31_i$ are emitted at different positions from one another on the light-receiving surface (for example, an effective pixel region) of the image sensor 351 without entering the other individual-eye lenses $31_j$. At least the optical axes of the individual-eye lenses $31_i$ are located at different positions from one another on the light-receiving surface of the image sensor 351, and at least some of the lights having passed through the individual-eye lenses $31_i$ are emitted at different positions from one another on the light-receiving surface of the image sensor 351.

Therefore, in the camera system 400, in the captured image generated by the image sensor 351 (the entire image output by the image sensor 351), the images of an object formed via the individual-eye lenses $31_i$ are formed at different positions from one another, similarly to the case of the camera system 300. In other words, the individual-eye images having viewpoints at the positions of the individual-eye lenses $31_i$ are obtained from the captured image. That is, by mounting the multi-eye interchangeable lens 420 on the camera body 410 and imaging the object, a plurality of individual-eye images can be obtained.

In the camera system 400, the camera body 410 includes the image sensor 351, the RAW signal processing unit 352, the region extraction unit 353, the camera signal processing unit 354, the through image generation unit 355, the region specifying unit 356, the image reconfiguration processing unit 357, the bus 360, the display unit 361, the storage unit 362, a communication unit 364, the filing unit 365, the control unit 381, and the storage unit 382. That is, the camera body 410 has a configuration other than the lens unit 320 and the optical system control unit 384 of the camera system 300.

Note that the camera body 410 includes a communication unit 441 in addition to the above-described configuration. The communication unit 441 communicates with (the communication unit 451 of) the multi-eye interchangeable lens 420 correctly mounted on the camera body 410 and exchanges information and the like. The communication unit 441 can communicate with the multi-eye interchangeable lens 420 by an arbitrary communication method. The communication may be wired communication or wireless communication.

For example, the communication unit 441 is controlled by the control unit 381, communicates with (the communication unit 451 of) the multi-eye interchangeable lens 420, and acquires information supplied from the multi-eye interchangeable lens 420. Furthermore, for example, the communication unit 441 supplies the information supplied from the control unit 381 to the multi-eye interchangeable lens 420 by communication with (the communication unit 451 of) the multi-eye interchangeable lens 420. The information exchanged between the communication unit 441 and the multi-eye interchangeable lens 420 is arbitrary. For example, the information may be data or control information such as commands and control parameters.

In the camera system 400, the multi-eye interchangeable lens 420 further includes the optical system control unit 384, the communication unit 451, and the storage unit 452. The communication unit 451 communicates with the communication unit 441 in the multi-eye interchangeable lens 420 correctly mounted on the camera body 410. This communication implements exchange of information between the camera body 410 and the multi-eye interchangeable lens 420. The communication method of the communication unit 451 is arbitrary, and may be wired communication or wireless communication. Furthermore, the information exchanged by the communication may be data or control information such as commands and control parameters.

For example, the communication unit 451 acquires control information and other various types of information transmitted from the camera body 410 via the communication unit 441. The communication unit 451 supplies the information acquired in this manner to the optical system control unit 384 as necessary, and can use the information for control of the feeding unit 23, the individual-eye lens $31_i$, and the like.

Furthermore, the communication unit 451 can supply the acquired information to the storage unit 452 and store the information in the storage medium 453. Furthermore, the communication unit 451 can read information stored in the storage medium 453 via the storage unit 452 and transmit the read information to the camera body 410 (communication unit 441).

In the camera system 400, the storage location of the viewpoint-related information VI and the spot light information SI corresponding to the multi-eye interchangeable lens 420 is arbitrary. For example, the viewpoint-related information VI and the spot light information SI may be stored in the storage medium 453 of the multi-eye interchangeable lens 420. Then, for example, the control unit 381 of the camera body 410 may access the storage unit 452 via the communication unit 451 and the communication unit 441 to read the viewpoint-related information VI and the spot light information SI from the storage medium 453. Then, after acquiring the viewpoint-related information VI and the spot light information SI, the control unit 381 may supply and set the viewpoint-related information VI and the spot light information SI to the region specifying unit 356.

For example, such processing may be performed at any timing or trigger temporally before imaging, such as when the multi-eye interchangeable lens 420 is correctly mounted on the camera body 410, when the camera system 400 is powered on, or when the drive mode of the camera system 400 shifts to the imaging mode in which imaging of an object can be performed.

In this way, the camera body 410 can perform image processing for the captured image and the individual-eye images, using the viewpoint-related information VI and the spot light information SI corresponding to the multi-eye interchangeable lens 420.

Furthermore, the control unit 381 may supply the viewpoint-related information VI and the spot light information SI of the multi-eye interchangeable lens 420 acquired from the multi-eye interchangeable lens 420 to the storage unit 382 together with the ID of the multi-eye interchangeable lens 420 to store the information. In this case, the storage unit 382 stores the supplied ID, the viewpoint-related information VI, and the spot light information SI in the storage medium 383 in association with one another. That is, the camera body 410 can manage the viewpoint-related information VI, the spot light information SI, and the ID of the multi-eye interchangeable lens 420. The camera body 410 can manage the viewpoint-related information VI and the spot light information SI of the plurality of multi-eye interchangeable lenses 420.

In this way, the control unit 381 can acquire the ID of the multi-eye interchangeable lens 420 the next time, thereby reading the viewpoint-related information VI and the spot light information SI corresponding to the ID from the storage unit 382 (storage medium 383). That is, the control unit 381 can easily acquire the viewpoint-related information VI and the spot light information SI corresponding to the multi-eye interchangeable lens 420.

Furthermore, the storage medium 383 may previously store the viewpoint-related information VI and the spot light information SI for each of the plurality of multi-eye interchangeable lenses 420 in association with the ID of the multi-eye interchangeable lens 420. That is, in this case, the camera body 410 manages the viewpoint-related information VI and the spot light information SI of the plurality of multi-eye interchangeable lenses 420 in advance.

In this way, the control unit 381 can easily read the viewpoint-related information VI and the spot light information SI corresponding to the ID from the storage unit 382 (storage medium 383) by using the ID of the multi-eye interchangeable lens 420 correctly mounted on the camera body 410.

<Treatment of Deviation of Attachment Position of Multi-Eye Interchangeable Lens 420>

In the lens-interchangeable camera system 400, the attachment position of the multi-eye interchangeable lens 420 may deviate due to the manufacturing error or the movement of the feeding unit 23, similarly to the lens-integrated camera system 300. Moreover, in the lens-interchangeable camera system 400, the attachment position of the multi-eye interchangeable lens 420 may deviate due to the mount error. When the attachment position of the multi-eye interchangeable lens 420 deviates and the attachment error occurs at the attachment position, the accuracy of processing of cutting out the individual-eye images from the captured image and calculating the parallax information using the individual-eye images is reduced.

Therefore, the region specifying unit 356 can detect the attachment error as the deviation (amount) of the attachment position of the multi-eye interchangeable lens 420, using the spot light images appearing in the captured image.

For example, the region specifying unit 356 can generate the spot light information SI' regarding the spot light images appearing in the captured image from the captured image, and detect the difference between the spot light information SI' and the spot light information SI as the attachment error.

Moreover, the region specifying unit 356 can correct the viewpoint-related information VI using the attachment error, and generate the viewpoint-related information VI' as the information for specifying the position of the individual-eye image deviating according to the attachment error.

Then, the region extraction unit 353 can accurately cut out the individual-eye image from the captured image using the viewpoint-related information VI'. Moreover, the region extraction unit 353 accurately specifies the position of the viewpoint of the individual-eye image, using the viewpoint-related information VI', and can accurately obtain the parallax information, using the position of the viewpoint and the individual-eye image.

As described above, in the camera system 300 or 400, since the individual-eye lenses $31_0$ to $31_4$ and the light sources 32L and 32R are integrally fed out, the appropriate processing can be performed. That is, when a combination of the attachment error, the mount error, and various other errors is referred to as individual-eye image position errors, the individual-eye lenses $31_0$ to $31_4$ and the light sources 32L and 32R are moved integrally with the feeding unit 23, so that it is possible to detect the positional deviation between the viewpoint-related information and the position of the detected spot light and specify the accurate position of the individual-eye image in the entire image without worrying about the individual-eye image position errors caused by any cause at any feeding position.

<Description of Computer to which Present Technology is Applied>

Next, the series of processing of the region specifying unit 52, the image processing unit 53, the position calculation unit 57, the spot light image detection unit 62, the feeding amount detection unit 64, the region extraction unit 353, the region specifying unit 356, and the like can be performed by hardware or software. In a case of executing the series of processing by software, a program that configures the software is installed in a general-purpose computer or the like.

Figure 33:
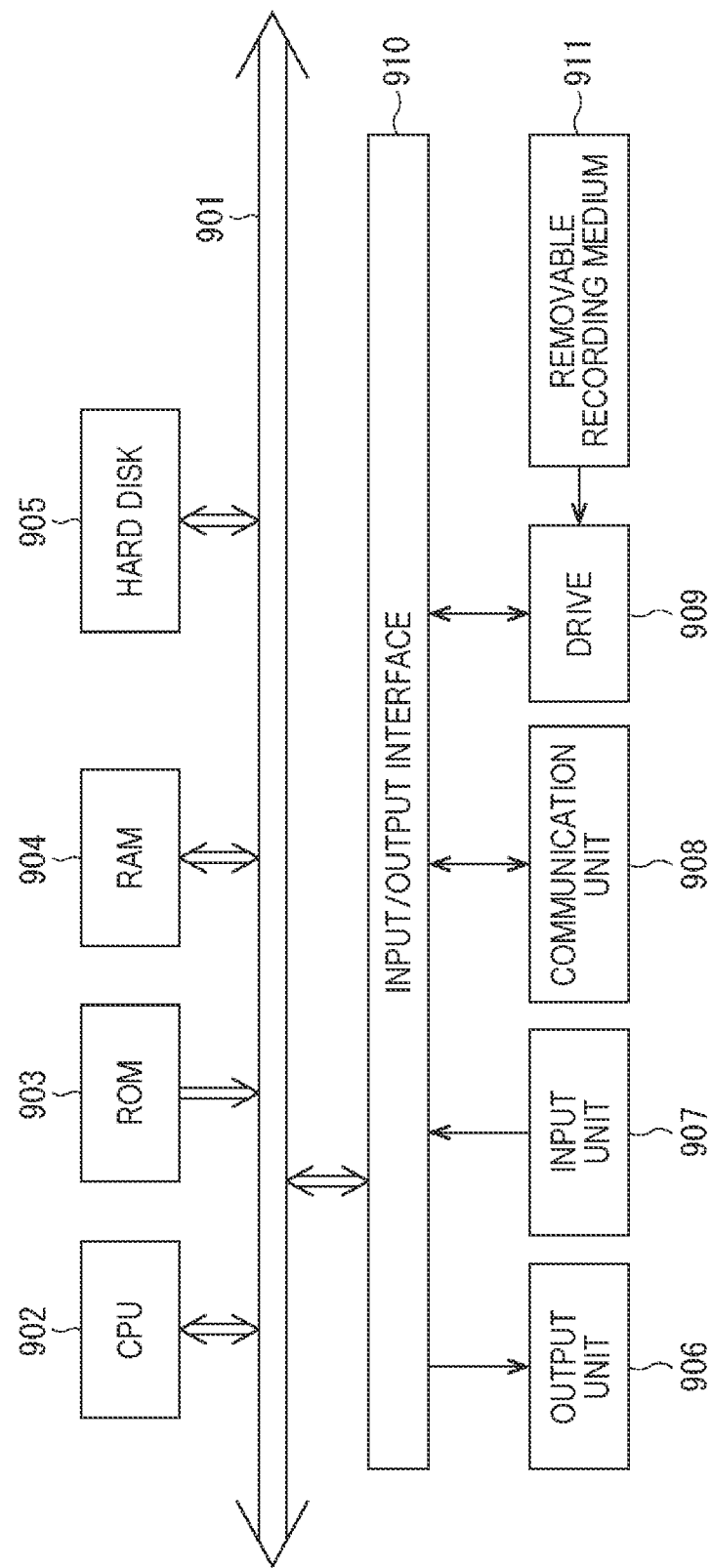
FIG. 33 is a block diagram illustrating a configuration example of an embodiment of a computer to which the present technology is applied.

FIG. 33 is a block diagram illustrating a configuration example of an embodiment of a computer to which a program for executing the above-described series of processing is installed.

The program can be recorded in advance in a hard disk 905 or a ROM 903 as a recording medium built in the computer.

Alternatively, the program can be stored (recorded) in a removable recording medium 911 driven by a drive 909. Such a removable recording medium 911 can be provided as so-called package software. Here, examples of the removable recording medium 911 include a flexible disk, a compact disc read only memory (CD-ROM), a magneto optical (MO) disk, a digital versatile disc (DVD), a magnetic disk, a semiconductor memory, and the like.

Note that the program can be downloaded to the computer via a communication network or a broadcast network and installed in the built-in hard disk 905, in addition to the program being installed from the removable recording medium 911 to the computer, as described above. In other words, the program can be transferred in a wireless manner from a download site to the computer via an artificial satellite for digital satellite broadcasting, or transferred in a wired manner to the computer via a network such as a local area network (LAN) or the Internet, for example.

The computer incorporates a central processing unit (CPU) 902, and an input/output interface 910 is connected to the CPU 902 via a bus 901.

When a command is input through the input/output interface 910 by the user who operates an input unit 907 or the like, the CPU 902 executes the program stored in the read only memory (ROM) 903 according to the command. Alternatively, the CPU 902 loads the program stored in a hard disk 905 into a random access memory (RAM) 904 and executes the program.

As a result, the CPU 902 performs the above-described processing according to the flowchart or the above-described processing of the block diagram. Then, the CPU 902 causes an output unit 906 to output the processing result, a communication unit 908 to transmit the processing result, and the hard disk 905 to record the processing result, via the input/output interface 910 as necessary, for example.

Note that the input unit 907 is configured by a keyboard, a mouse, a microphone, and the like. Furthermore, the output unit 906 is configured by a liquid crystal display (LCD), a speaker, and the like.

Here, in the present specification, the processing performed by the computer in accordance with the program does not necessarily have to be performed in chronological order in accordance with the order described as the flowchart. In other words, the processing performed by the computer according to the program also includes processing executed in parallel or individually (for example, parallel processing or processing by an object).

Furthermore, the program may be processed by one computer (processor) or may be processed in a distributed manner by a plurality of computers. Moreover, the program may be transferred to a remote computer and executed.

Moreover, in the present specification, the term "system" means a group of a plurality of configuration elements (devices, modules (parts), and the like), and whether or not all the configuration elements are in the same housing is irrelevant. Therefore, a plurality of devices housed in separate housings and connected via a network, and one device that houses a plurality of modules in one housing are both systems.

Note that embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Furthermore, the steps described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Furthermore, the effects described in the present specification are merely examples and are not limited, and other effects may be exhibited.

Note that the present technology can adopt the following configurations.

<1>
An interchangeable lens including:
a lens barrel;
a movable unit configured to be movable along an optical axis with respect to the lens barrel;
a plurality of individual-eye lenses configured to be integrally movable with the movable unit and arranged such that emission positions of imaging lights emitted through the respective individual-eye lenses do not overlap with one another; and
one or a plurality of light sources configured to be movable along the optical axis integrally with the movable unit and the plurality of individual-eye lenses, and arranged such that an emission position of a parallel light emitted to an image sensor provided in a camera body does not overlap with the emission position of the imaging light of each of the plurality of individual-eye lenses.

<2>
The interchangeable lens according to <1>, in which the light source emits the parallel light in an oblique direction inclined from the optical axis.

<3>

The interchangeable lens according to <2>, in which the light source is arranged at a position different from a center of the optical axis of the movable unit, and emits the parallel light in an oblique direction inclined toward the center of the optical axis.

<4>

The interchangeable lens according to any one of <1> to <3>, including:

a plurality of the light sources.

<5>

The interchangeable lens according to any one of <1> to <4>, further including:

a storage unit configured to store spot light position information indicating a position of the light source that irradiates the image sensor, and individual-eye image position information indicating the emission positions in the image sensor, the emission positions being of the imaging lights emitted from the plurality of individual-eye lenses.

<6>

An information processing apparatus including:

a detection unit configured to detect a light image on a captured image captured by an image sensor, the light image being of a parallel light emitted from a light source of a lens unit including a lens barrel, a movable unit configured to be movable along an optical axis with respect to the lens barrel, a plurality of individual-eye lenses configured to be integrally movable with the movable unit and arranged such that emission positions of imaging lights emitted through the respective individual-eye lenses do not overlap with one another, and one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses; and a processing unit configured to perform processing according to a detection result of the detection unit.

<7>

The information processing apparatus according to <6>, in which the detection unit detects a detection light image position that is a position of the light image in the captured image.

<8>

The information processing apparatus according to <7>, in which the processing unit specifies an imaging individual-eye image position that is a position of an individual-eye image having a viewpoint at a position of the individual-eye lens in the captured image according to the detection light image position.

<9>

The information processing apparatus according to <8>, further including:

a storage unit configured to store a storage light image position indicating a position of the light source that irradiates the image sensor, and storage individual-eye image positions indicating the emission positions of the imaging lights emitted from the plurality of individual-eye lenses in the image sensor, in which the processing unit specifies the imaging individual-eye image position on the basis of a relationship between the storage light image position and the detection light image position.

<10>

The information processing apparatus according to <9>, in which the processing unit specifies the imaging individual-eye image position by correcting the storage individual-eye image position on the basis of the relationship between the storage light image position and the detection light image position.

<11>

The information processing apparatus according to any one of <8> to <10>, further including an association unit configured to associate the captured image and the imaging individual-eye image position.

<12>

The information processing apparatus according to <9> or <10>, further including:

an association unit configured to associate the storage light image position, the detection light image position, and the storage individual-eye image position, and the captured image.

<13>

The information processing apparatus according to <9> or <10>, further including:

an association unit configured to associate the storage light image position, a difference between the storage light image position and the detection light image position, and the storage individual-eye image position, and the captured image.

<14>

The information processing apparatus according to any one of <8> to <13>, further including:

an extraction unit configured to extract the individual-eye image from the captured image according to the imaging individual-eye image position.

<15>

The information processing apparatus according to any one of <7> to <14>, in which the processing unit detects a feeding amount of the movable unit according to the detection light image position.

<16>

The information processing apparatus according to any one of <6> to <15>, in which the detection unit detects a plurality of the light images respectively corresponding to a plurality of the parallel lights respectively emitted from a plurality of the light sources.

<17>

The information processing apparatus according to any one of <6> to <16> being a lens-integrated imaging device including the lens unit.

<18>

The information processing apparatus according to any one of <6> to <16> being an imaging device to which the lens unit is mountable as an interchangeable lens.

<19>
An information processing method including:
a detection step of detecting a light image on a captured image captured by an image sensor, the light image being of a parallel light emitted from a light source of a lens unit including
  a lens barrel,
  a movable unit configured to be movable along an optical axis with respect to the lens barrel,
  a plurality of individual-eye lenses configured to be integrally movable with the movable unit and arranged such that emission positions of imaging lights emitted through the respective individual-eye lenses do not overlap with one another, and
  one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses; and
a processing step of performing processing according to a detection result of the detection step.

<20>
A program for causing a computer to function as:
a detection unit configured to detect a light image on a captured image captured by an image sensor, the light image being of a parallel light emitted from a light source of a lens unit including
  a lens barrel,
  a movable unit configured to be movable along an optical axis with respect to the lens barrel,
  a plurality of individual-eye lenses configured to be integrally movable with the movable unit and arranged such that emission positions of imaging lights emitted through the respective individual-eye lenses do not overlap with one another, and
  one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses; and
a processing unit configured to perform processing according to a detection result of the detection unit.

REFERENCE SIGNS LIST

10 Camera body
11 Camera mount
20 Multi-eye interchangeable lens
21 Lens barrel
22 Lens mount
23 Feeding unit
$31_0$ to $31_4$ Individual-eye lens
32L, 32R, 32U, 32D Light source
41 Storage unit
42 Communication unit
43 Control unit
51 Image sensor
52 Region specifying unit
53 Image processing unit
54 Display unit
55 Storage unit
56 Communication unit
57 Position calculation unit
61 Control unit
62 Spot light image detection unit
63 Feeding amount information storage unit
64 Feeding amount detection unit
101 Calibration data generation unit
102 Calibration data storage unit
103 Interpolation unit
104 Parallax information generation unit
121 Housing
122 LED
123, 124 Lens
211 Individual-eye image position information modification unit
212 Individual-eye image extraction unit
221 Association unit
230 Post-processing device
231 Region specifying unit
232 Image processing unit
233 Display unit
234 Recording unit
235 Transmission unit
241 Individual-eye image position information modification unit
242 Individual-eye image extraction unit
250 Post-processing device
300 Camera system
320 Lens unit
351 Image sensor
352 RAW signal processing unit
353 Region extraction unit
354 Camera signal processing unit
355 Through image generation unit
356 Region specifying unit
357 Image reconfiguration processing unit
360 Bus
361 Display unit
362 Storage unit
363 Storage medium
364 Communication unit
365 Filing unit
370 Association unit
381 Control unit
382 Optical system control unit
400 Camera system
410 Camera body
420 Multi-eye interchangeable lens
441, 451 Communication unit
452 Storage unit
453 Storage medium
901 Bus
902 CPU
903 ROM
904 RAM
905 Hard disk
906 Output unit
907 Input unit
908 Communication unit
909 Drive
910 Input/output interface
911 Removable recording medium

The invention claimed is:
1. An interchangeable lens comprising:
a lens barrel;
a movable unit configured to be movable along an optical axis with respect to the lens barrel;

a plurality of individual-eye lenses configured to be integrally movable with the movable unit and arranged such that emission positions of imaging lights emitted through the respective individual-eye lenses do not overlap with one another; and one or a plurality of light sources configured to be movable along the optical axis integrally with the movable unit and the plurality of individual-eye lenses, and arranged such that an emission position of a parallel light emitted to an image sensor provided in a camera body does not overlap with the emission position of the imaging light of each of the plurality of individual-eye lenses.

2. The interchangeable lens according to claim 1, wherein the light source emits the parallel light in an oblique direction inclined from the optical axis.

3. The interchangeable lens according to claim 2, wherein the light source is arranged at a position different from a center of the optical axis of the movable unit, and emits the parallel light in an oblique direction inclined toward the center of the optical axis.

4. The interchangeable lens according to claim 1, comprising:

a plurality of the light sources.

5. The interchangeable lens according to claim 1, further comprising:

a storage unit configured to store spot light position information indicating a position of the light source that irradiates the image sensor, and individual-eye image position information indicating the emission positions in the image sensor, the emission positions being of the imaging lights emitted from the plurality of individual-eye lenses.

6. An information processing apparatus comprising:

a detection unit configured to detect a light image on a captured image captured by an image sensor, the light image being of a parallel light emitted from a light source of a lens unit including a lens barrel, a movable unit configured to be movable along an optical axis with respect to the lens barrel, a plurality of individual-eye lenses configured to be integrally movable with the movable unit and arranged such that emission positions of imaging lights emitted through the respective individual-eye lenses do not overlap with one another, and one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses; and a processing unit configured to perform processing according to a detection result of the detection unit.

7. The information processing apparatus according to claim 6, wherein the detection unit detects a detection light image position that is a position of the light image in the captured image.

8. The information processing apparatus according to claim 7, wherein the processing unit specifies an imaging individual-eye image position that is a position of an individual-eye image having a viewpoint at a position of the individual-eye lens in the captured image according to the detection light image position.

9. The information processing apparatus according to claim 8, further comprising:

a storage unit configured to store a storage light image position indicating a position of the light source that irradiates the image sensor, and storage individual-eye image positions indicating the emission positions of the imaging lights emitted from the plurality of individual-eye lenses in the image sensor, wherein the processing unit specifies the imaging individual-eye image position on a basis of a relationship between the storage light image position and the detection light image position.

10. The information processing apparatus according to claim 9, wherein the processing unit specifies the imaging individual-eye image position by correcting the storage individual-eye image position on a basis of the relationship between the storage light image position and the detection light image position.

11. The information processing apparatus according to claim 8, further comprising:

an association unit configured to associate the captured image and the imaging individual-eye image position.

12. The information processing apparatus according to claim 9, further comprising:

an association unit configured to associate the storage light image position, the detection light image position, and the storage individual-eye image position, and the captured image.

13. The information processing apparatus according to claim 9, further comprising:

an association unit configured to associate the storage light image position, a difference between the storage light image position and the detection light image position, and the storage individual-eye image position, and the captured image.

14. The information processing apparatus according to claim 8, further comprising:

an extraction unit configured to extract the individual-eye image from the captured image according to the imaging individual-eye image position.

15. The information processing apparatus according to claim 7, wherein the processing unit detects a feeding amount of the movable unit according to the detection light image position.

16. The information processing apparatus according to claim 6, wherein the detection unit detects a plurality of the light images respectively corresponding to a plurality of the parallel lights respectively emitted from a plurality of the light sources.

17. The information processing apparatus according to claim 6 being a lens-integrated imaging device including the lens unit.

18. The information processing apparatus according to claim 6 being an imaging device to which the lens unit is mountable as an interchangeable lens.

19. An information processing method comprising:
a detection step of detecting a light image on a captured image captured by an image sensor, the light image being of a parallel light emitted from a light source of a lens unit including
  a lens barrel,
  a movable unit configured to be movable along an optical axis with respect to the lens barrel,
  a plurality of individual-eye lenses configured to be integrally movable with the movable unit and arranged such that emission positions of imaging lights emitted through the respective individual-eye lenses do not overlap with one another, and
  one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses; and
a processing step of performing processing according to a detection result of the detection step.

20. A non-transitory computer readable medium storing a program, the program being executable by a processor to perform operations comprising:
  detecting, by a detection unit, a light image on a captured image captured by an image sensor, the light image being of a parallel light emitted from a light source of a lens unit including
    a lens barrel,
    a movable unit configured to be movable along an optical axis with respect to the lens barrel,
    a plurality of individual-eye lenses configured to be integrally movable with the movable unit and arranged such that emission positions of imaging lights emitted through the respective individual-eye lenses do not overlap with one another, and
    one or a plurality of the light sources configured to be movable along the optical axis integrally with the movable unit and the plurality of individual-eye lenses, and arranged such that an emission position of the parallel light emitted to the image sensor provided in a camera body does not overlap with the emission position of the imaging light of each of the plurality of individual-eye lenses; and
  performing processing according to a detection result of detecting the light image by the detection unit.

* * * * *